US008760992B2

(12) United States Patent
Xing et al.

(10) Patent No.: US 8,760,992 B2
(45) Date of Patent: Jun. 24, 2014

(54) METHOD AND SYSTEM FOR SWITCHING ANTENNA AND CHANNEL ASSIGNMENTS IN BROADBAND WIRELESS NETWORKS

(71) Applicant: Adaptix, Inc., Carrollton, TX (US)

(72) Inventors: Guanbin Xing, Issaquah, WA (US); Manyuan Shen, Bellevue, WA (US); Hui Liu, Clyde Hill, WA (US)

(73) Assignee: Adaptix, Inc., Plano, TX (US)

( * ) Notice: Subject to any disclaimer, the term of this patent is extended or adjusted under 35 U.S.C. 154(b) by 0 days.

(21) Appl. No.: 13/756,957

(22) Filed: Feb. 1, 2013

(65) Prior Publication Data

US 2013/0142069 A1  Jun. 6, 2013

Related U.S. Application Data

(63) Continuation of application No. 12/498,924, filed on Jul. 7, 2009, which is a continuation of application No. 11/007,064, filed on Dec. 7, 2004, now Pat. No. 7,573,851.

(51) Int. Cl.
*H04J 11/00* (2006.01)

(52) U.S. Cl.
USPC ............................................ 370/203; 370/334

(58) Field of Classification Search
USPC .................... 370/203, 208, 349, 334
See application file for complete search history.

(56) References Cited

U.S. PATENT DOCUMENTS

| 4,355,411 A | 10/1982 | Reudink et al. |
| 4,488,445 A | 12/1984 | Aske |
| 4,670,889 A | 6/1987 | Hewitt et al. |
| 4,794,635 A | 12/1988 | Hess |
| 5,038,399 A | 8/1991 | Bruckert |
| 5,048,059 A | 9/1991 | Dent |
| 5,200,957 A | 4/1993 | Dahlin |
| 5,212,831 A | 5/1993 | Chuang et al. |
| 5,239,676 A | 8/1993 | Strawczynski et al. |
| 5,260,967 A | 11/1993 | Schilling |
| 5,267,261 A | 11/1993 | Blakeney, II et al. |

(Continued)

FOREIGN PATENT DOCUMENTS

| CA | 2119983 A1 | 9/1994 |
| CN | 1187930 A | 6/1996 |

(Continued)

OTHER PUBLICATIONS

U.S. Appl. No. 13/731,825, filed Dec. 2012, Li et al.

(Continued)

*Primary Examiner* — Brenda H Pham
(74) *Attorney, Agent, or Firm* — Martin & Ferraro, LLP

(57) ABSTRACT

A method and apparatus for antenna switching, grouping, and channel assignments in wireless communication systems. The invention allows multiuser diversity to be exploited with simple antenna operations, therefore increasing the capacity and performance of wireless communications systems. Channel characteristics indicative of signal reception quality for downlink or bi-directional traffic for each channel/antenna resource combination are measured or estimated at a subscriber. Corresponding channel characteristic information is returned to the base station. Channel characteristics information may also be measured or estimated for uplink or bi-directional signals received at each of multiple receive antenna resources. The base station employs channel allocation logic to assign uplink, downlink and/or bi-directional channels for multiple subscribers based on channel characteristics measured and/or estimated for the uplink, downlink and/or bi-directional channels.

20 Claims, 9 Drawing Sheets

(56) References Cited

U.S. PATENT DOCUMENTS

| | | |
|---|---|---|
| 5,280,630 A | 1/1994 | Wang |
| 5,282,222 A | 1/1994 | Fattouche et al. |
| 5,291,475 A | 3/1994 | Bruckert |
| 5,319,634 A | 6/1994 | Bartholomew |
| 5,323,447 A | 6/1994 | Gillis et al. |
| 5,327,576 A | 7/1994 | Uddenfeldt et al. |
| 5,345,599 A | 9/1994 | Paulraj et al. |
| 5,410,538 A | 4/1995 | Roche et al. |
| 5,437,054 A | 7/1995 | Rappaport et al. |
| 5,444,697 A | 8/1995 | Leung et al. |
| 5,448,750 A | 9/1995 | Eriksson et al. |
| 5,471,647 A | 11/1995 | Gerlach et al. |
| 5,479,447 A | 12/1995 | Chow et al. |
| 5,491,837 A | 2/1996 | Haartsen |
| 5,492,837 A | 2/1996 | Naser-Kolahzadeh |
| 5,504,775 A | 4/1996 | Chouly et al. |
| 5,504,783 A | 4/1996 | Tomisato et al. |
| 5,507,008 A | 4/1996 | Kanai et al. |
| 5,507,034 A | 4/1996 | Bodin et al. |
| 5,515,378 A | 5/1996 | Roy, III et al. |
| 5,546,090 A | 8/1996 | Roy, III et al. |
| 5,548,582 A | 8/1996 | Brajal et al. |
| 5,555,268 A | 9/1996 | Fattouche et al. |
| 5,577,022 A | 11/1996 | Padovani |
| 5,581,548 A | 12/1996 | Ugland et al. |
| 5,586,148 A | 12/1996 | Furukawa et al. |
| 5,588,020 A | 12/1996 | Schilling |
| 5,590,156 A | 12/1996 | Carney |
| 5,592,490 A | 1/1997 | Barratt et al. |
| 5,598,417 A | 1/1997 | Crisler |
| 5,623,484 A | 4/1997 | Muszynski |
| 5,634,199 A | 5/1997 | Gerlach et al. |
| 5,642,353 A | 6/1997 | Roy, III et al. |
| 5,687,194 A | 11/1997 | Paneth et al. |
| 5,708,973 A | 1/1998 | Ritter |
| 5,726,978 A | 3/1998 | Frodigh et al. |
| 5,732,353 A | 3/1998 | Haartsen |
| 5,734,967 A | 3/1998 | Kotzin et al. |
| 5,764,699 A | 6/1998 | Needham et al. |
| 5,774,808 A | 6/1998 | Sarkioja et al. |
| 5,784,363 A | 7/1998 | Engstrom et al. |
| 5,793,759 A | 8/1998 | Rakib et al. |
| 5,796,722 A | 8/1998 | Kotzin et al. |
| 5,799,000 A | 8/1998 | Hoole |
| 5,819,168 A | 10/1998 | Golden et al. |
| 5,822,372 A | 10/1998 | Emami |
| 5,828,658 A | 10/1998 | Ottersten et al. |
| 5,838,673 A | 11/1998 | Mordechai |
| 5,839,074 A | 11/1998 | Plehn et al. |
| 5,848,358 A | 12/1998 | Forssen et al. |
| 5,854,981 A | 12/1998 | Wallstedt et al. |
| 5,862,487 A | 1/1999 | Fujii et al. |
| 5,867,478 A | 2/1999 | Baum et al. |
| 5,884,145 A | 3/1999 | Haartsen |
| 5,886,988 A | 3/1999 | Yun et al. |
| 5,887,245 A | 3/1999 | Lindroth et al. |
| 5,887,263 A | 3/1999 | Ishii |
| 5,909,436 A | 6/1999 | Engstrom et al. |
| 5,912,876 A | 6/1999 | H'Mimy |
| 5,912,931 A | 6/1999 | Matsumoto |
| 5,914,933 A | 6/1999 | Cimini et al. |
| 5,914,946 A | 6/1999 | Avidor et al. |
| 5,933,421 A | 8/1999 | Alamouti et al. |
| 5,943,375 A | 8/1999 | Veintimilla |
| 5,956,642 A | 9/1999 | Larsson et al. |
| 5,966,644 A | 10/1999 | Suzuki |
| 5,973,642 A | 10/1999 | Li et al. |
| 5,982,327 A | 11/1999 | Vook et al. |
| 5,982,760 A | 11/1999 | Chen |
| 5,991,273 A | 11/1999 | Abu-Dayya et al. |
| 5,991,331 A | 11/1999 | Chennakeshu et al. |
| 6,005,876 A | 12/1999 | Cimini, Jr. et al. |
| 6,006,075 A | 12/1999 | Smith et al. |
| 6,009,332 A | 12/1999 | Haartsen |
| 6,009,553 A | 12/1999 | Martinez et al. |
| 6,016,311 A | 1/2000 | Gilbert |
| 6,018,528 A | 1/2000 | Gitlin et al. |
| 6,023,622 A | 2/2000 | Plaschke et al. |
| 6,026,123 A | 2/2000 | Williams |
| 6,037,898 A | 3/2000 | Parish et al. |
| 6,038,450 A | 3/2000 | Brink et al. |
| 6,041,237 A | 3/2000 | Farsakh |
| 6,044,067 A | 3/2000 | Suzuki |
| 6,047,189 A | 4/2000 | Yun et al. |
| 6,052,594 A | 4/2000 | Chuang et al. |
| 6,061,568 A | 5/2000 | Dent |
| 6,064,339 A | 5/2000 | Wax et al. |
| 6,064,692 A | 5/2000 | Chow |
| 6,064,694 A | 5/2000 | Clark et al. |
| 6,067,290 A | 5/2000 | Paulraj et al. |
| 6,081,536 A | 6/2000 | Gorsuch |
| 6,085,114 A | 7/2000 | Gibbons |
| 6,091,717 A | 7/2000 | Honkasalo et al. |
| 6,091,955 A | 7/2000 | Aalto et al. |
| 6,108,374 A | 8/2000 | Balachandran et al. |
| 6,108,565 A | 8/2000 | Scherzer |
| 6,111,919 A | 8/2000 | Yonge, III |
| 6,115,614 A | 9/2000 | Furukawa |
| 6,119,011 A | 9/2000 | Borst et al. |
| 6,122,260 A | 9/2000 | Liu et al. |
| 6,128,276 A | 10/2000 | Agee |
| 6,131,016 A | 10/2000 | Greenstein et al. |
| 6,141,565 A | 10/2000 | Feuerstein et al. |
| 6,141,567 A | 10/2000 | Youssefmir et al. |
| 6,144,652 A | 11/2000 | Avidor et al. |
| 6,144,654 A | 11/2000 | Ibanez-Meier et al. |
| 6,144,696 A | 11/2000 | Shively et al. |
| 6,144,711 A | 11/2000 | Raleigh et al. |
| 6,154,661 A | 11/2000 | Goldburg |
| 6,160,791 A | 12/2000 | Bohnke |
| 6,175,550 B1 | 1/2001 | van Nee |
| 6,192,026 B1 | 2/2001 | Pollack et al. |
| 6,198,928 B1 | 3/2001 | Keurulainen et al. |
| 6,208,663 B1 | 3/2001 | Schramm et al. |
| 6,212,242 B1 | 4/2001 | Smith et al. |
| 6,212,388 B1 | 4/2001 | Seo |
| 6,215,815 B1 | 4/2001 | Chen et al. |
| 6,226,320 B1 | 5/2001 | Hakkinen et al. |
| 6,246,713 B1 | 6/2001 | Mattisson |
| 6,246,881 B1 | 6/2001 | Parantainen et al. |
| 6,253,063 B1 | 6/2001 | Cudak et al. |
| 6,253,094 B1 | 6/2001 | Schmutz |
| 6,259,686 B1 | 7/2001 | Blanc et al. |
| 6,276,297 B1 | 8/2001 | van den Berg et al. |
| 6,281,840 B1 | 8/2001 | Miyoshi et al. |
| 6,282,185 B1 | 8/2001 | Hakkinen et al. |
| 6,298,092 B1 | 10/2001 | Heath, Jr. et al. |
| 6,304,593 B1 | 10/2001 | Alouini et al. |
| 6,307,851 B1 | 10/2001 | Jung et al. |
| 6,314,082 B1 | 11/2001 | Malmgren |
| 6,327,314 B1 | 12/2001 | Cimini, Jr. et al. |
| 6,327,472 B1 | 12/2001 | Westroos et al. |
| 6,330,429 B1 | 12/2001 | He |
| 6,330,460 B1 | 12/2001 | Wong et al. |
| 6,334,047 B1 | 12/2001 | Andersson et al. |
| 6,351,499 B1 | 2/2002 | Paulraj et al. |
| 6,351,643 B1 | 2/2002 | Haartsen |
| 6,359,867 B1 | 3/2002 | Vehmas |
| 6,359,923 B1 | 3/2002 | Agee et al. |
| 6,366,195 B1 | 4/2002 | Harel et al. |
| 6,377,631 B1 | 4/2002 | Raleigh |
| 6,377,632 B1 | 4/2002 | Paulraj et al. |
| 6,377,636 B1 | 4/2002 | Paulraj et al. |
| 6,388,999 B1 | 5/2002 | Gorsuch et al. |
| 6,400,699 B1 | 6/2002 | Airy et al. |
| 6,404,783 B1 | 6/2002 | Cimini, Jr. et al. |
| 6,405,044 B1 | 6/2002 | Smith et al. |
| 6,405,048 B1 | 6/2002 | Haartsen |
| 6,411,186 B1 | 6/2002 | Lilleberg et al. |
| 6,415,153 B1 | 7/2002 | Liew |
| 6,424,836 B1 | 7/2002 | Gil et al. |
| 6,430,148 B1 | 8/2002 | Ring |
| 6,434,392 B1 | 8/2002 | Posti |
| 6,442,130 B1 | 8/2002 | Jones et al. |

(56) References Cited

U.S. PATENT DOCUMENTS

| | | |
|---|---|---|
| 6,445,916 B1 | 9/2002 | Rahman |
| 6,449,246 B1 | 9/2002 | Barton et al. |
| 6,452,981 B1 | 9/2002 | Raleigh et al. |
| 6,463,096 B1 | 10/2002 | Raleigh et al. |
| 6,463,295 B1 | 10/2002 | Yun |
| 6,463,296 B1 | 10/2002 | Esmailzadeh et al. |
| 6,470,044 B1 | 10/2002 | Kowalski |
| 6,473,418 B1 | 10/2002 | Laroia et al. |
| 6,473,467 B1 | 10/2002 | Wallace et al. |
| 6,477,158 B1 | 11/2002 | Take et al. |
| 6,487,253 B1 | 11/2002 | Jones, IV et al. |
| 6,493,331 B1 | 12/2002 | Walton et al. |
| 6,496,490 B1 | 12/2002 | Andrews et al. |
| 6,501,785 B1 | 12/2002 | Chang et al. |
| 6,512,737 B1 | 1/2003 | Agee |
| 6,526,281 B1 | 2/2003 | Gorsuch et al. |
| 6,529,488 B1 | 3/2003 | Urs et al. |
| 6,535,501 B1 | 3/2003 | Bohnke |
| 6,539,233 B1 | 3/2003 | Taketsugu et al. |
| 6,545,997 B1 | 4/2003 | Bohnke et al. |
| 6,546,249 B1 | 4/2003 | Imai et al. |
| 6,553,001 B1 | 4/2003 | Indira |
| 6,553,011 B1 | 4/2003 | Yan et al. |
| 6,553,234 B1 | 4/2003 | Florea |
| 6,556,557 B1 | 4/2003 | Cimini, Jr. et al. |
| 6,563,786 B1 | 5/2003 | Van Nee |
| 6,567,383 B1 | 5/2003 | Bohnke et al. |
| 6,567,387 B1 | 5/2003 | Dulin et al. |
| 6,574,476 B1 | 6/2003 | Williams |
| 6,584,330 B1 | 6/2003 | Ruuska |
| 6,587,696 B1 | 7/2003 | Ma |
| 6,600,772 B1 | 7/2003 | Zeira et al. |
| 6,600,776 B1 | 7/2003 | Alamouti et al. |
| 6,600,934 B1 | 7/2003 | Yun et al. |
| 6,606,296 B1 | 8/2003 | Kokkonen |
| 6,608,863 B1 | 8/2003 | Onizawa et al. |
| 6,609,039 B1 | 8/2003 | Schoen |
| 6,611,506 B1 | 8/2003 | Huang et al. |
| 6,615,024 B1 | 9/2003 | Boros et al. |
| 6,633,614 B1 | 10/2003 | Barton et al. |
| 6,647,078 B1 | 11/2003 | Thomas |
| 6,647,271 B1 | 11/2003 | Doi |
| 6,654,431 B1 | 11/2003 | Barton et al. |
| 6,654,612 B1 | 11/2003 | Avidor et al. |
| 6,657,949 B1 | 12/2003 | Jones, IV et al. |
| 6,674,732 B1 | 1/2004 | Boehnke et al. |
| 6,681,256 B1 | 1/2004 | Kuntze et al. |
| 6,690,944 B1 | 2/2004 | Lee et al. |
| 6,693,884 B1 | 2/2004 | Gutowski |
| 6,694,147 B1 | 2/2004 | Viswanath et al. |
| 6,699,784 B2 | 3/2004 | Xia et al. |
| 6,701,129 B1 | 3/2004 | Hashem et al. |
| 6,711,416 B1 | 3/2004 | Zhang |
| 6,721,159 B2 | 4/2004 | Takashige et al. |
| 6,721,569 B1 | 4/2004 | Hashem et al. |
| 6,726,297 B1 | 4/2004 | Uesugi et al. |
| 6,726,978 B2 | 4/2004 | Sehr |
| 6,741,861 B2 | 5/2004 | Bender et al. |
| 6,748,222 B1 | 6/2004 | Hashem et al. |
| 6,751,193 B1 | 6/2004 | Kudrimoti et al. |
| 6,751,261 B1 | 6/2004 | Olsson et al. |
| 6,751,444 B1 | 6/2004 | Meiyappan |
| 6,751,480 B2 | 6/2004 | Kogiantis et al. |
| 6,757,265 B1 | 6/2004 | Sebastian et al. |
| 6,760,882 B1 | 7/2004 | Gesbert et al. |
| 6,775,320 B1 | 8/2004 | Tzannes et al. |
| 6,781,974 B1 | 8/2004 | Tsumura |
| 6,782,037 B1 | 8/2004 | Krishnamoorthy et al. |
| 6,788,349 B2 | 9/2004 | Wu et al. |
| 6,795,392 B1 | 9/2004 | Li et al. |
| 6,795,424 B1 | 9/2004 | Kapoor et al. |
| 6,816,452 B1 | 11/2004 | Maehata et al. |
| 6,826,240 B1 | 11/2004 | Thomas et al. |
| 6,834,045 B1 | 12/2004 | Lappetelainen et al. |
| 6,850,506 B1 | 2/2005 | Holtzman et al. |
| 6,862,272 B2 | 3/2005 | Dulin et al. |
| 6,868,277 B1 | 3/2005 | Cerwall et al. |
| 6,870,808 B1 | 3/2005 | Liu et al. |
| 6,870,826 B1 | 3/2005 | Ishizu |
| 6,873,612 B1 | 3/2005 | Steer et al. |
| 6,882,619 B1 | 4/2005 | Gerakoulis |
| 6,888,899 B2 | 5/2005 | Raleigh et al. |
| 6,891,792 B1 | 5/2005 | Cimini, Jr. et al. |
| 6,892,059 B1 | 5/2005 | Kim et al. |
| 6,904,030 B2 | 6/2005 | Lee et al. |
| 6,904,283 B2 | 6/2005 | Li et al. |
| 6,904,284 B2 | 6/2005 | Saito et al. |
| 6,907,244 B2 | 6/2005 | Santhoff et al. |
| 6,920,122 B1 | 7/2005 | Hanaoka et al. |
| 6,922,388 B1 | 7/2005 | Laroia et al. |
| 6,922,445 B1 | 7/2005 | Sampath et al. |
| 6,928,120 B1 | 8/2005 | Zhang |
| 6,937,557 B1 | 8/2005 | Sudo |
| 6,937,665 B1 | 8/2005 | Vandenameele |
| 6,944,120 B2 | 9/2005 | Wu et al. |
| 6,947,748 B2 | 9/2005 | Li et al. |
| 6,961,364 B1 | 11/2005 | Laroia et al. |
| 6,975,603 B1 | 12/2005 | Dicker et al. |
| 6,975,611 B1 | 12/2005 | Balachandran et al. |
| 6,985,432 B1 | 1/2006 | Hadad et al. |
| 6,985,434 B2 | 1/2006 | Wu et al. |
| 6,996,056 B2 | 2/2006 | Chheda et al. |
| 6,996,075 B2 | 2/2006 | Santhoff et al. |
| 6,996,100 B1 | 2/2006 | Haartsen |
| 7,010,048 B1 | 3/2006 | Shattil et al. |
| 7,020,072 B1 | 3/2006 | Li et al. |
| 7,031,753 B2 | 4/2006 | Hashem |
| 7,047,011 B1 | 5/2006 | Wikman et al. |
| 7,051,268 B1 | 5/2006 | Sindhushayana et al. |
| 7,058,146 B2 | 6/2006 | Paulraj et al. |
| 7,062,246 B2 | 6/2006 | Owen |
| 7,062,295 B2 | 6/2006 | Yoshii et al. |
| 7,068,628 B2 | 6/2006 | Li et al. |
| 7,072,315 B1 | 7/2006 | Liu et al. |
| 7,095,719 B1 | 8/2006 | Wilhelmsson et al. |
| 7,099,413 B2 | 8/2006 | Chuang et al. |
| 7,116,944 B2 | 10/2006 | Das et al. |
| 7,133,352 B1 | 11/2006 | Hadad |
| 7,133,380 B1 | 11/2006 | Winters et al. |
| 7,135,358 B2 | 11/2006 | Sugino et al. |
| 7,139,592 B2 | 11/2006 | Leifer et al. |
| 7,145,971 B2 | 12/2006 | Raleigh et al. |
| 7,146,172 B2 | 12/2006 | Li et al. |
| 7,180,877 B1 | 2/2007 | Benveniste |
| 7,203,191 B2 | 4/2007 | Garcia-Luna-Aceves et al. |
| 7,203,249 B2 | 4/2007 | Raleigh et al. |
| 7,209,745 B1 | 4/2007 | Sebastian et al. |
| 7,224,741 B1 | 5/2007 | Hadad |
| 7,230,908 B2 | 6/2007 | Vanderaar et al. |
| 7,269,389 B2 | 9/2007 | Petrus et al. |
| 7,310,522 B2 | 12/2007 | Geile |
| 7,355,962 B2 | 4/2008 | Li et al. |
| 7,366,253 B2 | 4/2008 | Kim et al. |
| 7,373,151 B1 | 5/2008 | Ahmed |
| 7,376,172 B2 | 5/2008 | Laroia et al. |
| 7,379,506 B2 | 5/2008 | Boariu et al. |
| 7,379,742 B2 | 5/2008 | Li et al. |
| 7,450,604 B2 | 11/2008 | Gardner et al. |
| 7,454,212 B2 | 11/2008 | Li et al. |
| 7,489,934 B2 | 2/2009 | Li et al. |
| 7,509,138 B2 | 3/2009 | Shin et al. |
| 7,555,060 B2 | 6/2009 | Raleigh et al. |
| 7,573,850 B2 | 8/2009 | Li et al. |
| 7,573,851 B2 | 8/2009 | Xing et al. |
| 7,590,095 B2 | 9/2009 | Chen et al. |
| 7,650,152 B2 | 1/2010 | Li et al. |
| 7,664,188 B2 | 2/2010 | Raleigh et al. |
| 7,675,938 B2 | 3/2010 | Kolze |
| 7,706,315 B2 | 4/2010 | Vanderaar et al. |
| 7,715,358 B2 | 5/2010 | Li et al. |
| 7,751,854 B2 | 7/2010 | Leifer et al. |
| 7,783,285 B2 | 8/2010 | Chater-Lea |
| 7,787,514 B2 | 8/2010 | Shattil |
| 7,787,872 B2 | 8/2010 | Minborg et al. |

(56) References Cited

U.S. PATENT DOCUMENTS

| | | |
|---|---|---|
| 7,826,560 B2 | 11/2010 | Raleigh et al. |
| 7,827,581 B1 | 11/2010 | Eiger et al. |
| 7,933,244 B2 | 4/2011 | Li et al. |
| 8,005,479 B2 | 8/2011 | Meiyappan |
| 8,036,164 B1 | 10/2011 | Winters et al. |
| 8,036,199 B2 | 10/2011 | Li et al. |
| 8,036,307 B2 | 10/2011 | Raleigh et al. |
| 8,358,574 B2 | 1/2013 | Gerakoulis |
| 8,553,521 B2* | 10/2013 | Zhang et al. ................. 370/203 |
| 2001/0027113 A1 | 10/2001 | Hayashihara |
| 2001/0040089 A1 | 11/2001 | Hemingway et al. |
| 2001/0040880 A1 | 11/2001 | Chen et al. |
| 2002/0006120 A1 | 1/2002 | Suzuki et al. |
| 2002/0006167 A1 | 1/2002 | McFarland |
| 2002/0016173 A1 | 2/2002 | Hunzinger |
| 2002/0097702 A1 | 7/2002 | Take |
| 2002/0114269 A1 | 8/2002 | Onggosanusi et al. |
| 2002/0115468 A1 | 8/2002 | Haim |
| 2002/0160783 A1 | 10/2002 | Holtzman et al. |
| 2002/0181436 A1 | 12/2002 | Mueckenheim et al. |
| 2002/0183010 A1 | 12/2002 | Catreux et al. |
| 2002/0188723 A1 | 12/2002 | Choi et al. |
| 2002/0191535 A1 | 12/2002 | Sugiyama et al. |
| 2003/0003937 A1 | 1/2003 | Ohkubo et al. |
| 2003/0021245 A1 | 1/2003 | Haumonte et al. |
| 2003/0035491 A1 | 2/2003 | Walton et al. |
| 2003/0067890 A1 | 4/2003 | Goel et al. |
| 2003/0068984 A1 | 4/2003 | Shin et al. |
| 2003/0108089 A1 | 6/2003 | Lee et al. |
| 2003/0148738 A1 | 8/2003 | Arnab et al. |
| 2003/0165123 A1 | 9/2003 | Saunders |
| 2003/0169681 A1 | 9/2003 | Li et al. |
| 2003/0169824 A1 | 9/2003 | Chayat |
| 2003/0211831 A1 | 11/2003 | Xu et al. |
| 2004/0001429 A1 | 1/2004 | Ma et al. |
| 2004/0047309 A1 | 3/2004 | Barnes |
| 2004/0102207 A1 | 5/2004 | Wenzel |
| 2004/0131025 A1 | 7/2004 | Dohler et al. |
| 2004/0141548 A1 | 7/2004 | Shattil |
| 2004/0190484 A1 | 9/2004 | Shin et al. |
| 2005/0025099 A1 | 2/2005 | Heath et al. |
| 2005/0064908 A1 | 3/2005 | Boariu et al. |
| 2005/0088999 A1 | 4/2005 | Gibbons et al. |
| 2005/0163068 A1 | 7/2005 | Saifuddin |
| 2005/0185733 A1 | 8/2005 | Tolli et al. |
| 2005/0237989 A1* | 10/2005 | Ahn et al. ................. 370/343 |
| 2005/0286467 A1 | 12/2005 | Li Fung et al. |
| 2006/0007883 A1 | 1/2006 | Tong et al. |
| 2008/0031127 A1 | 2/2008 | Geile |
| 2008/0220776 A1 | 9/2008 | Tischer et al. |
| 2008/0248805 A1* | 10/2008 | Han et al. ................. 455/450 |
| 2009/0092037 A1 | 4/2009 | Hadad |
| 2009/0168912 A1 | 7/2009 | Li et al. |
| 2009/0274059 A1 | 11/2009 | Xing et al. |
| 2010/0040089 A1 | 2/2010 | Cimini, Jr. et al. |
| 2010/0142553 A1 | 6/2010 | Kolze |
| 2010/0260134 A1 | 10/2010 | Heath, Jr. et al. |
| 2010/0303033 A1 | 12/2010 | Shahar et al. |
| 2011/0044394 A1 | 2/2011 | Wu et al. |
| 2011/0170446 A1 | 7/2011 | Li et al. |
| 2011/0222420 A1 | 9/2011 | Li et al. |
| 2011/0255577 A1 | 10/2011 | Agee et al. |
| 2011/0312367 A1 | 12/2011 | Meiyappan |
| 2012/0069755 A1 | 3/2012 | Li et al. |
| 2013/0121199 A1 | 5/2013 | Li et al. |
| 2013/0121200 A1 | 5/2013 | Li et al. |
| 2013/0195061 A1 | 8/2013 | Li et al. |
| 2013/0195062 A1 | 8/2013 | Li et al. |

FOREIGN PATENT DOCUMENTS

| | | |
|---|---|---|
| CN | 1199298 A | 11/1998 |
| CN | 1245623 | 2/2000 |
| CN | 1272991 A | 11/2000 |
| CN | 1470145 A | 1/2004 |
| CN | 1481633 A | 3/2004 |
| DE | 198 00 953 C1 | 7/1999 |
| EP | 0 283 683 A2 | 9/1988 |
| EP | 0 660 633 A2 | 6/1995 |
| EP | 0 719 003 A2 | 6/1996 |
| EP | 0 719 062 | 6/1996 |
| EP | 0 753 948 | 1/1997 |
| EP | 0 978 962 A1 | 2/1998 |
| EP | 0 841 763 A1 | 5/1998 |
| EP | 0 869 647 A2 | 10/1998 |
| EP | 0 923 262 A1 | 6/1999 |
| EP | 0 926 912 A2 | 6/1999 |
| EP | 0 929 202 A1 | 7/1999 |
| EP | 0 932 986 | 8/1999 |
| EP | 0 946 070 A2 | 9/1999 |
| EP | 0 955 736 A2 | 11/1999 |
| EP | 0 964 596 A2 | 12/1999 |
| EP | 0 975 097 A2 | 1/2000 |
| EP | 0 999 658 A2 | 5/2000 |
| EP | 1 001 566 A1 | 5/2000 |
| EP | 1 014 609 A1 | 6/2000 |
| EP | 1 021 882 B1 | 7/2000 |
| EP | 1 047 209 A1 | 10/2000 |
| EP | 1 050 987 A1 | 11/2000 |
| EP | 1 094 644 A2 | 4/2001 |
| EP | 1 185 019 A2 | 3/2002 |
| EP | 0 882 377 B1 | 5/2005 |
| FR | 2 777 407 A1 | 10/1999 |
| GB | 2 209 858 A | 5/1989 |
| GB | 2 309 858 A | 8/1997 |
| GB | 2 346 520 A | 8/2000 |
| GB | 2 392 065 | 2/2004 |
| JP | 1-317035 | 12/1989 |
| JP | 1990-141036 | 5/1990 |
| JP | 3-11561 B | 2/1991 |
| JP | 3-167924 | 7/1991 |
| JP | 1991-167924 | 7/1991 |
| JP | 06-029922 | 2/1994 |
| JP | 6-029922 | 2/1994 |
| JP | 7-38943 | 2/1995 |
| JP | 7-170242 | 7/1995 |
| JP | 7-177569 | 7/1995 |
| JP | 7-183862 | 7/1995 |
| JP | 1995-183862 | 7/1995 |
| JP | 7-222232 A | 8/1995 |
| JP | 7-240709 | 9/1995 |
| JP | 7-250368 A | 9/1995 |
| JP | 7-250374 | 9/1995 |
| JP | 7-264110 | 10/1995 |
| JP | 07-322219 A | 12/1995 |
| JP | 7-322219 A | 12/1995 |
| JP | 8-9456 A | 1/1996 |
| JP | 8-51463 | 2/1996 |
| JP | 8-54233 A | 2/1996 |
| JP | 8-65233 | 3/1996 |
| JP | 1996-132434 | 5/1996 |
| JP | 8-186509 | 7/1996 |
| JP | 8-223107 | 8/1996 |
| JP | 08-256103 | 10/1996 |
| JP | 8-265274 | 10/1996 |
| JP | 08-265832 | 10/1996 |
| JP | 8-288795 A | 11/1996 |
| JP | 8-288796 | 11/1996 |
| JP | 9-8770 A | 1/1997 |
| JP | 9-51394 | 2/1997 |
| JP | 9-55709 | 2/1997 |
| JP | 9-64804 | 3/1997 |
| JP | 9-167982 | 6/1997 |
| JP | 9-167990 | 6/1997 |
| JP | 9-321682 | 12/1997 |
| JP | 10-22889 | 1/1998 |
| JP | 10-163994 A | 6/1998 |
| JP | 10-190621 A | 7/1998 |
| JP | 10-200474 | 7/1998 |
| JP | 10-209931 A | 8/1998 |
| JP | 10-285233 | 10/1998 |
| JP | 10-303849 A | 11/1998 |
| JP | 11-27231 | 1/1999 |

(56) References Cited

FOREIGN PATENT DOCUMENTS

| | | |
|---|---|---|
| JP | 11-32028 A | 2/1999 |
| JP | 11-41138 | 2/1999 |
| JP | 11-55210 | 2/1999 |
| JP | 11-088244 A | 3/1999 |
| JP | 11-88288 A | 3/1999 |
| JP | 11-50416 9 A | 4/1999 |
| JP | 11-113049 A | 4/1999 |
| JP | 11-136179 A | 5/1999 |
| JP | 11-308195 | 5/1999 |
| JP | 11-163822 A | 6/1999 |
| JP | 11-205026 A | 7/1999 |
| JP | 11-508417 | 7/1999 |
| JP | 11-508417 T | 7/1999 |
| JP | 1999-205848 | 7/1999 |
| JP | 11-231033 | 8/1999 |
| JP | 11-234230 | 8/1999 |
| JP | 11-239115 A | 8/1999 |
| JP | 11-251986 A | 9/1999 |
| JP | 11-275047 A | 10/1999 |
| JP | 11-289211 A | 10/1999 |
| JP | 11-289212 A | 10/1999 |
| JP | 11-289213 A | 10/1999 |
| JP | 11-289285 A | 10/1999 |
| JP | 11-298434 A | 10/1999 |
| JP | 11-308129 A | 11/1999 |
| JP | 11-308152 | 11/1999 |
| JP | 11-308153 | 11/1999 |
| JP | 11-312991 A | 11/1999 |
| JP | 11-313043 | 11/1999 |
| JP | 11-313299 | 11/1999 |
| JP | 11-346203 | 12/1999 |
| JP | 2000-13290 A | 1/2000 |
| JP | 2000-13310 | 1/2000 |
| JP | 2000-13454 A | 1/2000 |
| JP | 2000-13842 A | 1/2000 |
| JP | 2000-22611 A | 1/2000 |
| JP | 2000-22660 A | 1/2000 |
| JP | 2000-32565 A | 1/2000 |
| JP | 2000-40999 A | 2/2000 |
| JP | 2000-49663 | 2/2000 |
| JP | 2000-68975 | 3/2000 |
| JP | 2000-78111 A | 3/2000 |
| JP | 2000-78651 A | 3/2000 |
| JP | 2000-91973 | 3/2000 |
| JP | 2000-114846 | 4/2000 |
| JP | 2000-115073 A | 4/2000 |
| JP | 2000-115834 A | 4/2000 |
| JP | 2000-151484 A | 5/2000 |
| JP | 2000-174536 | 6/2000 |
| JP | 2000-183844 A | 6/2000 |
| JP | 2000-183849 A | 6/2000 |
| JP | 2000-196560 A | 7/2000 |
| JP | 2000-201134 A | 7/2000 |
| JP | 2000-209124 A | 7/2000 |
| JP | 2000-209145 | 7/2000 |
| JP | 2000-216748 A | 8/2000 |
| JP | 2000-217145 | 8/2000 |
| JP | 2000-244442 A | 9/2000 |
| JP | 2000-252734 A | 9/2000 |
| JP | 2000-269926 A | 9/2000 |
| JP | 2000-278740 | 10/2000 |
| JP | 2000-513180 A | 10/2000 |
| JP | 2000-312177 | 11/2000 |
| JP | 2000-315975 A | 11/2000 |
| JP | 2000-332724 A | 11/2000 |
| JP | 2000-341247 A | 12/2000 |
| JP | 2001-077720 | 3/2001 |
| JP | 2001-285192 A | 10/2001 |
| JP | 2002-044051 | 2/2002 |
| JP | 2002-505065 A | 2/2002 |
| JP | 2002-209145 | 7/2002 |
| JP | 2002-232936 | 8/2002 |
| JP | 2003-530010 | 10/2003 |
| JP | 2004-523934 | 8/2004 |
| JP | 3980478 B | 8/2004 |
| JP | 2004-527166 A | 9/2004 |
| JP | 2004-529524 | 9/2004 |
| JP | 4213466 B | 9/2004 |
| JP | 4201595 B | 1/2005 |
| KR | 1999-28244 | 4/1999 |
| KR | 10-2003-0015963 | 2/2003 |
| TW | 200420150 | 10/2004 |
| WO | WO 92/00590 A1 | 1/1992 |
| WO | WO 95/10144 | 4/1995 |
| WO | WO 95/17048 A1 | 6/1995 |
| WO | WO 96/00475 | 1/1996 |
| WO | WO 96/19055 A1 | 6/1996 |
| WO | WO 96/22662 A1 | 7/1996 |
| WO | WO 97/01256 A1 | 1/1997 |
| WO | WO 97/32441 | 9/1997 |
| WO | WO 97/45966 | 12/1997 |
| WO | WO 98/09381 | 3/1998 |
| WO | WO 98/15153 A1 | 4/1998 |
| WO | WO 98/16077 | 4/1998 |
| WO | WO 98/16077 A2 | 4/1998 |
| WO | WO 98/24258 | 6/1998 |
| WO | WO 98/24258 A2 | 6/1998 |
| WO | PCT/US97/23731 | 7/1998 |
| WO | WO 98/30047 A1 | 7/1998 |
| WO | WO 98/35463 | 8/1998 |
| WO | WO 98/37638 | 8/1998 |
| WO | WO 98/59517 A1 | 12/1998 |
| WO | WO 99/30520 | 6/1999 |
| WO | WO 99/40689 | 8/1999 |
| WO | WO 99/41866 | 8/1999 |
| WO | WO 99/44257 | 9/1999 |
| WO | WO 99/57820 | 11/1999 |
| WO | WO 99/63691 | 12/1999 |
| WO | WO 99/65155 A | 12/1999 |
| WO | WO 01/06689 | 6/2000 |
| WO | WO 00/79718 | 12/2000 |
| WO | WO 01/99451 A1 | 12/2001 |
| WO | WO 02/31991 A2 | 4/2002 |
| WO | WO 02/33848 | 4/2002 |
| WO | WO 02/49305 A2 | 6/2002 |
| WO | WO 02/49385 A2 | 6/2002 |
| WO | WO 02/073831 | 9/2002 |
| WO | WO 2005/060132 | 6/2005 |

OTHER PUBLICATIONS

U.S. Appl. No. 13/731,832, filed Dec. 2012, Li et al.

U.S. Appl. No. 13/801,788, filed Mar. 2013, Li et al.

U.S. Appl. No. 13/801,846, filed Mar. 2013, Li et al.

*Adaptix v. Clearwire*; Plaintiffs Second Amended Complaint; Civil Action No. 6:08-cv-460; Apr. 20, 2009; 13 pages.

*Adaptix v. Clearwire*; Defendants' Invalidity Contentions Pursuant to Patent Rules 3-3 and 3-4; Civil Action No. 6:08-cv-460; Jul. 24, 2009; 31 pages.

*Adaptix v. Motorola Mobility LLC and Cellco Partnership d/b/a Verizon Wireless*; Original Complaint for Patent Infringement; Civil Action No. 6:12cv016; Jan. 13, 2012; 7 pages.

*Adaptix v. Motorola Mobility LLC and Cellco Partnership d/b/a Verizon Wireless*; Defendant Motorola Mobility, Inc.'s Answer, Affirmative Defenses, and Counterclaims to Plaintiff's Original Complaint; Civil Action No. 6:12- cv-00016 (LED); Mar. 12, 2012; 12 pages.

*Adaptix v. Motorola Mobility LLC and Cellco Partnership d/b/a Verizon Wireless*; Plaintiff's Reply to Defendant Motorola Mobility, Inc.'s Counterclaims; Civil Action No. 6:12-cv-00016 (LED); Mar. 15, 2012; 4 pages.

*Adaptix v. Motorola Mobility LLC and Cellco Partnership d/b/a Verizon Wireless*; Answer, Defenses, and Counterclaims of Cellco Partnership d/b/a Verizon Wireless; Civil Action No. 6:12cv016; Apr. 13, 2012; 10 pages.

*Adaptix v. Motorola Mobility LLC, et al.*; Defendants' Invalidity Contentions Pursuant to Patent Rules 3-3 and 3-4; Civil Action Nos. 6:12-cv-016-LED, 6:12-cv-017-LED, 6:12-cv-019, 6:12-cv-020-LED, 6:12-cv-120-LED, 6:12- cv-121-LED, 6:12-cv-124-LED, 6:12-cv-125-LED; Jan. 10, 2013; 1033 pages.

(56) References Cited

OTHER PUBLICATIONS

*Adaptix v. Pantech Wireless, Inc. and Cellco Partnership d/b/a Verizon Wireless*; Original Complaint for Patent Infringement; Civil Action No. 6:12cv20; Jan. 13, 2012; 7 pages.
*Adaptix v. Pantech Wireless, Inc. and Cellco Partnership d/b/a Verizon Wireless*; Defendant Pantech Wireless, Inc.'s Answer, Affirmative Defenses, and Counterclaims to Adaptix, Inc.'s Original Complaint; Civil Action No. 6:12-Cv-00020-LED; Mar. 22, 2012;12 pages.
*Adaptix v. Pantech Wireless, Inc. and Cellco Partnership d/b/a Verizon Wireless*; Plaintiff's Reply to Defendant Pantech Wireless, Inc.'s Counterclaims; Civil Action No. 6:12-cv-00020 (LED); Mar. 26, 2012; 4 pages.
*Adaptix v. Pantech Wireless, Inc. and Cellco Partnership d/b/a Verizon Wireless*; Answer, Defenses, and Counterclaims of Cellco Partnership d/b/a Verizon Wireless; Civil Action No. 6:12-cv-0020; Apr. 13, 2012;10 pages.
*Adaptix v. Pantech Wireless, Inc. and Cellco Partnership d/b/a Verizon Wireless*; Plaintiff's Reply to Counterclaims of Cellco Partnership d/b/a Verizon Wireless; Civil Action No. 6:12-cv-0020 (LED); May 2, 2012; 5 pages.
*Adaptix v. Alcatel-Lucent USA, Inc. and AT&T, Inc., AT&T Mobility LLC, Cellco Partnership d/b/a Verizon Wireless and Sprint Spectrum L.P.*; Original Complaint for Patent Infringement; Civil Action No. 6:12cv22; Jan. 13, 2012; 15 pages.
*Adaptix v. Alcatel-Lucent USA, Inc. and AT&T, Inc., AT&T Mobility LLC, Cellco Partnership d/b/a Verizon Wireless and Sprint Spectrum L.P.*; Defendant Alcatel-Lucent USA, Inc.'s Answer and Affirmative Defenses; Civil Action No. 6:12-cv-0022; Mar. 12, 2012; 23 pages.
*Adaptix v. Alcatel-Lucent USA, Inc. and AT&T Mobility LLC*; Defandant AT&T Mobilitys Answer and Defenses; Civil Action No. 6:12-cv-0022; Mar. 26, 2012; 23 pages.
*Adaptix v. Alcatel-Lucent USA, Inc. and AT&T Mobility LLC*; Defendants' Invalidity Contentions; Civil Action No. 6:12-cv-0022; Sep. 28, 2012; 20 pages.
*Adaptix v. Alcatel-Lucent USA, Inc.*, Defendants' Invalidity Contentions for U.S. Patent No. 6,904,283, Exhibit A-1 Corrected Claim Charts; Civil Action No. 6:12-cv-0022; Sep. 28, 2012; 1070 pages.
*Adaptix v. Alcatel-Lucent USA, Inc. and AT&T Mobility LLC*, Defendant's Invalidity Contentions and Claim Charts; Civil Action No. 6:12-cv-0022; Sep. 28, 2012; 1192 pages.
*Adaptix v. Alcatel-Lucent USA, Inc. and AT&T Mobility LLC*; Defendant Alcatel-Lucent USA, Inc.'s First Amended Answer, Affirmative Defenses, and Counterclaims; Civil Action No. 6:12-cv-0022; May 1, 2012; 29 pages.
*Adaptix v. Alcatel-Lucent USA, Inc. and AT&T Mobility LLC*; Plaintiff's Reply to the First Amended Answer, Affirmative Defenses, and Counterclaims of Defendant Alcatel-Lucent USA, Inc.; Civil Action No. 6:12-cv-0022 (LED); May 8, 2012; 6 pages.
*Adaptix v. Cellco Partnership d/b/a Verizon Wireless, LG Electronics, Inc. and LG Electronics USA, Inc.*; Original Complaint for Patent Infringement; Civil Action No. 6:12cv120; Mar. 9, 2012; 49 pages.
*Adaptix v. Cellco Partnership d/b/a Verizon Wireless, LG Electronics, Inc. and LG Electronics USA, Inc.*; Answer, Defenses, and Counterclaims of Cellco Partnership d/b/a Verizon Wireless; Civil Action No. 6:12-cv0120; Apr. 13, 2012; 10 pages.
*Adaptix v. Cellco Partnership d/b/a Verizon Wireless, LG Electronics, Inc. and LG Electronics USA, Inc.*; Plaintiff's Reply to Counterclaims of Defendant Cellco Partnership d/b/a Verizon Wireless; Civil Action No. 6:12-cv-0120 (Led); May 2, 2012; 5 pages.
*Adaptix v. Cellco Partnership d/b/a Verizon Wireless, LG Electronics, Inc. and LG Electronics USA, Inc.*; Defendants LG Electronics, Inc. and LG Electronics USA, Inc.'s Answer to Plaintiff Adaptix, Inc.'s Complaint for Patent Infringement; Civil Action No. 6:12-CV-120; Jun. 1, 2012; 17 pages.
*Adaptix v. Cellco Partnership d/b/a Verizon Wireless, LG Electronics, Inc. and LG Electronics USA, Inc.*; Plaintiff's Reply to the Counterclaims of Defendants LG Electronics, Inc. and LG Electronics USA, Inc.; Civil Action No. 6:12-cv-00120 (LED); Jun. 6, 2012; 4 pages.

*Adaptix v. Cellco Partnership d/b/a Verizon Wireless, HTC Corporation and HTC America, Inc.*; Original Complaint for Patent Infringement; Civil Action No. 6:12cv121; Mar. 9, 2012; 49 pages.
*Adaptix v. Cellco Partnership d/b/a Verizon Wireless, HTC Corporation and HTC America, Inc.*; Answer, Defenses, and Counterclaims of Cellco Partnership d/b/a Verizon Wireless; Civil Action No. 6:12-cv-0121; Apr. 13, 2012; 10 pages.
*Adaptix v. Cellco Partnership d/b/a Verizon Wireless, HTC Corporation and HTC America, Inc.*; Plaintiff's Reply to Counterclaims of Defendant Cellco Partnership d/b/a Verizon Wireless; Civil Action No. 6:12-cv-000121 (LED); May 2, 2012; 5 pages.
*Adaptix v. Cellco Partnership d/b/a Verizon Wireless, HTC Corporation and HTC America, Inc.*; Defendant HTC Corporation's Answer to Original Complaint; Civil Action No. 6:12-cv-00121-LED; Jun. 1, 2012; 8 pages.
*Adaptix v. Cellco Partnership d/b/a Verizon Wireless, HTC Corporation and HTC America, Inc.*; Defendant HTC America, Inc.'s Answer to Original Complaint; Civil Action No. 6:12-cv-00121-LED; Jun. 1, 2012; 8 pages.
*Adaptix v. Alcatel-Lucent USA, Inc. and Cellco Partnership d/b/a Verizon Wireless*; Original Complaint for Patent Infringement; Civil Action No. 6:12cv122; Mar. 9, 2012; 110 pages.
*Adaptix v. Alcatel-Lucent USA, Inc. and Cellco Partnership d/b/a Verizon Wireless*; Defendant Alcatel-Lucent USA, Inc.'s Answer and Affirmative Defenses; Civil Action No. 6:12-cv-0122; Apr. 10, 2012; 19 pages.
*Adaptix v. Alcatel-Lucent USA, Inc. and Cellco Partnership d/b/a Verizon Wireless*; Answer, Defenses, and Counterclaims of Cellco Partnership d/b/a Verizon Wireless; Civil Action No. 6:12-cv-0122; Apr. 13, 2012; 15 pages.
*Adaptix v. Alcatel-Lucent USA, Inc. and Cellco Partnership d/b/a Verizon Wireless*; Plaintiff's Reply to Counterclaims of Defendant Cellco Partnership d/b/a Verizon Wireless; Civil Action No. 6:12-cv-0122 (LED); May 2, 2012; 6 pages.
*Adaptix v. Alcatel-Lucent USA, Inc. and Sprint Spectrum L.P.*; Original Complaint for Patent Infringement; Civil Action No. 6:12cv123; Mar. 9, 2012; 110 pages.
*Adaptix v. Alcatel-Lucent USA, Inc. and Sprint Spectrum L.P.*; Defendant Alcatel-Lucent USA, Inc.'s Answer and Affirmative Defenses; Civil Action No. 6:12-cv-0123; Apr. 10, 2012; 19 pages.
*Adaptix v. Alcatel-Lucent USA, Inc. and Sprint Spectrum L.P.*; Defendant Sprint Spectrum L.P.'s Answer and Affirmative Defenses; Civil Action No. 6:12-cv-0123; Apr. 30, 2012; 15 pages.
*Adaptix v. Apple, Inc., and Cellco Partnership d/b/a Verizon Wireless*; Original Complaint for Patent Infringement; Civil Action No. 6:12cv124; Mar. 9, 2012; 50 pages.
*Adaptix v. Apple, Inc., and Cellco Partnership dlb/a Verizon Wireless*; Answer, Defenses, and Counterclaims of Cellco Partnership d/b/a Verizon Wireless; Civil Action No. 6:12-cv-0124; Apr. 13, 2012; 10 pages.
*Adaptix v. Apple, Inc., and Cellco Partnership d/b/a Verizon Wireless*; Plaintiff's Reply to Counterclaims of Defendant Cellco Partnership d/b/a Verizon Wireless; Civil Action No. 6:12-cv-000124 (LED); May 2, 2012; 5 pages.
*Adaptix v. Apple, Inc., and Cellco Partnership d/b/a Verizon Wireless*; Apple Inc.'s Answer, Defenses, and Counterclaims to Plaintiff's Original Complaint for Patent Infringement; Civil Action No. 6:12-cv-0124; May 24, 2012; 11 pages.
*Adaptix v. Apple, Inc., AT&T, Inc. and AT&T Mobility LLC*; Original Complaint for Patent Infringement; Civil Action No. 6:12cv125; Mar. 9, 2012; 50 pages.
*Adaptix v. Apple, Inc., and AT&T Mobility LLC*; Defendant AT&T Mobility LLC's Answer to Adaptix, Inc.'s Original Complaint; Civil Action No. 6:12-cv-00125-LED; May 24, 2012; 9 pages.
*Adaptix v. Apple, Inc., AT&T, Inc., and AT&T Mobility LLC*; Apple Inc.'s Answer, Defenses, and Counterclaims to Plaintiff's Original Complaint for Patent Infringement; Civil Action No. 6:12-cv-0125; May 24, 2012; 11 pages.
*Adaptix v. AT&T, Inc., AT&T Mobility LLC, LG Electronics, Inc. and LG Electronics USA, Inc.*; First Amended Complaint for Patent Infringement; Civil Action No. 6:12cv17; Mar. 9, 2012; 49 pages.
*Adaptix v. AT&T, Inc., AT&T Mobility LLC, LG Electronics, Inc. and LG Electronics USA, Inc.*; Defendant AT&T Mobility LLC's Answer

(56) References Cited

OTHER PUBLICATIONS to Plaintiff Adaptix, Inc.'s First Amended Complaint for Patent Infringement; Civil Action No. 6:12-cv-17; May 10, 2012; 12 pages.
*Adaptix v. AT&T, Inc., AT&T Mobility LLC, LG Electronics, Inc. and LG Electronics USA, Inc.*; Defendants LG Electronics, Inc. and LG Electronics USA, Inc.'s Answer to Plaintiff Adaptix, Inc.'s First Amended Complaint for Patent Infringement; Civil Action No. 6:12-cv-17; Jun. 1, 2012; 17 pages.
*Adaptix v. AT&T, Inc., AT&T Mobility LLC, LG Electronics, Inc. and LG Electronics USA, Inc.*; Plaintiff's Reply to the Counterclaims of Defendants LG Electronics, Inc. and LG Electronics USA, Inc.'s; Civil Action No. 6:12-cv00017 (LED); Jun. 6, 2012; 4 pages.
*Adaptix v. AT&T, Inc., AT&T Mobility LLC, HTC Corporation and HTC America, Inc.*; First Amended Complaint for Patent Infringement; Civil Action No. 6:12CV019; Mar. 9, 2012; 49 pages.
*Adaptix v. AT&T Mobility LLC, HTC Corporation and HTC America, Inc.*; Defendant AT&T Mobility LLC's Answer to Adaptix, Inc.'s First Amended Complaint; Civil Action No. 6:12-cv-00019 (LED); May 10, 2012; 9 pages.
*Adaptix v. AT&T Mobility LLC, HTC Corporation and HTC America, Inc.*; Defendant HTC America, Inc.'s Answer to First Amended Complaint; Civil Action No. 6:12-cv-00019-LED; Jun. 1, 2012; 8 pages.
*Adaptix v. AT&T Mobility LLC, HTC Corporation and HTC America, Inc.*; Defendant HTC Corporation's Answer to First Amended Complaint; Civil Action No. 6:12-cv-00019-LED; Jun. 1, 2012; 8 pages.
*Adaptix v. Nokia Siemens Networks US, LLC, Lightsquared, Inc., and Lightsquared GP, Inc.*; Original Complaint for Patent Infringement; Civil Action No. 6:12cv21; Jan. 13, 2012; 11 pages.
*Adaptix v. Nokia Siemens Networks US, LLC, Lightsquared, Inc., and Lightsquared GP, Inc.*; Plaintiff's Notice of Dismissal; Civil Action No. 6:12-cv-00021; Jun. 5, 2012; 3 pages.
*Adaptix v. Nokia Siemens Networks US, LLC, and T-Mobile USA, Inc.*; Original Complaint for Patent Infringement; Civil Action No. 6:12-cv-318; May 11, 2012; 111 pages.
*Adaptix v. Nokia Siemens Networks US, LLC, and T-Mobile USA, Inc.*; Plaintiff's Notice of Dismissal; Civil Action No. 6:12-cv-00318; Jun. 5, 2012; 2 pages.
*Adaptix v. T-Mobile USA, Inc.*; Original Complaint for Patent Infringement; Civil Action No. 6:12-cv-369; Jun. 5, 2012; 109 pages.
*Adaptix v. T-Mobile USA, Inc.*; Defendant T-Mobile USA, Inc.'s Answer and Counterclaims to Plaintiff's Complaint; Civil Action No. 6:12-cv-369-LED; Dec. 21, 2012; 11 pages.
*Adaptix v. T-Mobile USA, Inc.*; Plaintiff's Reply to Defendant T-Mobile, Inc.'s Counterclaims; Civil Action No. 6:12-cv-00369 (LED); Dec. 31, 2012; 4 pages.
*Adaptix v. Apple, Inc., AT&T, Inc. and AT&T Mobility LLC*; Original Complaint for Patent Infringement; Civil Action No. 6:13-cv-28; Jan. 4, 2013; 48 pages.
Alouini, Mohamed-Slim, et al.; "An Adaptive Modulation Scheme for Simultaneous Voice and Data Transmission Over Fading Channels;" IEEE; Dec. 1997; 32 pages.
Armstrong, Jean, et al.; "Polynomial Cancellation Coding of OFDM to Reduce Intercarrier Interference Due to Doppler Spread;" IEEE; 1998; pp. 2771-2776.
Arvelo, Physical Layer DSP Design of a Wireless Gigabit/s Indoor LAN (May 2000).
IEEE Computer Society, "Part 11: Wireless LAN Medium Access Control (MAC) and Physical Layer (PHY) specifications: High-Speed Physical Layer in the 5 GHZ Band", IEEE Std 802.11a-1999, IEEE Supplement, Sep. 16, 1999, 90 pgs.
Balachandran, Krishna; Channel Quality Estimation and Rate Adaptation for Cellular Mobile Radio; IEEE Journal on Selected Areas in Communications; Jul. 1, 1999.
Bender et al., CDMA/HDR: A Bandwidth-Efficient High-Speed Wireless Data Service for Nomadic Users, IEEE Communications Magazine, Jul. 2000, pp. 70-87.

Blogh, J.S., et al.; "Dynamic Channel Allocation Techniques Using Adaptive Modulation and Adaptive Antennas;" IEEE VTC; 1999; 5 pages.
Cheng and Verdu, "Gaussian Multiaccess Channels with ISI: Capacity Region and Multiuser Water-Filling," IEEE Trans. Info. Theory, vol. 39(3), pp. 773-785, May 1993.
Chinese Office Action issued for 01817199.0 dated Apr. 22, 2005; 10 pages.
Chow, J., et al., "A Discrete Multitone Transceiver System for HDSL Applications," IEEE Journal on Selected Areas in Communications, vol. 9, No. 6, Aug. 1991, pp. 895-908.
Chuang and Sollenberger, "Beyond 3G: Wideband Wireless Data Access Based on OFDM and Dynamic Packet Assigment," IEEE Communications Magazine, vol. 38, No. 7, pp. 78-87, Jul. 2000.
Chuang, et al., "Power Control for Dynamic Packet Assignment in Advanced Cellular Internet Service," IEEE VTC '98 at 1750 (1998).
Chuang et al., "Wideband Wireless Data Access Based on OFDM and Dynamic Packet Assignment", IEEE 0-7803-5668-3/99, Sep. 21, 1999, 5 pgs.
Cimini, Jr., et al.; "Advanced Cellular Internet Service (ACIS);" IEEE Communications; Oct. 1998.
Cimini, et al., "Clustered OFDM with transmitter diversity and coding," 1996.
Cimini, Jr., "Analysis and Simulation of a Digital Mobile Channel Using Orthogonal Frequency Division Multiplexing," IEEE Trans. Commun., vol. COM-33, No. 7, Jul. 1985, pp. 665-675.
Czylwik, Adreas, "Adaptive OFDM for Wideband Radio Channels", IEEE 0-7803-3336-5/96, copyright 1996, 6 pgs.
Doufexi et al., "A Comparison of HIPERLAN/2 and IEEE 802.11a Physical and MAC Layers", IEEE 0-7803-6684-0/00, copyright 2000, 7 pgs.
English translation of Japanese Office Action for Application No. 2002-550683, dispatched May 7, 2007, 2 pgs.
English translation of Japanese Office Action for Application No. 2002-550747, dispatched May 21, 2007, 4 pgs.
English translation of Japanese Office Action issued for Japanese Application No. 2004-551,367; dated Mar. 4, 2008; 2 pages.
English Translation of the Office Action issued for Chinese Patent Application No. 200610081062.5, dated Apr. 3, 2009; 7 pages.
Ericson et al., "Evaluation of the Mixed Service Ability for Competitive Third Generation Multiple Access Technologies", IEEE 0-7803-3659-3/97, copyright 1997, 4 pgs.
European Office Action from Application No. 01 986 165.7, dated Mar. 29, 2007, 5 pgs.
European Telecommunications Standards Institute ("ETSI"), Universal Mobile Telecommunications System (UMTS); UMTS Terrestrial Radio Access (UTRA); Concept Evaluation (UMTS 30.06 version 3.0.0), TR 101 146 V3.0.0; Dec. 1997; 689 pgs.
Extended European Search Report issued for European Application No. 08105483.5, Jan. 21, 2009, 8 pages.
Extended European Search Report issued for European Application No. 05826452.4, Apr. 23, 2010, 6 pages.
Farsakh, C. et al., "Maximizing the SDMA Mobile Radio Capacity Increase by DOA Sensitive Channel Allocation," Wireless Personal Communications, Kluwer Academic Publishers, NL, vol. 11, No. 1. Oct. 1999, pp. 63-76, XP000835062, ISSN: 0929-6212.
Farsakh, Cristof and Nossek, Josef A., "A Real Time Downlink Channel Allocation Scheme for an SDMA Mobile Radio System", IEEE 1996.
Farsakh, Cristof and Nossek, Josef A., "Channel Allocation and Downlink Beamforming in an SDMA Mobile Radio System", IEEE 1995.
Farsakh, Cristof and Nossek, Josef A., "On the Mobile Radio Capacity Increase through SDMA," Accessing, Transmission, Networking Proceedings, pp. 293-297, 1998.
Frullone et al., PRMA Performance in Cellular Environments with Self-Adaptive Channel Allocation Strategies, IEEE Transactions on Vehicular Technology, Nov. 1996, pp. 657-665, vol. 45, No. 4.
Goldsmith et al., "Adaptive Coded Modulation for Fading Channels", IEEE Transactions on Communications, vol. 46, No. 5, May 1998, 8 pgs.

(56) References Cited

OTHER PUBLICATIONS

Goldsmith et al., "Variable-Rate Variable-Power MQAM for Fading Channels", IEEE Transactions on Communications, vol. 45, No. 10, Oct. 1997, 13 pgs.

Goodman, "Second Generation Wireless Information Networks," IEEE Trans. of Veh. Tech., vol. 40, No. 2, May 1991.

Gourgue, F., "Air Interface of the Future European Fully Digital Trunk Radio System," Institute of Electrical and Electronics Engineers Personal Communication—Freedom through Wireless Technology; Secaucus, NJ, May 18-20, 1993 (Proceedings of Vehicular Technology Conference), New York, 1993 IEEE, US, pp. 714-716.

Grunheid, R. et al: "Adaptive Modulation and Multiple Access for the OFDM Transmission Technique," Wireless Personal Communications, Kluwer Academic Publishers, NL, vol. 13, NR. 1/2, Year 2000, pp. 5-13 XP000894156, ISSN: 0929-6212.

Hadad, et al., "Initial OFDMA/OFDMA PHY proposal for the 802.16.3 BWA", IEEE 802.16.3c-00/34 (Oct. 30, 2000).

Hirosaki, "An Orthogonally Multiplexed QAM System Using the Discrete Fourier Transform," IEEE Trans. Communications, vol. 29, Jul. 1981, pp. 982-989.

Hrasnica et al.; "Modeling MAC Layer for Powerline Communications Networks;" SPIE Symposium on Information Technology, Internet, Performance, and Control of Network Systems; Nov. 2000.

Hrasnica et al.; "Powerline Communications for Access Networks;"—Performance Study of the MAC Layer—; 10 pages.

Heath et al., "Coordinated Training and Transmission for Improved Interference Cancellation in a Cellular Network", IEEE 0-7803-6514-3/00, copyright 2000, 7 pgs.

IEEE Computer Society and the IEEE Microwave and Techniques Society, Part 16: Air Interface for Fixed Broadband Wireless Access Systems, IEEE Std 802.16-2004, IEEE, Oct. 2004, 895 Pages.

IEEE Computer Society and the IEEE Microwave and Techniques Society, Part 16: Air Interface for Fixed Broadband Wireless Access Systems, IEEE Std 802.16-2004, IEEE, Oct. 2004, pp. 167-213.

International Search Report issued for PCT/US02/36030 dated Jun. 26, 2003; 1 page.

International Search Report & Written Opinion issued for PCT/US05/44156 dated Oct. 26, 2006; 5 pages.

Jafar et al., "Optimal Rate and Power Adaptation for Multirate CDMA", Stanford University, Wireless Systems Laboratory, 2000, 7 pgs.

Japanese Office Action issued for JP 2004-551367, dated Jan. 6, 2009, 3 pages.

Johnsson, Martin, "HiperLAN/2—The Broadband Radio Transmission Technology Operating in the 5 GHz Frequency Band", Global Forum, 1999, 22 pgs.

Kapoor, S. et al.: "Adaptive Interference Suppression in Multiuser Wireless, OFDM Systems Using Antenna Arrays," IEEE Transactions on Signal Processing, vol. 47, No. 12, Dec. 1999, pp. 3381-3391, XP000935422, IEEE, NY, USA, ISSN: 1053-587X.

Katzela et al., "Channel Assignment Schemes for Cellular Mobile Telecommunication Systems: A Comprehensive Survey", IEEE 1070-9916/96, copyright 1996, 22 pgs.

Keller et al., "Adaptive Modulation Techniques for Duplex OFDM Transmission", Department of Electronics and Computer Science, University of Southhampton, Jun. 7, 1999, 14 pages.

Keller et al., "Adaptive Modulation Techniques for Duplex OFDM Transmission", IEEE vol. 49, No. 5, Sep. 2000, 14 pgs.

Keller, Thomas, et al.; "Adaptive Multicarrier Modulation: A Convenient Framework for Time-Frequency Processing in Wireless Communications;" Proceedings of the IEEE, vol. 88; May 5, 2000.

Kerpez, Kenneth J., "The Channel Capacity of Hybrid Fiber/Coax (HFC) Networks," Information Theory, 1995, Proceedings 1995 IEEE International Symposium on Whistler, BC, Canada, Sep. 17-22, 1995,p. 481.

Kim, et al., "Performance Analysis of an MC-CDMA System with Atenna Array in a Fading Channel," (2000).

Kim, et al., "Spatial Multiuser Access OFDM with Antenna Diversity and Power Control," IEEE VTC 2000 at 273 (2000).

Kinugawa, Y.et al.: "Frequency and Time Division Multiple Access with Demand-Assignment Using Multicarrier Modulation for Indoor Wireless Communications Systems," IEICE Transactions on Communications, Institute of Electronics Information and Comm. Eng. Tokyo, Japan, vol. E77-B, No. 3, Mar. 1994, pp. 396-402, XP000451014, ISSN: 0916-8516.

Kivanc et al., "Subcarrier Allocation and Power control for OFDMA", IEEE 0-7803-6514-3/00, copyright 2000, 5 pgs.

Knopp et al., "Information Capacity and Power Control in Single-Cell Multiuser Communications", IEEE 0-78032486-2/95, copyright 1995, 5 pgs.

Kojima, Fumihide, et al. "Adaptive Sub-Carriers Control Scheme for OFDM Cellular Systems", IEEE 51st Vehicular Technology Conference Proceedings, May 18, 2000, at p. 1065.

Korean Office Action issued for 2003-7007962 dated Apr. 28, 2006.

Korean Office Action issued for 2003-7007963 dated Apr. 29, 2006.

Lawrey, Eric; "Multiuser OFDM;" International Symposium on Signal Processing and its Applications; Aug. 22, 1999; pp. 761-764.

Lawrey, Eric, et al.; "Adaptive Frequency Hopping for Multiuser OFDM;" Second International Conference on Information Communication & Signal Processing; Dec. 7, 1999; 5 pages.

Lazaro, O., et al.; "Dynamic Channel Allocation Based on a Hopfield Neural Network and Requirements for Autonomous Operation in a Distributed Environment;" 1999; 5 pages.

Li et al., "A New Blind Receiver for Downlink DS-CDMA Communications", IEEE vol. 3, No. 7, Jul. 1999, 3 pgs.

Li et al., "Channel Estimation for OFDM Systems with Transmitter Diversity in Mobile Wireless Channels", IEEE 0733-8716/995, copyright 1999, 11 pgs.

Li et al., "Clustered OFDM with Channel Estimation for High Rate Wireless Data", 1999 IEEE International Workshop, Nov. 15-17, 1999, 9 pgs.

Li et al., "Effects of Clipping and Filtering on the Performance of OFDM", IEEE 0-7803-3659-3/97, copyright 1997, 5 pgs.

Li et al., "Effects of Clipping and Filtering on the Performance of OFDM", IEEE Conference on Vehicular Technology, 1997, 3 pgs.

Li et al., "Maximum-Likelihood Estimation of OFDM Carrier Frequency Offset for Fading Channels", IEEE 1058-6393/98, copyright 1998, 5 pgs.

Li et al., "M-Sequences for OFDM Peak-to-Average Power Ratio Reduction and Error Correction", Electronics Letters, vol. 33, No. 7, Mar. 27, 1997, 2 pgs.

Li, Ye; "Pilot-Symbol-Aided Channel Estimation for OFDM in Wireless System;" 1999 IEEE 49th Vehicular Technology Conference, vol. 2, pp. 1131-1135.

Li et al., "Robust transforms for channel estimator in clustered OFDM for high rate wireless data", IEEE (2000).

Liu, Hui, et al.; "An Efficient Multiuser Loading Algorithm for OFDM-Based Broadband Wireless Systems;" Nov. 27, 2000.

Liu et al., "Efficient Network Utilization for Multimedia Wireless Networks", C.G Omidyar (Ed.), MWCN 2000, copyright 2000, 15 pgs.

Luise et al., "Carrier Frequency Acquisition and Tracking for OFDM Systems", IEEE 0090-6778/96, copyright 1996, 9 pgs.

Maeda, Noriyuki et al., "A Delay Profile Information Based Subcarrier Power Control Combined With a Partial Non-Power Allocation Technique for OFDM/FDD Systems" IEEE, 2000.

Maehata et al., "DSRC Using OFDM for Roadside-Vehicle Communication System", IEEE 0-7803-5718-3/00, copyright 2000, 5 pgs.

Matsui et al., "OFDMA/TDD Packet Transmission System with an Adaptive Subcarrier Selection Scheme for Asymmetric Wireless Communication Services", IEEE 0-803-6622-0/01, copyright 2001, 2 pgs.

Mehta et al., "Performance Analysis of Link Adaptation in Wireless Data Networks", Department of Electrical Engineering, Stanford University, Mar. 6, 2000 15 pgs.

Mehta et al., "Performance Analysis of Link Adaptation in Wireless Data Networks", 2000 Global Telecomm. Conf. 1422 (Nov. 27, 2000).

Mexican Office Action issued for PA/a/2003/005311 dated Mar. 31, 2006.

(56) References Cited

OTHER PUBLICATIONS

Mignone et al., CD3-OFDM: A Novel Demodulation Scheme for Fixed and Mobile Receivers, IEEE Transactions on Communications, vol. 44, No. 9, Sep. 1996; pp. 1144-1151.
Motegi, M. et al.: Optimum Band Allocation According to Subband Condition for BST-OFDM 11th IEEE International Symposium on Personal Indoor and Mobile Radio Communications, vol. 2, Sep. 18-21, 2000, pp. 1236-1240, XP002213669, Piscataway, NJ, USA, ISBN: 0-7803-6465-5.
Munster, M., et al.; "Co-Channel Interference Suppression Assisted Adaptive OFDM in Interference Limited Environments;" IEEE; Sep. 17, 1999; pp. 284-288.
Naguib, F., et al., "A Space-Time Coding Modem for High-Data-Rate Wireless Communications," IEEE Journal on Selected Areas in Communications, vol. 16, No. 8, Oct. 1998, pp. 1459-1478.
Nogueroles et al., "Improved Performance of a Random OFDMA Mobile Communication System", IEEE 0-7803-4320-4/98, copyright 1998, 5 pgs.
Nogueroles et al., "Performance of a Random OFDMA System for Mobile Communications", IEEE 0-7803-3893-6/98, copyright 1998, 7 pgs.
Nogueroles, R. et al.: Improved Performance of a Random OFDMA Mobile Communication System: Vehicular Technology Conference, 1998. VTC 98. 48th IEEE Ottawa, Ontario, Canada, May 18-21, 1998, pp. 2502-2506, XP010288120, ISBN: 0-7803-4320-4.
Office Action issued for Chinese Patent Application No. 200580041761.0, dated Nov. 27, 2009; 3 pages.
Office Action issued for Chinese Patent Application No. 200610081062.5, dated Apr. 3, 2009; English Translation; 7 pages.
Office Action issued for Israeli Patent Application No. 168458, issued on Jun. 23, 2009, and the English language translation, 4 pages.
Office Action issued for Japanese Patent Application No. 2007-544620, dated May 19, 2011, 6 pages (with English translation).
Office Action issued for Japanese Patent Application No. 2008-182746, dated Apr. 21, 2011, 6 pages (with English translation).
Office Action issued for Japanese Patent Application No. 2008-193243, dated Apr. 21, 2011, 4 pages (with English translation).
Office Action issued for Korean Patent Application No. 2003-7007961, dated Sep. 27, 2006.
Office Action issued for ROC (Taiwan) No. 094143279, dated Aug. 15, 2011, 19 pages with English translation.
Ohgane, Takeo et al., "A Study on a Channel Allocation Scheme with an Adaptive Array in SDMA", IEEE 1997.
Olfat et al., "Adaptive Beamforming and Power Allocation for OFDM Over Wireless Networks", IEEE 0-7803-5148-7/98, copyright 1998, 5 pgs.
Olfat, Masoud, et al., "Low Complexity Adaptive Beamforming and Power Allocation for OFDM Over Wireless Networks," 1999 IEEE International Conference on Communications, Jun. 6, 1999, p. 523.
Papavassiliou et al., "Improving the Capacity in Wireless Networks Through Integrated Channel Base Station and Power Assignment", IEEE, 1998.
Papavassiliou et al., "Joint Optimal Channel Base Station and Power Assignment for Wireless Access", Polytechnic University, Published Jun. 17, 1996, 35 pgs.
Partial European Search Report issued for EP10175770.6, dated May 12, 2011, 7 pages.
Pietrzyk et al., "Multiuser Subcarrier Allocation for QoS Provision in the OFDMA Systems", IEEE 0-7803-7467-3/02, copyright 2002, 5 pgs.
Piolini, Flavio et al., "Smart Channel-Assignment Algorithm for SDMA Systems", IEEE Transactions on Microwave Theory and Techniques, vol. 47, No. 6, Jun. 1999.
PCT Written Opinion mailed Sep. 18, 2003, International Application No. PCT/US01/31766 (4 pages).
Priscoli, Basic Issues on Dynamic Allocation of PRMA Carriers, IEEE (1995).

Rhee et al., "Increase in Capacity of Multiuser OFDM System Using Dynamic Subchannel Allocation", IEEE 0-7803-5718-3/00, copyright 2000, 5 pgs.
Ritter, Gerhard; "Procedure and Radio Communication System to Allocate the Radio Resources of a Radio Interface;" Jun. 2007; Translated by: Schreiber Translations inc.; 38 pages.
Robertson et al., "The Effects of Doppler Spreads in OFDM(A) Mobile Radio Systems", IEEE 0-7803-5435-4, copyright 1999, Institute for Communications Technology, German Aerospace Center (DLR), 5 pgs.
Rohling et al., "Adaptive Coding and Modulation in an OFDM-TDMA Communication System", IEEE 0-7803-4320-4/98, copyright 1998, 4 pgs.
Rohling et al., "Performance Comparsion of Different Multiple Access Schemes for the Downlink of an OFDM Communication System", IEEE 0-7803-3659-3/97, copyright 1997, 5 pgs.
Sari and Karam, "Orthogonal Frequency-Division Multiple Access and its Application to CATV Networks," European Transactions on Telecommunications, vol. 9 (6), pp. 507-516, Nov./Dec. 1998.
Sari et al., "An Analysis of Orthogonal Frequency-Division Multiple Access", IEEE 0-7803-4198-8/97, copyright 1997, 5 pgs.
Sari, Hikmet, "Trends and Challenges in Broadband Wireless Access", IEEE 0-7803-6684-0/00, copyright 2000, 5 pgs.
Sartenaer et al., "Resource Allocation for Frequency-Selective Multiple Access Channels with Adaptive QAM Modulation", IEEE 0-7803-6684-00, copyright 2000, 8 pgs.
Sathananthan et al., "Analysis of OFDM in the Presence of Frequency Offset and a Method to Reduce Performance Degradation", 0-7803-6451-1/00, copyright 2000, 5 pgs.
Sandell, Magnus, et al., "A Comparative Study of Pilot Based Channel Estimators for Wireless OFDM", published in Research Report TULEA 1996:19, Division of Signal Processing, Lulea University of Technology, Sep. 1996.
Saunders, et al.: Antennas and Propagation for Wireless Communication Systems, 1999.
Schmidt, Heiko, et al.; "Reducing the Peak to Average Power Ratio of Multicarrier Signals by Adaptive Subcarrier Selection;" IEEE; 1998; pp. 933-937.
Seong-Jun Oh et al., "Adaptive Resoource Allocation in Power Constrained CDMA Mobile Networks", IEEE 0-7803-5668-3/99, copyright 1999, 5 pgs.
Shad et al., Indoor SDMA Capacity Using a Smart Antenna Basestation, 1997 IEEE, pp. 868-872.
Sollenberger et al., "Receiver Structures for Multiple Access OFDM", IEEE 0-7803-5565-2/99, copyright 1999, 5 pgs.
Sung et al., "User Speed Estimation and Dynamic Channel Allocation in Hierarchical Cellular System", IEEE 0-7803-1927-3/94, copyright 1994, 5 pgs.
Supplemental European Search Report issued for EP 02808132, dated May 2, 2007; 3 pages.
Tang et al., "An Adaptive Modulation Scheme for Simultaneous Voice and Data Transmission Over Fading Channels", IEEE Vehicular Technology Conference (VTC '98), draft dated Dec. 1, 1997, 32 pgs.
Toba et al., "A Demand-Assign Optical Frequency-Division-Multiple-Access Star Network", Journal of Lightwave Technology, vol. 11, No. 56, May/Jun. 1993, 7 pgs.
Tonello, A., et al.; "Analysis of the Uplink of an Asynchronous Multi-User DMT OFDMA System Impaired by Time Offsets, Frequency Offsets, and Multi-Path Fading;" 52nd Vehicular Technology Conference (IEEE VTS Fall VTC 2000), vol. 3, 2000, pp. 1094-1099.
Toufik & Knopp, "Multiuser Channel Allocation Algorithims Achieving Hard Fairness", Dept. of Mobile Communications Eurecom Institute, QoS Seminaire (Nov. 26, 2004).
Tralli, V., et al.; "Adaptive C-OFDM System at 30 GHz for the Last Mile Wireless Broadband Access to Interactive Services;" Jun. 1998; pp. 1314-1319.
Tse and Hanly, "Multiaccess Fading Channels—Part I: Polymatriod Structure, Optimal Resource Allocation and Throughput Capacities," IEEE Trans. Info. Theory, vol. 44(7), pp. 2796-2815, Nov. 1998.
Tsoulos, G.V., Smart Antennas for Mobile Communication Systems: Benefits and Challenges, Electronics & Communication Engineering Journal, Apr. 1999, pp. 84-94.

(56) References Cited

OTHER PUBLICATIONS

Tufvesson et al., "Pilot Assisted Channel Estimation for OFDM in Mobile Cellular Systems", Department of Applied Electronics, Lund University, VTC 1997, 5 pgs.
Van de Beek et al., "A Time and Frequency Synchronization Scheme for Multiuser OFDM", IEEE vol. 17, No. 11, Nov. 1999, 15 pgs.
Van de Beek et al., "On Channel Estimation in OFDM Systems", Preceedings of Vehicular Technology Conference (VTC 95) vol. 2, Sep. 1995, 6 pgs.
Van de Beek et al., "Synchronization and Channel Estimation in OFDM Systems", Lulea University of Technology, Division of Signal Processing, Lulea, Sweden, Sep. 1998.
Van Nee et al., "OFDM for Wireless Multimedia Communications", Artech House Universal Personal Communications, copyright 2000, 14 pgs.
Vanderaar, Mark et al., "Provisional Application", dated Jul. 24, 2000, 11 pgs.
Viswanathan et al., "Adaptive Coded Modulation Over Slow Frequency-Selective Fading Channels", IEEE 0-7803-5585-2/99, copyright 1999, 5 pgs.
Vook, et al., "Adaptive Array method, Device, Base Station, and Subscriber Unit," (1998).
Wahlqvist et al., "A Conceptual Study of OFDM-Based Multiple Access Schemes, Part 1: Air Interface Requirements", Telia Research AB, Jun. 5, 1996, 6 pgs.
Wahlqvist et al., "Capacity Comparison of an OFDM Based Multiple Access System Using Different Dynamic Resource Allocation", IEEE 0-7803-3659-3/97, copyright 1997, 5 pgs.
Wahlqvist et al., Decription of Telias OFDM Based Proposal (Working document in the OFDM concept group) Telia, ETSI STC SMG2#22, May 12-16, 1997, 22 pgs.
Waldeck, Torsten, et al., "Telecommunication Applications Over the Low Voltage Power Distribution Grid," Spread Spectrum Techniques and Applications, 1998, Proceedings 1998 IEEE 5th International Symposium on Sun City, South Africa Sep. 2-4, 1998, vol. 1, pp. 73-77.
Wang et al., "Dynamic Channel Resource Allocation in Frequency Hopped Wireless Communication Systems", IEEE 0-7803-2015-8/94, copyright 1994, 1 pg.
Wang et al.; "Wireless Multicarrier Communications;" Signal Processing Magazine; IEEE, May 2000; 17(3), pp. 29-48.
Ward, James and Compton, R. Ted, Jr., High Throughput Slotted ALOHA Packet Radio Networks with Adaptive Arrays, IEEE Transactions on Communications, Mar. 1993, pp. 460-470, vol. 41, No. 3.
Wei, Lei; "Synchronization Requirements for Multi-user OFDM on Satellite Mobile and Two-path Rayleigh Fading Channels;" IEEE Transactions on Communications, vol. 43, No. 2/3/4; Feb. 1995; pp. 887-895.
Wong et al., "A Real-Time Sub-Carrier Allocation Scheme for Multiple Access Downlink OFDM Transmission", IEEE 0-7803-5435-4/99, copyright 1999, 5 pgs.
Wong, K-K, et al.; "Adaptive Antennas at the Mobile and Base Stations in an OFDM/TDMA Systems;" IEEE, Jan. 2001, pp. 183-188.
Wong et al., "Multiuser Subcarrier Allocation for OFDM Transmission Using Adaptive Modulation", IEEE 0-7803-5565-2/99, copyright 1999, 5 pgs.
Wong, C. Y., et al., Multiuser OFDM With Adaptive Subcarrier, Bit, and Power Allocation, IEEE Journal on Selected Areas in Communications, Oct. 1999, IEEE Inc., New York, USA, vol. 17, No. 10, pp. 1747-1758, XP000855475, ISSN: 0733-8716/99 Sections I and II abstract.
Xu, Guanghan and Li, San-Qi, Throughput Multiplication of Wireless LANs for Multimedia Services: SDMA Protocol Design, 1994 IEEE, pp. 1326-1332.
Ye Li, et al.: "Clustered OFDM with channel estimation for high rate wireless data," Mobile Multimedia Communications, 1999. (MOMUC '99). 1999 IEEE International Workshop on San Diego, CA, USA, IEEE, US, Nov. 15, 1999, p. 43-50, XP010370695, ISBN: 0-7803-59046.
Yeh, C., et al.; "Channel Estimation Using Pilot Tones in OFDM Systems;" IEEE Transactions on Broadcasting, vol. 45, Issue 4; Dec. 1999; pp. 400-409.
Zhang, Yunjun, et al., "Orthogonal Frequency Division Multiple Access Peak-to-Average Ratio Reduction using Optimized Pilot Symbols" IEEE International Conference on Communication Technology Proceedings, vol. 1, Aug. 21, 2000, pp. 574-577.
5:13-cv-1774, -1776, -1777, -1778, -1844, -2023, Claim Construction Order, U.S. District Court for Northern District of California, U.S. Magistrtate Judge Paul S. Grewal, Dec. 19, 2013, 4 pgs.
5:13-cv-1774, -1776, -1777, -1778, -1844, -2023, Defendants' Responsive Claim Construction Brief with Exhibits, Nov. 2013, 324 pgs.
5:13-cv-1774, -1776, -1777, -1778, -1844, -2023, Plaintiffs Opening Claim Construction Brief with Exhibits, Oct. 2013, 92 pgs.
5:13-cv-1774, -1776, -1777, -1778, -1844, -2023, Plaintiffs Reply Claim Construction Brief with Exhibits, Nov. 2013, 56 pgs.
5:13-cv-1774, -1776, -1777, -1778, -1844, -2023, Transcript of Proceedings of the Official Electronic Sound Recording, U.S. District Court for the Northern District of California, the Honorable Paul S. Grewal presiding, Aug. 6, 2013, 6 pgs.
6:12-cv-17, -20, -120, Defendants' Motion for Summary Judgment of Invalidity Based on Indefiniteness Under 35 U.S.C. §112(b), U.S. District Court for the Eastern District of Texas, Sep. 16, 2013, 18 pgs.
6:12-cv-17, -20, -120, Defendants' Reply in Support of Their Motion for Summary Judgment of Invalidity Based on Indefiniteness Under 35 U.S.C. §112(b), U.S. District Court for the Eastern District of Texas, Oct. 21, 2013, 11 pgs.
6:12-cv-17, -20, -120, Defendants' Responsive Claim Construction Brief with Exhibits, Aug. 2013, 109 pgs.
6:12-cv-17, -20, -120, Plaintiffs Memorandum in Opposition to Defendants' Motion for Summary Judgment of Invalidity Based on Indefiniteness Under 35 U.S.C. §112(b), U.S. District Court for the Eastern District of Texas, Oct. 8, 2013, 24 pgs.
6:12-cv-17, -20, -120, Plaintiffs Opening Claim Construction Brief with Exhibits, Jul. 2013, 112 pgs.
6:12-cv-17, -20, -120, Plaintiffs Reply Brief Claim Construction Brief, Aug. 2013, 14 pgs.
6:12-cv-17, -20, -120, Plaintiffs Surreply in Opposition to Defendants' Motion for Summary Judgment of Invalidity Based on Indefiniteness Under 35 U.S.C. §112(b), U.S. District Court for the Eastern District of Texas, Nov. 1, 2013, 6 pgs.
6:12-cv-17, Joint Claim Construction and Prehearing Statement, Document No. 121-1, Exhibit A, Jun. 2013, 11 pgs.
6:12-cv-22, -122, -123, 6:13-cv-49, -50, 6:12-cv-369, Defendants' Responsive Claim Construction Brief with Exhibits, Dec. 2013, 485 pgs.
6:12-cv-22, -122, -123, 6:13-cv-49, -50, 6:12-cv-369, Defendants' Sur-Reply Claim Construction Brief, Jan. 2014, 7 pgs.
6:12-cv-22, -122, -123, 6:13-cv-49, -50, 6:12-cv-369, Plaintiff's Opening Construction Brief with Exhibits, Nov. 2013, 154 pgs.
6:12-cv-22, -122, -123, Joint Claim Construction and Prehearing Statement with Exhibits, U.S. District Court for the Eastern District of Texas, Sep. 17, 2013, 97 pgs.
In the Matter of Certain Wireless Communications Base Stations and Components thereof, Complainant Adatix, Inc.'s Motion to Terminate the Investigation Based on Withdrawal of the Complaint, Request for Suspension of the Procedural Schedule, and Request for Shortened Response Time, Investigation No. 337-TA-871, U.S. International Trade Commission, Dec. 3, 2013, 8 pgs.
In the Matter of Certain Wireless Communications Base Stations and Components thereof, Complainant Adaptix's Statement of Public Interest and Verified Complaint, Investigation No. 337-TA-871, U.S. International Trade Commission, Jan. 22, 2013, 34 pgs.
In the Matter of Certain Wireless Communications Base Stations and Components thereof, Order No. 35: Initial Determination Granting Motion to Terminate the Investigation in its Entirety, Investigation No. 337-TA-871, U.S. International Trade Commission, Dec. 13, 2013, 5 pgs.
In the Matter of Certain Wireless Communications Base Stations and Components thereof, Respondents' Motion for Leave to File a Corrected Notice of Prior Art, US International Trade Commission, Investigation No. 337-TA-871, May 30, 2013, 192 pgs.

(56) References Cited

OTHER PUBLICATIONS

In the Matter of Certain Wireless Communications Base Stations and Components thereof, Respondents' Notice of Prior Art, US International Trade Commission, Investigation No. 337-TA-871, May 14, 2013, 34 pgs.
*Adaptix* v. *Clearwire*, Defendants' Invalidity Contentions Pursuant to Patent Rules 3-3 and 3-4, Civil Action No. 6:08-cv-460, Jul. 24, 2009, 31 pgs.
*Adaptix* v. *Motorola Mobility LLC, et al.*, Defendants' Invalidity Contentions Pursuant to Patent Rules 3-3 and 3-4, Civil Action Nos. 6:12-cv-016-LED, 6:12-cv-017-LED, 6:12-cv-019, 6:12-cv-020-LED, 6:12-cv-120-LED, 6:12-cv-121-LED, 6:12-cv-124-LED, 6:12-cv-125-LED, Jan. 10, 2013, 1033 pgs.
*Adaptix* v. *Alcatel-Lucent USA, Inc. and Cellco Partnership d/b/a Verizon Wireless*, Defendants' Invalidity Contentions with Exhibits, Civil Action No. 6:12-cv-0122, Aug. 5, 2013, 10,324 pgs.
*Adaptix* v. *Alcatel-Lucent USA, Inc. and Sprint Spectrum L.P.*, Defendants' Invalidity Contentions, Civil Action No. 6:12-cv-0123, 18 pgs.
*Adaptix, Inc.* v. *Alcatel-Lucent USA, Inc. and Sprint Spectrum L.P.*, Defendants' Invalidity Contentions with Exhibits, Civil Action No. 6:12-cv-0123, Aug. 5, 2013, 10,551 pgs.
*Adaptix, Inc.* v. *Ericsson Inc. et al.*, Defendants' Invalidity Contentions, Civil Action No. 6:13-cv-49, -50; Aug. 5, 2013, 13,133 pgs.
*Adaptix Inc.* v. *Huawei Japan*, Japanese Litigation Case No. 28418 regarding corresponding Japanese Patent Nos. 3980478 and 4213466, Complaint filed by Plaintiff (Adaptix) dated Oct. 5, 2012, 31 pgs.
*Adaptix Inc.* v. *Huawei Japan*, Japanese Litigation Case No. 28418 regarding corresponding Japanese Patent Nos. 3980478 and 4213466, Description of Evidence 1 filed by Defendant (Huawei) dated May 21, 2013, 2 pgs.
*Adaptix Inc.* v. *Huawei Japan*, Japanese Litigation Case No. 28418 regarding corresponding Japanese Patent Nos. 3980478 and 4213466, Description of Evidence 2 filed by Defendant (Huawei) dated Jul. 31, 2013, 2 pgs.
*Adaptix Inc.* v. *Huawei Japan*, Japanese Litigation Case No. 28418 regarding corresponding Japanese Patent Nos. 3980478 and 4213466, Description of Evidence 3 filed by Defendant (Huawei) dated Aug. 7, 2013, 3 pgs.
*Adaptix Inc.* v. *Huawei Japan*, Japanese Litigation Case No. 28418 regarding corresponding Japanese Patent Nos. 3980478 and 4213466, Description of Evidence 1 filed by Plaintiff (Adaptix) dated Nov. 21, 2012, 2 pgs.
*Adaptix Inc.* v. *Huawei Japan*, Japanese Litigation Case No. 28418 regarding corresponding Japanese Patent Nos. 3980478 and 4213466, Description of Evidence 2 filed by Plaintiff (Adaptix) dated Jan. 9, 2013, 2pgs.
*Adaptix Inc.* v. *Huawei Japan*, Japanese Litigation Case No. 28418 regarding corresponding Japanese Patent Nos. 3980478 and 4213466, Description of Evidence 3 filed by Plaintiff (Adaptix) dated Mar. 15, 2013, 12 pgs.
*Adaptix Inc.* v. *Huawei Japan*, Japanese Litigation Case No. 28418 regarding corresponding Japanese Patent Nos. 3980478 and 4213466, Description of Evidence 4 filed by Plaintiff (Adaptix) dated Jul. 31, 2013, 3 pgs.
*Adaptix Inc.* v. *Huawei Japan*, Japanese Litigation Case No. 28418 regarding corresponding Japanese Patent Nos. 3980478 and 4213466, Preparatory Document 1 filed by Defendant (Huawei) dated Dec. 14, 2012, 14 pgs.
*Adaptix Inc.* v. *Huawei Japan*, Japanese Litigation Case No. 28418 regarding corresponding Japanese Patent Nos. 3980478 and 4213466, Preparatory Document 2 filed by Defendant (Huawei) dated Jan. 9, 2013, 3 pgs.
*Adaptix Inc.* v. *Huawei Japan*, Japanese Litigation Case No. 28418 regarding corresponding Japanese Patent Nos. 3980478 and 4213466, Preparatory Document 3 filed by Defendant (Huawei) dated Jan. 16, 2013, 8 pgs.
*Adaptix Inc.* v. *Huawei Japan*, Japanese Litigation Case No. 28418 regarding corresponding Japanese Patent Nos. 3980478 and 4213466, Preparatory Document 4 filed by Defendant (Huawei) dated Mar. 15, 2013, 5 pgs.
*Adaptix Inc.* v. *Huawei Japan*, Japanese Litigation Case No. 28418 regarding corresponding Japanese Patent Nos. 3980478 and 4213466, Preparatory Document 5 filed by Defendant (Huawei) dated May 21, 2013, 18 pgs.
*Adaptix Inc.* v. *Huawei Japan*, Japanese Litigation Case No. 28418 regarding corresponding Japanese Patent Nos. 3980478 and 4213466, Preparatory Document 6 filed by Defendant (Huawei) dated Jul. 31, 2013, 70 pgs.
*Adaptix Inc.* v. *Huawei Japan*, Japanese Litigation Case No. 28418 regarding corresponding Japanese Patent Nos. 3980478 and 4213466, Preparatory Document 7 filed by Defendant (Huawei) dated Aug. 7, 2013, 68 pgs.
*Adaptix Inc.* v. *Huawei Japan*, Japanese Litigation Case No. 28418 regarding corresponding Japanese Patent Nos. 3980478 and 4213466, Preparatory Document 8 filed by Defendant (Huawei) dated Oct. 18, 2013, 22 pgs.
*Adaptix Inc.* v. *Huawei Japan*, Japanese Litigation Case No. 28418 regarding corresponding Japanese Patent Nos. 3980478 and 4213466, Preparatory Document 9 filed by Defendant (Huawei) dated Oct. 24, 2013, 6 pgs.
*Adaptix Inc.* v. *Huawei Japan*, Japanese Litigation Case No. 28418 regarding corresponding Japanese Patent Nos. 3980478 and 4213466, Preparatory Document 1 filed by Plaintiff (Adaptix) dated Jan. 9, 2013, 10 pgs.
*Adaptix Inc.* v. *Huawei Japan*, Japanese Litigation Case No. 28418 regarding corresponding Japanese Patent Nos. 3980478 and 4213466, Preparatory Document 2 filed by Plaintiff (Adaptix) dated Mar. 15, 2013, 35 pgs.
*Adaptix Inc.* v. *Huawei Japan*, Japanese Litigation Case No. 28418 regarding corresponding Japanese Patent Nos. 3980478 and 4213466, Preparatory Document 3 filed by Plaintiff (Adaptix) dated Jul. 31, 2013, 58 pgs.
*Adaptix Inc.* v. *Huawei Japan*, Japanese Litigation Case No. 28418 regarding corresponding Japanese Patent Nos. 3980478 and 4213466, Preparatory Document 4 filed by Plaintiff (Adaptix) dated Jul. 31, 2013, 15 pgs.
*Adaptix Inc.* v. *Huawei Japan*, Japanese Litigation Case No. 28418 regarding corresponding Japanese Patent Nos. 3980478 and 4213466, Preparatory Document 5 filed by Plaintiff (Adaptix) dated Oct. 18, 2013, 55 pgs.
*Adaptix Inc.* v. *Huawei Japan*, Japanese Litigation Case No. 28418 regarding corresponding Japanese Patent Nos. 3980478 and 4213466, Preparatory Document 6 filed by Plaintiff (Adaptix) dated Oct. 18, 2013, 33 pgs.
*Adaptix Inc.* v. *Huawei Japan*, Japanese Litigation Case No. 28418 regarding corresponding Japanese Patent Nos. 3980478 and 4213466, Written Reply filed by Defendant (Huawei) dated Nov. 1, 2012, 2 pgs.
*Adaptix Inc.* v. *ZTE Japan*, Japanese Litigation Case No. 31440 regarding corresponding Japanese Patent Nos. 3980478 and 4213466, Description of Evidence 1 filed by Defendant (ZTE) dated Jun. 17, 2013, 9 pgs.
*Adaptix Inc.* v. *ZTE Japan*, Japanese Litigation Case No. 31440 regarding corresponding Japanese Patent Nos. 3980478 and 4213466, Description of Evidence 2 filed by Defendant (ZTE) dated Dec. 16, 2013, 3 pgs.
*Adaptix Inc.* v. *ZTE Japan*, Japanese Litigation Case No. 31440 regarding corresponding Japanese Patent Nos. 3980478 and 4213466, Description of Evidence 1 filed by Plaintiff (Adaptix) dated Nov. 21, 2012, 2 pgs.
*Adaptix Inc.* v. *ZTE Japan*, Japanese Litigation Case No. 31440 regarding corresponding Japanese Patent Nos. 3980478 and 4213466, Description of Evidence 2 filed by Plaintiff (Adaptix) dated Feb. 22, 2013, 2 pgs.
*Adaptix Inc.* v. *ZTE Japan*, Japanese Litigation Case No. 31440 regarding corresponding Japanese Patent Nos. 3980478 and 4213466, Description of Evidence 3 filed by Plaintiff (Adaptix) dated Apr. 12, 2013, 12 pgs.

(56) References Cited

OTHER PUBLICATIONS

*Adaptix Inc.* v. *ZTE Japan*, Japanese Litigation Case No. 31440 regarding corresponding Japanese Patent Nos. 3980478 and 4213466, Description of Evidence 4 filed by Plaintiff (Adaptix) dated Sep. 10, 2013, 3 pgs.

*Adaptix Inc.* v. *ZTE Japan*, Japanese Litigation Case No. 31440 regarding corresponding Japanese Patent Nos. 3980478 and 4213466, Preparatory Document 1 filed by Defendant (ZTE) dated Jun. 17, 2013, 14 pgs.

*Adaptix Inc.* v. *ZTE Japan*, Japanese Litigation Case No. 31440 regarding corresponding Japanese Patent Nos. 3980478 and 4213466, Preparatory Document 2 filed by Defendant (ZTE) dated Jun. 17, 2013, 71 pgs.

*Adaptix Inc.* v. *ZTE Japan*, Japanese Litigation Case No. 31440 regarding corresponding Japanese Patent Nos. 3980478 and 4213466, Preparatory Document 3 filed by Defendant (ZTE) dated Jun. 17, 2013, 59 pgs.

*Adaptix Inc.* v. *ZTE Japan*, Japanese Litigation Case No. 31440 regarding corresponding Japanese Patent Nos. 3980478 and 4213466, Preparatory Document 4 filed by Defendant (ZTE) dated Dec. 16, 2013, 21 pgs.

*Adaptix Inc.* v. *ZTE Japan*, Japanese Litigation Case No. 31440 regarding corresponding Japanese Patent Nos. 3980478 and 4213466, Preparatory Document 5 filed by Defendant (ZTE) dated Dec. 16, 2013, 6 pgs.

*Adaptix Inc.* v. *ZTE Japan*, Japanese Litigation Case No. 31440 regarding corresponding Japanese Patent Nos. 3980478 and 4213466, Preparatory Document 6 filed by Defendant (ZTE) dated Dec. 16, 2013, 27 pgs.

*Adaptix Inc.* v. *ZTE Japan*, Japanese Litigation Case No. 31440 regarding corresponding Japanese Patent Nos. 3980478 and 4213466, Preparatory Document 7 filed by Defendant (ZTE) dated Dec. 16, 2013, 28 pgs.

*Adaptix Inc.* v. *ZTE Japan*, Japanese Litigation Case No. 31440 regarding corresponding Japanese Patent Nos. 3980478 and 4213466, Preparatory Document 8 filed by Defendant (ZTE) dated Dec. 16, 2013, 38 pgs.

*Adaptix Inc.* v. *ZTE Japan*, Japanese Litigation Case No. 31440 regarding corresponding Japanese Patent Nos. 3980478 and 4213466, Preparatory Document 9 filed by Defendant (ZTE) dated Dec. 16, 2013, 82 pgs.

*Adaptix Inc.* v. *ZTE Japan*, Japanese Litigation Case No. 31440 regarding corresponding Japanese Patent Nos. 3980478 and 4213466, Preparatory Document 1 filed by Plaintiff (Adaptix) dated Apr. 12, 2013, 34 pgs.

*Adaptix Inc.* v. *ZTE Japan*, Japanese Litigation Case No. 31440 regarding corresponding Japanese Patent Nos. 3980478 and 4213466, Preparatory Document 3 filed by Plaintiff (Adaptix) dated Sep. 10, 2013, 17 pgs.

*Adaptix Inc.* v. *ZTE Japan*, Japanese Litigation Case No. 31440 regarding corresponding Japanese Patent Nos. 3980478 and 4213466, Preparatory Document 4 filed by Plaintiff (Adaptix) dated Sep. 10, 2013, 27 pgs.

*Adaptix Inc.* v. *ZTE Japan*, Japanese Litigation Case No. 31440 regarding corresponding Japanese Patent Nos. 3980478 and 4213466, Preparatory Document 5 filed by Plaintiff (Adaptix) dated Sep. 10, 2013, 29 pgs.

*Adaptix Inc.* v. *ZTE Japan*, Japanese Litigation Case No. 31440 regarding corresponding Japanese Patent Nos. 3980478 and 4213466, Written Reply filed by Defendant (ZTE) dated Feb. 18, 2013, 5 pgs.

*Adaptix Inc.* v. *Ericsson Japan*, Japanese Litigation Case No. 1149 regarding corresponding Japanese Patent Nos. 3980478 and 4213466, Complaint filed by Plaintiff (Adaptix) dated Jan. 18, 2013, 24 pgs.

*Adaptix Inc.* v. *Ericsson Japan*, Japanese Litigation Case No. 1149 regarding corresponding Japanese Patent Nos. 3980478 and 4213466, Correction of Complaint filed by Plaintiff (Adaptix) dated Jan. 24, 2013, 2 pgs.

*Adaptix Inc.* v. *Ericsson Japan*, Japanese Litigation Case No. 1149 regarding corresponding Japanese Patent Nos. 3980478 and 4213466, Correction of Preparatory Document 1 filed by Plaintiff (Adaptix) dated Jul. 30, 2013, 2 pgs.

*Adaptix Inc.* v. *Ericsson Japan*, Japanese Litigation Case No. 1149 regarding corresponding Japanese Patent Nos. 3980478 and 4213466, Description of Evidence 1 filed by Plaintiff (Adaptix) dated Jan. 24, 2013, 2 pgs.

*Adaptix Inc.* v. *Ericsson Japan*, Japanese Litigation Case No. 1149 regarding corresponding Japanese Patent Nos. 3980478 and 4213466, Description of Evidence 2 filed by Plaintiff (Adaptix) dated Jul. 19, 2013, 12 pgs.

*Adaptix Inc.* v. *Ericsson Japan*, Japanese Litigation Case No. 1149 regarding corresponding Japanese Patent Nos. 3980478 and 4213466, Preparatory Document 1 filed by Defendant (Ericsson) dated May 10, 2013, 10 pgs.

*Adaptix Inc.* v. *Ericsson Japan*, Japanese Litigation Case No. 1149 regarding corresponding Japanese Patent Nos. 3980478 and 4213466, Preparatory Document 2 filed by Defendant (Ericsson) dated Sep. 30, 2013, 26 pgs.

*Adaptix Inc.* v. *Ericsson Japan*, Japanese Litigation Case No. 1149 regarding corresponding Japanese Patent Nos. 3980478 and 4213466, Preparatory Document 1 filed by Plaintiff (Adaptix) dated Jul. 19, 2013, 79 pgs.

*Adaptix Inc.* v. *Ericsson Japan*, Japanese Litigation Case No. 1149 regarding corresponding Japanese Patent Nos. 3980478 and 4213466, Preparatory Document 2 filed by Plaintiff (Adaptix) dated Jul. 19, 2013, 16 pgs.

*Adaptix Inc.* v. *Ericsson Japan*, Japanese Litigation Case No. 1149 regarding corresponding Japanese Patent Nos. 3980478 and 4213466, Written Reply filed by Defendant (Ericsson) dated Feb. 26, 2013, 2 pgs.

*Adaptix Inc.* v. *Huawei Japan*, Japanese Litigation Case No. 17915 regarding corresponding Japanese Patent No. 4201595, Complaint filed by Plaintiff (Adaptix) dated Jul. 8, 2013, 34 pgs.

*Adaptix Inc.* v. *Huawei Japan*, Japanese Litigation Case No. 17915 regarding corresponding Japanese Patent No. 4201595, Description of Evidence 1 filed by Plaintiff (Adaptix) dated Jul. 22, 2013, 4 pgs.

*Adaptix Inc.* v. *Huawei Japan*, Japanese Litigation Case No. 17915 regarding corresponding Japanese Patent No. 4201595, Description of Evidence 2 filed by Plaintiff (Adaptix) dated Aug. 12, 2013, 2 pgs.

*Adaptix Inc.* v. *Huawei Japan*, Japanese Litigation Case No. 17915 regarding corresponding Japanese Patent No. 4201595, Description of Evidence 3 filed by Plaintiff (Adaptix) dated Nov. 22, 2013, 4 pgs.

*Adaptix Inc.* v. *Huawei Japan*, Japanese Litigation Case No. 17915 regarding corresponding Japanese Patent No. 4201595, Preparatory Document 1 filed by Plaintiff (Adaptix) dated Nov. 22, 2013, 39 pgs.

*Adaptix Inc.* v. *Huawei Japan*, Japanese Litigation Case No. 17915 regarding corresponding Japanese Patent No. 4201595, Written Reply filed by Defendant (Huawei) dated Oct. 15, 2013, 10 pgs.

*Adaptix Inc.* v. *ZTE Japan*, Japanese Litigation Case No. 19919 regarding corresponding Japanese Patent No. 4201595, Complaint filed by Plaintiff (Adaptix) dated Jul. 29, 2013, 34 pgs.

*Adaptix Inc.* v. *ZTE Japan*, Japanese Litigation Case No. 19919 regarding corresponding Japanese Patent No. 4201595, Correction of Complaint filed by Plaintiff (Adaptix) dated Aug. 21, 2013, 2 pgs.

*Adaptix Inc.* v. *ZTE Japan*, Japanese Litigation Case No. 19919 regarding corresponding Japanese Patent No. 4201595, Description of Evidence 1 filed by Defendant (ZTE) dated Nov. 25, 2013, 2 pgs.

*Adaptix Inc.* v. *ZTE Japan*, Japanese Litigation Case No. 19919 regarding corresponding Japanese Patent No. 4201595, Description of Evidence 1 filed by Plaintiff (Adaptix) dated Aug. 7, 2013, 4 pgs.

*Adaptix Inc.* v. *ZTE Japan*, Japanese Litigation Case No. 19919 regarding corresponding Japanese Patent No. 4201595, Written Reply filed by Defendant (ZTE) dated Nov. 25, 2013, 34 pgs.

*Adaptix Inc.* v. *Kyocera*, Japanese Litigation Case No. 22141 regarding corresponding Japanese Patent No. 4201595, Complaint filed by Plaintiff (Adaptix) dated Aug. 21, 2013, 35 pgs.

*Adaptix Inc.* v. *Kyocera*, Japanese Litigation Case No. 22141 regarding corresponding Japanese Patent No. 4201595, Description of Evidence 1 filed by Plaintiff (Adaptix) dated Aug. 21, 2013, 4 pgs.

(56) References Cited

OTHER PUBLICATIONS

*Adaptix Inc.* v. *Kyocera*, Japanese Litigation Case No. 22141 regarding corresponding Japanese Patent No. 4201595, Preparatory Document 1 filed by Defendant (Kyocera) dated Dec. 6, 2013, 13 pgs.
*Adaptix Inc.* v. *Kyocera*, Japanese Litigation Case No. 22141 regarding corresponding Japanese Patent No. 4201595, Written Reply filed by Defendant (Kyocera) dated Oct. 2, 2013, 2 pgs.
*Adaptix Inc.* v. *LG Electronics*, Japanese Litigation Case No. 23278 regarding corresponding Japanese Patent No. 4201595, Complaint filed by Plaintiff (Adaptix) dated Sep. 2, 2013, 35 pgs.
*Adaptix Inc.* v. *LG Electronics*, Japanese Litigation Case No. 23278 regarding corresponding Japanese Patent No. 4201595, Description of Evidence 1 filed by Defendant (LG Electronics) dated Dec. 6, 2013, 2 pgs.
*Adaptix Inc.* v. *LG Electronics*, Japanese Litigation Case No. 23278 regarding corresponding Japanese Patent No. 4201595, Description of Evidence 1 filed by Plaintiff (Adaptix) dated Sep. 2, 2013, 5 pgs.
*Adaptix Inc.* v. *LG Electronics*, Japanese Litigation Case No. 23278 regarding corresponding Japanese Patent No. 4201595, Preparatory Document 1 filed by Defendant (LG Electronics) dated Dec. 6, 2013, 48 pgs.
*Adaptix Inc.* v. *LG Electronics*, Japanese Litigation Case No. 23278 regarding corresponding Japanese Patent No. 4201595, Written Reply filed by Defendent (LG Electronics) dated Oct. 10, 2013, 2 pgs.
Demand (JPO) filed by ZTE dated May 10, 2013 relating to Japanese Invalidation Trial No. 2013-800082 regarding corresponding Japanese Patent No. 3980478, 71 pgs.
Written Reply (JPO) filed by Adaptix dated Sep. 3, 2013 relating to Japanese Invalidation Trial No. 2013-800082 regarding corresponding Japanese Patent No. 3980478, 27 pgs.
Demand (JPO) filed by ZTE dated May 10, 2013 relating to Japanese Invalidation Trial No. 2013-800083 regarding corresponding Japanese Patent No. 4213466, 59 pgs.
Written Reply (JPO) filed by Adaptix dated Sep. 5, 2013 relating to Japanese Invalidation Trial No. 2013-800083 regarding corresponding Japanese Patent No. 4213466, 35 pgs.
Written Statement (JPO) filed by ZTE dated Jan. 21, 2014 relating to Japanese Invalidation Trial No. 2013-800083 regarding corresponding Japanese Patent No. 4213466, 54 pgs.
Demand (JPO) filed by Huawei dated Jul. 31, 2013 relating to Japanese Invalidation Trial No. 2013-800141 regarding corresponding Japanese Patent No. 3980478, 70 pgs.
Written Reply (JPO) filed by Adaptix dated Nov. 18, 2013 relating to Japanese Invalidation Trial No. 2013-800141 regarding corresponding Japanese Patent No. 3980478, 46 pgs.
Demand (JPO) filed by Huawei dated Aug. 7, 2013 relating to Japanese Invalidation Trial No. 2013-800147 regarding corresponding Japanese Patent No. 4213466, 67 pgs.
Written Reply (JPO) filed by Adaptix dated Nov. 27, 2013 relating to Japanese Invalidation Trial No. 2013-800147 regarding corresponding Japanese Patent No. 4213466, 34 pgs.
Demand (JPO) filed by ZTE dated Dec. 18, 2013 relating to Japanese Invalidation Trial No. 2013-800235 regarding corresponding Japanese Patent No. 3980478, 77 pgs.
Amendment (JPO) dated Jul. 28, 2008 for JP 2002-550747, 3 pgs.
Amendment (USPTO) for U.S. Appl. No. 09/685,977, Sep. 2, 2004, 15 pgs.
Amendment (USPTO) for U.S. Appl. No. 09/837,701 on Jul. 27, 2004, 13 pgs.
Appeal Brief of U.S. Appl. No. 11/199,586 (issued as U.S. Patent No. 7,454,212), pp. 15-16, Oct. 2007, 2 pgs.
Register for JP 3980478 B dated Aug. 27, 2012 submitted in Japanese Litigation Case No. 1149, 21 pgs.
Register for JP 3980478 B dated Aug. 27, 2012 submitted in Japanese Litigation Case No. 28418, 1 pg.
Register for JP 3980478 B dated Aug. 27, 2012 submitted in Japanese Litigation Case No. 31440, 1 pg.
Register for JP 4201595 B dated Aug. 1, 2013 submitted in Japanese Litigation Case No. 17915, 1 pg.
Register for JP 4201595 B dated Aug. 1, 2013 submitted in Japanese Litigation Case No. 22141, 1 pg.
Register for JP 4201595 B dated Aug. 1, 2013 submitted in Japanese Litigation Case No. 23278, 1 pg.
Register for JP 4201595 B dated Jun. 21, 2013 submitted in Japanese Litigation Case No. 17915, 1 pg.
Register for JP 4201595 B dated Jun. 21, 2013 submitted in Japanese Litigation Case No. 19919, 2 pgs.
Register for JP 4213466 B dated Aug. 27, 2012 submitted in Japanese Litigation Case No. 1149, 1 pg.
Register for JP 4213466 B dated Aug. 27, 2012 submitted in Japanese Litigation Case No. 28418, 1 pg.
Register for JP 4213466 B dated Aug. 27, 2012 submitted in Japanese Litigation Case No. 31440, 1 pg.
Demand of Trial (JPO) dated Jul. 28, 2008 for JP 2002-550747, 5 pgs.
Notice of Final Refusal (JPO) dated Apr. 21, 2008 for JP 2002-550747, 2 pgs.
Office Action (JPO) dated May 14, 2007 for JP 2002-550747, 7 pgs (with English translation).
Prosecution History (JPO) of JP 4213466 (English translation), Filing date of Dec. 20, 2013, 43 pgs.
Remarks (JPO) dated Aug. 21, 2007 for JP 2002-550747, 2 pgs.
Remarks (USPTO) for U.S. Appl. No. 09/837,701 dated Jul. 27, 2004, 13 pgs.
3rd Generation Partnership Project, 3GPP TR 21.801 V8.1.0, p. 36, Mar. 2008, 4 pgs.
3rd Generation Partnership Project, 3GPP TS 36.201 V8.3.0, pp. 7-8, Mar. 2009, 6 pgs.
3rd Generation Partnership Project, 3GPP TS 36.201 V10.0.0, pp. 7-8, Dec. 2010, 4 pgs.
3rd Generation Partnership Project, 3GPP TS 36.211 V10.5.0, pp. 52, 58, 60, 62, 73, 86, Jun. 2012, 15 pgs.
3rd Generation Partnership Project, 3GPP TS 36.211 V10.5.0, pp. 73-75, Jun. 2012, 4 pgs.
3rd Generation Partnership Project, 3GPP TS 36.211 V10.5.0, pp. 86-87, Jun. 2012, 3 pgs.
3rd Generation Partnership Project, 3GPP TS 36.211 V8.9.0, pp. 46, 51-53, and 65, Dec. 2009, 11 pgs.
3rd Generation Partnership Project, 3GPP TS 36.211 V8.9.0, pp. 45-46, 65, and 67, Dec. 2009, 9 pgs.
3rd Generation Partnership Project, 3GPP TS 36.212 V10.5.0, pp. 54-55 and 23, Mar. 2012, 7 pgs.
3rd Generation Partnership Project, 3GPP TS 36.212 V10.5.0, p. 56, Mar. 2012, 3 pgs.
3rd Generation Partnership Project, 3GPP TS 36.212 V8.3.0, pp. 36-37 and 22, May 2008, 6 pgs.
3rd Generation Partnership Project, 3GPP TS 36.212 V8.3.0, p. 38, May 2008, 3 pgs.
3rd Generation Partnership Project, 3GPP TS 36.213 V10.5.0, pp. 18, 30, 43, 63, 66, and 79, Mar. 2012, 13 pgs.
3rd Generation Partnership Project, 3GPP TS 36.213 V10.5.0, pp. 28-29, Mar. 2012, 3pgs.
3rd Generation Partnership Project, 3GPP TS 36.213 V10.5.0, pp. 46-51, Mar. 2012, 11pgs.
3rd Generation Partnership Project, 3GPP TS 36.213 V10.5.0, pp. 51-62, Mar. 2012, 17pgs.
3rd Generation Partnership Project, 3GPP TS 36.213 V10.5.0, pp. 63-65, Mar. 2012, 4pgs.
3rd Generation Partnership Project, 3GPP TS 36.213 V8.8.0, pp. 33-34, 36-40, and 47-48, Sep. 2009, 15pgs.
3rd Generation Partnership Project, 3GPP TS 36.213 V8.8.0, pp. 34-35, 37-42, and 48, Sep. 2009, 14 pgs.
3rd Generation Partnership Project, 3GPP TS 36.213 V8.8.0, pp. 37-47, Sep. 2009, 19pgs.
3rd Generation Partnership Project, 3GPP TS 36.213 V8.8.0, pp. 36-40, Sep. 2009, 6 pgs.
3rd Generation Partnership Project, 3GPP TS 36.300 V10.5.0, pp. 18-19, 41, 46-47, 49, 54, 89-91, 115-116, and 157, Sep. 2011, 32 pgs.
3rd Generation Partnership Project, 3GPP TS 36.300 V10.5.0, pp. 54, 89, and 91-92, Sep. 2011, 10 pgs.
3rd Generation Partnership Project, 3GPP TS 36.300 V8.12.0, pp. 15, 26, 31, 33-34, 37-38, 67-69, 76, and 115, Mar. 2010, 30 pgs.

(56) References Cited

OTHER PUBLICATIONS

3rd Generation Partnership Project, 3GPP TS 36.300 V8.12.0, pp. 37-38 and 67-69, Mar. 2010, 10 pgs.
3rd Generation Partnership Project, 3GPP TS 36.423 V8.9.0, pp. 16 and 48, Mar. 2010, 7 pgs.
3rd Generation Partnership Project, 3GPP TS 36.423 V10.5.0, pp. 18 and 59, Mar. 2012, 7 pgs.
Acampora, "Wireless ATM: A Perspective on Issues and Prospects," IEEE Personal Communications, vol. 3, No. 4, pp. 8-17, Aug. 1996, 10 pgs.
Adachi et al, "Coherent Multicode DS-CDMA Mobile Radio Access," IEICE Trans. Commun., vol. E79-B, No. 9, pp. 1316-1325, Sep. 1996, 10 pgs.
Adaptix, "ADAPTIX Selects Maxim to Power New SX-Series Mobile WiMAX Terminals," Business Wire, 15:01:00, Jan. 8, 2007, 2 pgs.
Ahmed et al., "An Adaptive Array Processor with Robustness and Broad-Band Capabilities," IEEE Trans. on Antennas and Propagation, vol. AP-32, No. 9, pp. 944-950, Sep. 1984, 7 pgs.
Ahmed et al., "Broadband Adaptive Array Processing," IEEE Proceedings, vol. 130, Pt. F, No. 5, pp. 433-440, Aug. 1983, 8 pgs.
Alexiou et al., "Downlink Capacity Enhancement by Employing SDMA in GSM," Sensor Array and Multichannel Signal Processing Workshop, 2000, Proceedings of the 2000 IEEE, pp. 413-417, Mar. 16-17, 2000, 5 pgs.
Alouini et al., "An Adaptive Modulation Scheme for Simultaneous Voice and Data Transmission over Fading Channels," IEEE. J. on Selected Areas Comm., vol. 17, No. 5, pp. 837-850, May 1999, 14 pgs.
American Heritage Dictionary, Fourth Edition, Houghton Mifflin Company, p. 1578, 2000, 3 pgs.
American Heritage Dictionary, Second College Edition, p. 78, 1982, 3 pgs.
Anderson et al., "Adaptive Antennas for GSM and TDMA Systems," Personal Communications, IEEE, pp. 74-86, Jun. 1999, 13 pgs.
Anderson et al., "Ericsson/Mannesmann GSM Field-Trials with Adaptive Antennas," 3 Vehicular Technology Conference, 1997, IEEE 47th, pp. 1587-1591, May 4-7, 1997, 5 pgs.
Anderson et al., "GSM/TDMA Adaptive Antenna Field-Trial Results," 2 Antennas and Propogation Society International Symposium 1999, IEEE, pp. 1108-1111, Jul. 11-16, 1999, 4 pgs.
Anderson et al., "Technology and Transceiver Architecture Considerations for Adaptive Antennas," ETSI STC SMG2#24 Tdoc SMG2 400/97, pp. 1-6, Dec. 1997, 6 pgs.
Andrews et al., "Fundamentals of WiMAX: Understanding Broadband Wireless Networking," Prentice Hall, p. 303, Feb. 2007, 4 pgs.
Applebaum, "Adaptive Arrays," IEEE Trans. Ant. Prop., vol. AP-24, No. 5, Sep. 1976, 14 pgs.
Arvelo, "Physical Layer DSP Design of a Wireless Gigabit/s Indoor LAN," May 2000, 165 pgs.
"Ascend," Huawei Webpage, May 9, 2013, 8 pgs.
Astely et al., "Spatial Signature Estimation for Uniform Linear Arrays with Unknown Receiver Gains and Phases," IEEE Transactions on Signal Processing, vol. 47, No. 8, pp. 2128-2138, Aug. 1999, 11 pgs.
Asztely et al., "A Generalized Array Manifold Model for Local Scattering in Wireless Communications," 1997 IEEE Int'l Conf. on Acoustics, Speech, and Signal processing, vol. 5, pp. 4021-4024, Apr. 21, 1997, 4 pgs.
Authoritative Dictionary of IEEE Standard Terms, Seventh Edition, IEEE Standards Information Netorwk/IEEE Press, pp. 1017-1018, Dec. 2000, 4 pgs.
Balachandran, Krishna, "Channel Quality Estimation and Rate Adaptation for Cellular Mobile Radio," IEEE Journal on Selected Areas in Communications, vol. 17, No. 7, pp. 1244-1256, Jul. 1, 1999, 13 pgs.
Bana et al., "Space Division Multiple Access (SMDA) for Robust Ad hoc Vehicle Communication Networks," IEEE 4th Int'l Conf. on Intelligent Transportation Systems, pp. 1-6, Aug. 2001, 6 pgs.
Bana, "Real-Time Vehicle Location with Desired Accuracy," IEEE 4th Int'l Conf. on Intelligent Transportation Systems, Aug. 2001, 6 pgs.
"Base Stations," Ericsson Webpage, available at www.ericsson.com/ourportfolio/products/base-stations, Nov. 20, 2012, 2 pgs.
Bender et al., "CDMA/HDR: A Bandwidth-Efficient High-Speed Wireless Data Service for Nomadic Users," IEEE Communications Magazine, pp. 70-87, Jul. 2000, 19 pgs.
Black's Law Dictionary, Seventh Edition, p. 100, Aug. 1999, 2 pgs.
Blum et al., "Improved Space-time coding for MIMO-OFDM Wireless Communications," IEEE Trans. on Communications, pp. 1873-1878, Nov. 2001, 6 pgs.
Blum et al., "Improved Techniques for 4 transmit and 4 receive antenna MIMO-OFDM," Spring IEEE Vehicular Technology Conference, pp. 1298-1303, May 2001, 5 pgs.
Bonek et al., "Space Division Multiple Access (SDMA): An Editorial Introduction," Wireless Personal Communications, vol. 11, p. 1, Oct. 1999, 1 pg.
Broadband Radio Access Networks (BRAN), "Inventory of Broadband Radio Technologies and Techniques," ETSI Technical Report, TR 101 173, V1.1.1, DTR/BRAN-030001, May 1998, 41 pgs.
Buckley, "Spatial/Spectral Filtering with Linearly Constrained Minimum Variance Beamformers," IEEE Trans. on Acoustics, Speech, and Signal Processing, vol. ASSP-35, No. 3, pp. 249-266, Mar. 1987, 18 pgs.
Burr, A.G., "Wide-band Channel Model Using a Spatial Model," 1998 IEEE 5th International Symposium on Spread Spectrum Techniques and Applications, IEEE, pp. 255-257, Sep. 2-4, 1998, 3 pgs.
Businessnetwork.jp Webpage, available at businessnetwork.jp/tabid/65/artid/2136/page/2/Default.aspx, Feb. 21, 2013, 2 pgs.
Casas, "OFDM for Data Communication Over Mobile Radio FM-Channels—Part I: Analysis and Experimental Results," IEEE Trans. Commun., vol. 39, No. 5, pp. 783-793, May 1991, 11 pgs.
Catreux et al., "Simulation Results for an Interference-Limited Multiple-Input Multiple-Output Cellular System," IEEE Communication Letters, vol. 4, No. 11, pp. 334-336, Nov. 2000, 4 pgs.
Chang, "Synthesis of Band-Limited Orthogonal Signals for Multichannel Data Transmission," Bell Sys. Tech. Jour., vol. 45, pp. 1775-1796, Dec. 1996, 22 pgs.
Chen, "Joint Sub-carrier, Bit, and Power Allocation Algorithms for OFDM-based Multi-user Systems," 1999, 45 pgs.
Cheng and Verdu, "Gaussian Multiaccess Channels with ISI: Capacity Region and Multiuser Water-Filling," IEEE Trans. Info. Theory, vol. 39, No. 3, pp. 773-785, May 1993, 13 pgs.
Chuang and Sollenberger, "Beyond 3G: Wideband Wireless Data Access Based on OFDM and Dynamic Packet Assignment," IEEE Communications Magazine, vol. 38, No. 7, pp. 78-87, Jul. 2000, 10 pgs.
Chuang et al., "Dynamic frequency hopping in cellular systems with network assisted resource allocation," IEEE, VTC2000, pp. 2459-2463, May 2000, 5 pgs.
Chuang et al., "High-Speed Wireless Data Access Based on Combining EDGE with Wideband OFDM," IEEE Communications Magazine, pp. 92-98, Nov. 1999, 7 pgs.
Chuang et al., "OFDM Based High-Speed Wireless Access for Internet Applications," 11th IEEE International Symposium on Personal Indoor and Mobile Radio Communications, vol. 2, pp. 797-803, Sep. 2000, 7 pgs.
Chuang, et al., "Power Control for Dynamic Packet Assignment in Advanced Cellular Internet Service," IEEE VTC '98, pp. 1750-1754, May 1998, 5 pgs.
Chuang et al., "Wideband Wireless Data Access Based on OFDM and Dynamic Packet Assignment," IEEE 0-7803-5668-3/99, Sep. 21, 1999, 5 pgs.
Chuang, "An OFDM-based System with Dynamic Packet Assignment and Interference Suppression for Advanced Cellular Internet Service," IEEE Global Telecommunications Conference, vol. 2, pp. 974-979, Nov. 1998, 6 pgs.
Cimini, Jr., et al., "Advanced Cellular Internet Service (ACIS)," IEEE Communications Magazine, pp. 150-159, Oct. 1998, 10 pgs.
Cimini et al., "OFDM with Diversity and Coding for High-Bit-Rate Mobile Data Applications," Mobile Multimedia Communications, pp. 247-254, 1997, 8 pgs.

(56) References Cited

OTHER PUBLICATIONS

Cimini, Jr., "Analysis and Simulation of a Digital Mobile Channel Using Orthogonal Frequency Division Multiplexing," IEEE Trans. Commun., vol. COM-33, No. 7, pp. 665-675, Jul. 1985, 11 pgs.
Czylwik, Adreas, "Adaptive OFDM for Wideband Radio Channels," IEEE 0-7803-3336-5/96, pp. 713-718, Nov. 1996, 6 pgs.
Daisuke Takeda et al., "Orthogonal Multi-code OFDM-DS/CDMA Using Partial Bandwidth Transmission," Technical Report of IEICE RCS97-160, NII—Electronic Library Service, published Nov. 1997 [Translated], 7 pgs.
Dam et al., "Performance Evaluation of Adaptive Anetenna Base Stations in a Commercial GSM Network," Vehicular Technology Conference, 1999, IEEE 50th, pp. 47-51, Sep. 19-22, 1999, 5 pgs.
Despins et al., "Compound Strategies of Coding, Equalization, and Space Diversity for Wide-Band TDMA Indoor Wireless Channels," IEEE Trans. on Vehicular Technology, vol. 41, No. 4, pp. 369-379, Nov. 1992, 11 pgs.
Dimou, "Interference Management within 3GPP LTE Advanced—Part II," Ericsson Research, Feb. 25, 2013, 4 pgs.
Doufexi et al., "A Comparison of HIPERLAN/2 and IEEE 802.11a Physical and MAC Layers," IEEE 0-7803-6684-0/00, pp. 14-20, Oct. 2000, 7 pgs.
Engstrom et al., "A system for Test of Multiaccess Methods based on OFDM," IEEE 44th Vehicular Technology Conference, vol. 3, pp. 1843-1845, Jun. 1994, 3 pgs.
Er, "On the Limiting Solution of Quadratically Constrained Broad-Band Beam Formers," IEEE Trans. On Signal Proc., vol. 41, No. 1, pp. 418-419, Jan. 1993, 2 pgs.
Ericsson Webpage, pp. 1-3, 3 pgs.
Eriksson, "Capacity Improvement by Adaptive Channel Allocation," IEEE Global Telecomm. Conf, pp. 1355-1359, Nov. 28-Dec. 1, 1988, 5 pgs.
ETSI SMG2, SMG2 TD 8/96, "A Multi-Carrier Air Interface Based on OFDM," ETSI, published Mar. 1, 1996, "TD 8/96," 7 pgs.
ETSI SMG2 Adhoc on UMTS Tdoc SMG2 UMTS 16/97, "Procedure for the definition of the UMTS Terrestrial Radio Access," SMG2, pp. 1-2, Jan. 14, 1997, 2pgs.
ETSI SMG2 Plenary Tdoc SMG2 301/97, "Beta Concept Group Status Report," Beta Concept Group, pp. 1-2, Oct. 1997, 2 pgs.
ETSI SMG2 UMTS Ad hoc #3 Annex 1, "ETSI Sub Technical Committee SMG2 Special Mobile Group Meeting Report 3rd SMG2 Ad hoc on UMTS held in Rennes, France," ETSI Sub Technical Committee SMG2 Special Mobile Group, pp. 1-15, Aug. 1997, 15 pgs.
ETSI SMG2 UMTS ad hoc #3 Annex 2,"Proposal for changes of ETR04.02," CSEM/Pro Telecom, Ericsson, France Telecom CNET, Nokia, Siemens AG, Vodafone, pp. 1-12, Aug. 1997, 12 pgs.
ETSI SMG2 UMTS ad hoc #4 Tdoc SMG2 146/97, "Statement from Beta/Gamma meeting," Beta and Gamma chairmen, p. 1, Nov. 1997, 1 pg.
ETSI SMG2 UMTS Ad-hoc #1 Annex 1 Tdoc SMG2 UMTS 02x/97, "DRAFT High level requirements relevant for the definition of the UMTS Terrestrial Radio Access UTRA concept," SMG2, pp. 1-4, 1997, 4 pgs.
ETSI SMG2 UMTS Ad-hoc #1 Annex 2, "DRAFT Meeting report for SMG2 Adhoc meeting in Le Mans, Jan. 13-15, 1997," pp. 1-8, Jan. 1997, 8 pgs.
ETSI SMG2 UMTS Ad-hoc #1 Annex 3 Tdoc 17/97, "Proposed time schedule for UMTS Terrestrial Radio Access definition," SMG2, pp. 1-8, Jan. 14, 1997, 8 pgs.
ETSI SMG2 UMTS Ad-hoc #1 Annex 4, "ODMA," SMG2, pp. 1-9, Jun. 23, 1997, 9 pgs.
ETSI SMG2 UMTS Ad-hoc meeting #4 Tdoc SMG2 UMTS 133/97, "Telia's Evaluation of Access Proposals," Telia, pp. 1-9, Nov. 1997, 9 pgs.
ETSI SMG2 UMTS Ad-Hoc Tdoc 89/97, "Proposed Concept Group Work Schedule," UMTS Concept Group Co-ordination Committee, pp. 1-2, Aug. 1997, 2 pgs.
ETSI STC SMG2#21 Tdoc SMG2 58/97, "Proposed UTRA Concept Grouping," p. 1, Mar. 1997, 1 pg.
ETSI SMG2#22 Tdoc SMG2 120/97, "Common Workplan of SMG2 UTRA Concept Groups," NEC Technologies (UK) Ltd., pp. 1-2, May 1997, 2 pgs.
ETSI SMG2#22, Tdoc SMG2 179/97, "Proposal for OFDM Concept Group," ETSI, Lucent Technologies, Sony International (Europe) GmbH, Telia Research, May 12, 1997, "TD 179/97," 2 pgs.
ETSI STC SMG2 ad hoc no 4 on UMTS Tdoc SMG2 UMTS 110/97, "Draft Agenda," SMG2, p. 1, Nov. 1997, 1 pg.
ETSI STC SMG2 ad hoc no. 4 on UMTS Tdoc SMG2 130/97, "Draft Report of ETSI SMG2 UMTS ad hoc No. 4, Nov. 17-21, 1997 in Helsinki," pp. 1-30, Nov. 1997, 30 pgs.
ETSI STC SMG2 Tdoc SMG2 263/96, "Status of WI Mobile Assisted Frequency Allocation," Ericsson, p. 1, Dec. 1996, 1 pg.
ETSI STC SMG2#20 SMG2 TD XXX/96, "BDMA and its applicability as UMTS access scheme," Sony Deutschland GmbH, pp. 1-25, Dec. 1996, 25 pgs.
ETSI STC SMG2#20 Tdoc SMG2 261/96, "Decisions outside SMG relating to UMTS air interface," Lucent Technologies, p. 1, Dec. 1996, 1 pg.
ETSI STC SMG2#20 Tdoc SMG2 269/96, "Improvements to MS Measurement Reports," One2one, pp. 1-3, Dec. 1996, 3 pgs.
ETSI STC SMG2#22, TDoc ETSI SMG2 180/97, "Description of Telias OFDM Based Proposal," ETSI, published May 1997, "TD 180/97," 22 pgs.
ETSI STC SMG2#23 Tdoc SMG2 318/97, "Achieving Forward Handover with the UTRA," BT, pp. 1-2, Sep. 1997, 2 pgs.
ETSI STC SMG2#23, SMG2 TD 299/97, "OFDMA Evaluation Report, The Multiple Access Scheme Proposal for the UMTS Terrestrial Radio Air Interface (UTRA), Part 1—System Description Performance Evaluation," OFDMA (Beta) Concept Group, Oct. 1, 1997, "TD 299/97," 47 pgs.
ETSI STC SMG#24, TD ETSI STC SMG#24, TD 399/97, ETSI, published Dec. 1997, "TD 399/97," 9 pgs.
ETSI STC SMG2#24 SMG2 TD 412/97, "Management Summary of the Beta concept group," OFDMA (Beta) Concept Group, pp. 1-2, Dec. 1997, 2 pgs.
ETSI STC SMG2#24 SMG2 TD 436/97, "Summary of the concept description of the Beta concept," OFDMA (Beta) Concept Group, pp. 2-5, Dec. 1997, 4 pgs.
ETSI STC SMG2#24, SMG2 TD 432/97, "OFDMA (Beta) Concept Group," ETSI, published Dec. 1997, "TD 432/97," 6 pgs.
ETSI STC SMG2#24 SMG2 TD 445/97, "Annex for the OFDMA Evaluation Report," OFDMA (Beta) Concept Group, pp. 1-4, Dec. 1997, 4 pgs.
ETSI STC SMG2#24 Tdoc SMG2 330/97, "Draft Agenda," SMG2, pp. 1-2, Dec. 1997, 2 pgs.
ETSI STC SMG2#24 Tdoc SMG2 371/97, "Draft Summary of the UTRA definition procedure in SMG2," SMG2 chairman, pp. 1-3, Dec. 1997, 3 pgs.
ESTI STC SMG2#24 Tdoc SMG 401/97, "Antenna Duplexing and Switching in UMTS Terminals," Philips Consumer Communications, pp. 1-4, Nov. 1997, 4 pgs.
ETSI STC SMG2#24 Tdoc SMG2 402a, "Introduction of SDMA component into UMTS radio interface," Philips Consumer Communications, pp. 1-4, Dec. 1997, 9 pgs.
ETSI STC SMG2#24 Tdoc SMG2 443/97, "Summary of the UTRA definition procedure in SMG2," SMG2, pp. 1-3, Dec. 1997, 3 pgs.
ETSI UMTS ad hoc meeting #4 SMG2 UMTS Tdoc 135/97, "GSM Reference configuration for capacity comparison with UTRA concepts," T-Mobil, Mannesmann Mobilfunk, Omnitel, Orange, France Telecom CNET, pp. 1-2, Nov. 1997, 2 pgs.
ETSI SMG meeting No. 24, Concept Group Beta, "OFDMA Evaluation Report—The Multiple Access Scheme Proposal for the UMTS Terrestrial Radio Air Interface (UTRA)," Tdoc/SMG 896/97, Madrid, Spain, Dec. 1997, 114 pgs.
ETSI SMG2, "A Conceptual Study of OFDM-based Multiple Access Schemes, Part 1: Air Interface Requirements; Part 2: Channel Estimation in the Uplink," Telia Research, pp. 1-14, May 22, 1996, 14 pgs.
ETSI SMG2, "A Conceptual Study of OFDM-based Multiple Access Schemes, Part 4: Tracking of Time and Frequency Offset," Telia Research, pp. 1-12, Dec. 1996, 12 pgs.

(56) References Cited

OTHER PUBLICATIONS

ETSI SMG2, "A Conceptual Study of OFDM-based Multiple Access Schemes, Part 5: Preliminary Study of OFDM spectral efficiency," Telia Research, pp. 1-9, Dec. 1996, 10 pgs.

ETSI/STC SMG2 (97) "ETSI Sub Technical Committee SMG2 Special Mobile Group Meeting Report 24th SMG2 Plenary meeting held in Cork, IRL," p. 1-42, Dec. 1997, 42 pgs.

ETSI/STC SMG2 (97), "ETSI Sub Technical Committee SMG2 Special Mobile Group Meeting Report 24th SMG2 Plenary meeting held in Cork, IRL," pp. 1-43, Dec. 1997, 43 pgs.

European Telecommunications Standards Institute ("ETSI"), "Universal Mobile Telecommunications System (UMTS), UMTS Terrestrial Radio Access (UTRA), Concept Evaluation (UMTS 30.06 version 3.0.0)," TR 101 146 V3.0.0, Dec. 1997, 689 pgs.

Farsakh et al., "Application of Space Division Multiple Access to Mobile Radio," 2 IEEE International Symposium on Personal, Indoor, and Mobile Radio Communications, pp. 736-739, Sep. 18-23, 1994, 4 pgs.

Farsakh, C. et al., "Maximizing the SDMA Mobile Radio Capacity Increase by DOA Sensitive Channel Allocation," Wireless Personal Communications, Kluwer Academic Publishers, NL, vol. 11, No. 1, XP000835062, ISSN: 0929-6212, pp. 63-76, Oct. 1999, 14 pgs.

Farsakh, Christof and Nossek, Josef A., "A Real Time Downlink Channel Allocation Scheme for an SDMA Mobile Radio System," IEEE 0-7803-3692-5/96, pp. 1216-1220, Oct. 1996, 5 pgs.

Farsakh, Christof and Nossek, Josef A., "Channel Allocation and Downlink Beamforming in an SDMA Mobile Radio System," IEEE 0-7803-3002-1/95, pp. 687-691, Sep. 1995, 5 pgs.

Farsakh, Christof and Nossek, Josef A., "On the Mobile Radio Capacity Increase through SDMA," Accessing, Transmission, Networking Proceedings, pp. 293-297, Feb. 1998, 5 pgs.

Farsakh et al., "Spatial Covariance Based Downlink Beamforming in an SDMA Mobile Radio System," IEEE Trans. On Communications, vol. 46, No. 11, pp. 1497-1506, Nov. 1998, 10 pgs.

Fazel, "Narrow-Band Interference Rejection in Orthogonal Multi-Carrier Spread-Spectrum Communications," Record, 1994 Third Annual International Conference on 55 Universal Personal Communications, IEEE, pp. 46-50, Sep. 1994, 5 pgs.

Forssen et al., "Adaptive Antenna Arrays for GSM900/DCS1800," Proc. IEEE 44th Vehicular Technology Conference, pp. 605-609, Jun. 1994, 5 pgs.

Foschini, Gerard J., "Layered Space-Time Architecture for Wireless Communication in a Fading Environment When Using Multi-Element Antennas," Bell Labs Technical Journal, Lucent Technologies, pp. 41-59, Autumn 1996, 19 pgs.

Foschini et al., "On Limits of Wireless Communications in a Fading Environment when Using Multiple Antennas," Wireless Personal Communications vol. 6, No. 3, Kluwer Academic Publishers, pp. 311-335, Mar. 1998, 26 pgs.

Foschini et al., "Simplified Processing for High Spectral Efficiency Wireless Communication Employing Multi-Element Arrays," IEEE Journal on Selected Areas in Communications, vol. 17, No. 11, pp. 1841-1852, Nov. 1999, 13 pgs.

Frullone et al., "PRMA Performance in Cellular Environments with Self-Adaptive Channel Allocation Strategies," IEEE Transactions on Vehicular Technology, vol. 45, No. 4, pp. 657-665, Nov. 1996, 10 pgs.

Fuhl et al., "Capacity Enhancement and BER in a Combined SDMA/TDMA System," IEEE 46th Conf. on Vehicular Technology, vol. 3, pp. 1481-1485, Apr. 1996, 5 pgs.

Fuhl et al., "Unified Channel Model for Mobile Radio Systems with Smart Antennas," 145 Radar, Sonar and Navigation, IEEE Proceedings, pp. 32-41, Feb. 1998, 10 pgs.

Gans et al., "Co-Channel Interference in High Capacity Fixed Wireless Loops (FWL)," Electronics Letters, vol. 35, No. 17, pp. 1422-1424, Aug. 19, 1999, 3 pgs.

Ghosh et al., "Fundamentals of LTE," Prentice Hall, pp. 21, 53-58, and 138-142, Sep. 2010, 15 pgs.

Godara, "Applications of Antenna Arrays to Mobile Communications, Part I: Performance Improvement, Feasibility, and System Considerations," Proc. IEEE, vol. 85, No. 7, pp. 1031-1060, Jul. 1997, 30 pgs.

Godara, "Applications of Antenna Arrays to Mobile Communications, Part II: Beam-Forming and Direction-of-Arrival Considerations," Proc. IEEE, vol. 85, No. 8, pp. 1195-1245, Aug. 1997, 51 pgs.

Goldburg et al., "The Impacts of SDMA on PCS System Design," IEEE Int'l Conf. on Universal Personal Communications 1994, pp. 242-246, Sep. 1994, 5 pgs.

Golden et al., "Detection Algorithm and Initial Laboratory Results Using V-BLAST Space-Time Communication Architecture," Electronics Letters, vol. 35, No. 1, Jan. 7, 1999, 2 pgs.

Goldsmith et al., "Adaptive Coded Modulation for Fading Channels," IEEE Transactions on Communications, vol. 46, No. 5, pp. 595-602, May 1998, 8 pgs.

Goldsmith et al., "Variable-Rate Variable-Power MQAM for Fading Channels," IEEE Transactions on Communications, vol. 45, No. 10, pp. 1218-1230, Oct. 1997, 13 pgs.

Goodman, "Second Generation Wireless Information Networks," IEEE Trans. of Veh. Tech., vol. 40, No. 2, pp. 366-374, May 1991, 9 pgs.

Goransson et al., "Advanced Antenna Systems for WCDMA: Link and System Level Results," 11th Annual Symposium on Person, Indoor and Mobile Radio Communications 2000, IEEE, pp. 62-66, Sep. 18, 2000, 5 pgs.

Grant et al., "Per-Antenna-Rate-Control (PARC) in Frequency Selective Fading with SIC-GRAKE Receiver," IEEE 60th Vehicular Technology Conference, Fall 2004, pp. 1458-1462, Sep. 26-29, 2004, 5 pgs.

Grunheid, R. et al., "Adaptive Modulation and Multiple Access for the OFDM Transmission Technique," Wireless Personal Communications 13:5-13, 2000, Kluwer Academic Publishers, XP000894156, ISSN: 0929-6212, pp. 5-13, May 2000, 9 pgs.

Haardt, "Unitary ESPRIT: How to Obtain Increased Estimation Accuracy with a Reduced Computational Burden," IEEE Trans. On Signal Proceeding, vol. 43, No. 5, pp. 1232-1242, May 1995, 11 pgs.

Hac et al., "Dynamic Channel Assignment in Wireless Communication Networks," International Journal of Network Management, pp. 38-60, Jan. 1, 1999, 23 pgs.

Hadad, et al., "Initial OFDMA/OFDMA PHY proposal for the 802.16.3 BWA," IEEE 802.16.3c-00/34, Oct. 30, 2000, 21 pgs.

Hagerman et al., "Adaptive Antennas in IS-136 Systems," 3 Vehicular Technology Conference, 1998, IEEE 48th, pp. 2282-2286, May 18-21, 1998, 5 pgs.

Hagerman et al., "Evaluation of Novel Multi-Beam Antenna Configurations for TDMA (IS-136) Systems," Vehicular Technology Conference, 1999 IEEE 49th, pp. 653-657, May 16, 1999, 5 pgs.

Hanaro et al., "Performance of Dynamic Channel Assignment Methods in Cellular Systems Using Beam Tilting and Adaptive Array," Proc. IEEE Vehicular Technology Conf., vol. 4, pp. 2092-2095, Sep. 1999, 4 pgs.

Hero et al., "Highlights of Statistical Signal and Array Processing," IEEE Signal Processing Magazine, vol. 15, No. 5, pp. 21-64, Sep. 2008, 44 pgs.

Hillebrand, "UMTS Work Program," UMTS Work Program, pp. 1-4, 1996, 4 pgs.

Heath et al., "Coordinated Training and Transmission for Improved Interference Cancellation in a Cellular Network," IEEE 0-7803-6514-3/00, pp. 939-945, Oct. 2000, 7 pgs.

HSPA+/LTE/SAE Textbook, pp. 48-55 and 130-133, Dec. 11, 2010, 7 pgs.

Huang et al., "A spatial clustering scheme for downlink beamforming in SDMA mobile radio," Proc. Of the 10th IEEE Work-ship on Statistical Signal and Array Processing, pp. 191-195, Aug. 2000, 5 pgs.

Huang et al., "SINR Maximizing Space-Time Filtering for Asynchronous DS-CDMA," IEEE Journal on Selected Areas in Communications, vol. 18, No. 7, pp. 1191-1202, Jul. 2000, 12 pgs.

HuaWave: Issue 3, Aug. 2011, 28 pgs.

Huawei webpage, 1pg.

IEEE Computer Society and the IEEE Microwave and Techniques Society, "Part 16: Air Interface for Fixed and Mobile Broadband

(56) References Cited

OTHER PUBLICATIONS

Wireless Access Systems, Amendment 2: Physical and Medium Access Control Layers for Combined Fixed and Mobile Operation in Licensed Bands, and Corrigendum 1," IEEE Std. 802.16e, Feb. 28, 2006, 11 pgs.
IEEE Computer Society and the IEEE Microwave and Techniques Society, "Part 16: Air Interface for Fixed Broadband Wireless Access Systems," IEEE Std 802.16-2004, IEEE, Oct. 2004, 895 pgs.
IEEE Computer Society, "Part 11: Wireless LAN Medium Access Control (MAC) and Physical Layer (PHY) specifications: High-Speed Physical Layer in the 5 GHZ Band," IEEE Std 802.11a-1999, IEEE Supplement, Sep. 16, 1999, 90 pgs.
IEEE Standard Dictionary of Electrical and Electronics Terms, Sixth Edition, p. 894, Apr. 1997, 2 pgs.
IEEE Standard Dictionary of Electrical and Electronic Terms, Sixth Edition, p. 959, Apr. 1997, 3 pgs.
Illustrated Dictionary of Electronics, Fourth Edition, p. 114, May 1988, 3 pgs.
Ishii et al., "Spatial and Temporal Equalization Based on an Adaptive Tapped-Delay-Line Array Antenna," IEICE Trans. Commun., vol. E78-B, No. 8, pp. 1162-1169, Aug. 1995, 9 pgs.
Jeng et al., "Experimental Studies of Spatial Signature Variation at 900 MHz for Smart Antenna Systems," IEEE Trans. On Antennas and Propagation, vol. 46, No. 7, pp. 953-962, Jul. 1998, 10 pgs.
Jeng et al., "Measurements of Spatial Signatures of an Antenna Array," Personal, Indoor, and Mobile Radio Communications, PIMRC'95, vol. 2, 0-7803-3002-1/95, pp. 669-672, Sep. 1995, 4 pgs.
Johnsson, Martin, "HiperLAN/2—The Broadband Radio Transmission Technology Operating in the 5 GHz Frequency Band," Global Forum, 1999, 22 pgs.
Johannisson, Bjorn (Ericsson), "Adaptive Base Station Antennas for Mobile Communication Systems," 1998 IEEE-APS Conference on Antennas and Propagation for Wireless Communications, pp. 49-52, Nov. 1-4, 1998, 4 pgs.
Kapoor, S. et al., "Adaptive Interference Suppression in Multiuser Wireless, OFDM Systems Using Antenna Arrays," IEEE Transactions on Signal Processing, vol. 47, No. 12, pp. 3381-3391, Dec. 1999, 11 pgs.
Katzela et al., "Channel Assignment Schemes for Cellular Mobile Telecommunication Systems: A Comprehensive Survey," IEEE Personal Communications, 1070-9916/96, pp. 10-31, Jun. 1996, 22 pgs.
Keller et al., "Adaptive Modulation Techniques for Duplex OFDM Transmission," IEEE vol. 49, No. 5, Sep. 2000, 14 pgs.
Kenkyuukai, "Shin Joho Tsushin Gairon," Information Communication Technology Research Society, 2nd Edition, Oct. 15, 2012, 2 pgs.
Kim, et al., "Performance Analysis of an MC-CDMA System with Antenna Array in a Fading Channel," IEICE Trans. Commun., vol. E83-B, No. 1, pp. 84-92, Jan. 2000, 9 pgs.
Kim, et al., "Spatial Multiuser Access OFDM with Antenna Diversity and Power Control," IEEE VTC 2000 at p. 273, pp. 273-279, vol. 1, Sep. 2000, 7 pgs.
Kinoshita et al, "Common Air Interface between Wide-Area Cordless Telephone and Urban Cellular Radio: Frequency Channel Dobully Reused Cellular Systems," IEICE Transactions B-2, vol. 76-B2, No. 6, pp. 487-495, Jun. 1993, 9 pgs.
Kinugawa, Y.et al., "Frequency and Time Division Multiple Access with Demand-Assignment Using Multicarrier Modulation for Indoor Wireless Communications Systems," IEICE Transactions on Communications, Institute of Electronics Information and Comm. Eng. Tokyo, Japan, vol. E77-B, No. 3, pp. 396-402, XP000451014, ISSN: 0916-8516, Mar. 1994, 7 pgs.
Kishore et al., "The Throughput of Adaptive Spread Spectrum Communication Over Multipath Dispersive Channels," ICPWC 2000, IEEE, pp. 532-537, Dec. 2000, 6 pgs.
Kivanc et al., "Subcarrier Allocation and Power control for OFDMA," IEEE 0-7803-6514-3/00, pp. 147-151, Oct. 2000, 5 pgs.
Kohno et al., "Adaptive Array Antenna Combined with Tapped Delay Line Using Processing Gain for Spread-Spectrum CDMA Systems," IEEE Int'l Symp. Personal Indoor and Mobile Radio Communications, pp. 634-638, Oct. 1992, 5 pgs.

Kojima, Fumihide, et al., "Adaptive Sub-Carriers Control Scheme for OFDM Cellular Systems," IEEE 51st Vehicular Technology Conference Proceedings, pp. 1065-1069, May 18, 2000, 5 pgs.
Kolding, "Link and System Performance Aspects of Proportional Fair Scheduling in WCDMA/HSDPA," Mar. 2003 IEEE 58th Vehicular Technology Conference, 2003, pp. 1717-1722, Oct. 6-9, 2003, 6 pgs.
Kronestedt et al., "Migration of Adaptive Antennas into Existing Networks," Vehicular Technology Conference, 1998, 48th IEEE, pp. 1670-1674, May 18-21, 1998, 5 pgs.
Kyritsi et., "Correlation Analysis Based on MIMO Channel Measurements in an Indoor Environment," IEEE Journal on Selected Areas in Communications, vol. 21, No. 5, pp. 713-720, Jun. 2003, 8 pgs.
Lawrey, Eric, "Multiuser OFDM," 5th International Symposium on Signal Processing and its Applications, pp. 761-764, Aug. 22, 1999, 4 pgs.
Lawrey, Eric, et al., "Adaptive Frequency Hopping for Multiuser OFDM," Second International Conference on Information Communication & Signal Processing, Dec. 7, 1999, 5 pgs.
Lazaro, O., et al., "Dynamic Channel Allocation Based on a Hopfield Neural Network and Requirements for Autonomous Operation in a Distributed Environment," IEEE, Sep. 1999, 5 pgs.
Lei et al, "A Multicarrier Allocation (MCA) Scheme for Variable-Rate 3G Wireless System," IEEE Communications Magazine, 0163-6804/00, pp. 86-91, Oct. 2000, 6 pgs.
Li et al., "Adaptive Antenna Arrays for OFDM Systems with Cochannel Interference," IEEE Transactions on Communications, vol. 47, pp. 217-229, Feb. 1999, 13 pgs.
Li et al., "Channel Estimation for OFDM Systems with Transmitter Diversity in Mobile Wireless Channels," IEEE Journal on Selected Areas in Communications, vol. 17, No. 3, 0733-8716/99, pp. 461-471, Mar. 1999, 11 pgs.
Li et al., "Clustered OFDM with Channel Estimation for High Rate Wireless Data," 1999 IEEE International Workshop on Mobile Multimedia Communications (MoMuC'99), Nov. 15-17, 1999, 9 pgs.
Li et al., "Effects of Clipping and Filtering on the Performance of OFDM," IEEE 0-7803-3659-3/97, pp. 1634-1638, May 1997, 5 pgs.
Li et al., "M-Sequences for OFDM Peak-to-Average Power Ratio Reduction and Error Correction," Electronics Letters, vol. 33, No. 7, Mar. 27, 1997, 2 pgs.
Li et al., "Robust Channel Estimation for OFDM Systems with Rapid Dispersive Fading Channels," IEEE Transactions on Communications, vol. 46, pp. 902-915, Jul. 1998, 14 pgs.
Li et al., "Robust transforms for channel estimator in clustered OFDM for high rate wireless data," IEEE 0-7803-6283-7/00, pp. 277-281, Jun. 2000, 5 pgs.
Li et al., "Transmitter diversity for OFDM Systems and its Impact on High-rate Data Wireless Networks," IEEE Journal on Selected Areas in Communications, vol. 17, pp. 1233-1243, Jul. 1999, 11 pgs.
Li, "Simplified Channel Estimation for OFDM Systems with Multiple Transmit Antennas," IEEE Trans. on Wireless Communications, vol. 1, pp. 67-75, Jan. 2002, 9 pgs.
Lin et al., "Experimental Studies of SDMA Schemes for Wireless Communications," Proc. IEEE Int. Conf. Acoust., Speech, Signal Processing, vol. 3, pp. 1760-1763, May 1995, 4 pgs.
Lin et al., "Error Control Coding, Fundamentals and Applications", Prentice Hall 1983, 21 pgs.
Liu, Hui, et al., "An Efficient Multiuser Loading Algorithm for OFDM-Based Broadband Wireless Systems," Global Telecommunications Conference, 2000 IEEE 0-7803-6451-1/00, pp. 103-107, Nov. 27, 2000, 5 pgs.
Liu et al., "Efficient Network Utilization for Multimedia Wireless Networks," C.G Omidyar (Ed.), MWCN 2000, pp. 108-122, May 2000, 15 pgs.
Love et al., "Performance of 3GPP High Speed Downlink Packet Access (HSDPA)," IEEE 60th Vehicular Technology Conference, pp. 3359-3363, Sep. 26-29, 2004, 5 pgs.
Lozano et al., "Integrated Dynamic Channel Assignment and Power Control in TDMA Mobile Wireless Communications Systems," IEEE JSAC special series on wireless, vol. 17, pp. 2031-2040, Nov. 1999, 10 pgs.
"LTE Overview," 3GPP Webpage, 4 pgs.

(56) References Cited

OTHER PUBLICATIONS

LTE Protocols and Procedures, Student Book LZT 123 8958 R1A, Ericsson, 2009, 4 pgs.
"LTE," ZTE Webpage, available at wwwen.zte.com.cn/en/products/wireless/lte, Nov. 6, 2012, 1pg.
"LTE-Advanced," 3GPP Webpage, available at www.3gpp.org/lte-advanced, Feb. 8, 2013, 5 pgs.
Luise et al., "Carrier Frequency Acquisition and Tracking for OFDM Systems," IEEE Transactions on Communications, vol. 44, No. 11, pp. 1590-1598, Nov. 1996, 9 pgs.
Maeda, Noriyuki et al., "A Delay Profile Information Based Subcarrier Power Control Combined With a Partial Non-Power Allocation Technique for OFDM/FDD Systems," IEEE, 0-7803-6465-5/00, pp. 1380-1384, 2000, 5 pgs.
Maehata et al., "DSRC Using OFDM for Roadside-Vehicle Communication System," IEEE 0-7803-5718-3/00, pp. 148-152, May 2000, 5 pgs.
Mehta et al., "Performance Analysis of Link Adaptation in Wireless Data Networks," 2000 Global Telecomm. Conf. 1422, 0-7803-6451-1/00, pp. 1422-1426, Nov. 27, 2000, 5 pgs.
Merriam-Webster's Collegiate Dictionary, Tenth Edition, pp. 59, 631, and 1058-1059, 1999, 6 pgs.
Mignone et al., "CD3-OFDM: A Novel Demodulation Scheme for Fixed and Mobile Receivers," IEEE Transactions on Communications, vol. 44, No. 9, pp. 1144-1151, Sep. 1996, 8 pgs.
Montalbano et al., "Spatio-temporal array processing for aperiodic CDMA downlink transmission," Conference Record of the Thirty-Third Asilomar Conference on Signals, Systems, and Computers, vol. 2, pp. 912-916, Oct. 1999, 5 pgs.
Motegi, M. et al., "Optimum Band Allocation According to Subband Condition for BST-OFDM," 11th IEEE International Symposium on Personal Indoor and Mobile Radio Communications, vol. 2, XP002213669, Piscataway, NJ, USA, ISBN: 0-7803-6465-5, pp. 1236-1240, Sep. 18-21, 2000, 5 pgs.
Munster, M., et al., "Co-Channel Interference Suppression Assisted Adaptive OFDM in Interference Limited Environments," IEEE VTC'99, 0-7803-5435-4/99, pp. 284-288, Sep. 17, 1999, 5 pgs.
Naguib et al., "Performance of CDMA Cellular Networks with Base-Station Antenna Arrays: The Downlink," Proc. IEEE Int'l Conf. on Communications 94, pp. 795-799, May 1994, 5 pgs.
Newton's Telecom Dictionary, CMP Books, pp. 57 and 346, Mar. 2004, 4 pgs.
Nogueroles et al., "Performance of a Random OFDMA System for Mobile Communications," IEEE 0-7803-3893-6/98, pp. 37-43, Feb. 1998, 7 pgs.
Nogueroles, R. et al., "Improved Performance of a Random OFDMA Mobile Communication System," Vehicular Technology Conference, 1998, VTC 98. 48th IEEE Ottawa, Ontario, Canada, XP010288120, ISBN: 0-7803-4320-4, pp. 2502-2506, May 18-21, 1998, 5 pgs.
Nakajima et al., "Keitai Denwa Wa Naze Tsunagarunoka," 2nd Edition, Nikkei, Feb. 27, 2012, 3 pgs.
OFDM/OFDMA Textbook, pp. 6-7, Sep. 21, 2008, 4 pgs.
OFDM/OFDMA Textbook, pp. 2-7, 56-61, and 280-281, Sep. 21, 2008, 8 pgs.
"OFDM/OFDMA," OFDM/OFDMA Textbook, pp. 2-8 and 73-85, Sep. 21, 2008, 22 pgs.
"OFDMA(SOFDMA)," WiMAX Ga Wakaru, pp. 46-47, Sep. 10, 2008, 4 pgs.
"OFDMA," NTT Docomo Webpage, available at http://www.nttdoconno.co.jp/corporate/technology/rd/tech/lte/lte01/03/01.html, Aug. 18, 2013, 2 pgs.
"OFDMA," NTT Docomo Webpage, May 10, 2013, 2 pgs.
Ohgane, Takeo et al., "A Study on a Channel Allocation Scheme with an Adaptive Array in SDMA," IEEE, 0-7803-3659-3/97, pp. 725-729, May 1997, 5 pgs.
Olfat et al., "Adaptive Beamforming and Power Allocation for OFDM Over Wireless Networks," IEEE 0-7803-5148-7/98, pp. 759-763, Nov. 1998, 5 pgs.

Olfat, Masoud, et al., "Low Complexity Adaptive Beamforming and Power Allocation for OFDM Over Wireless Networks," 1999 IEEE International Conference on Communications, 0-7803-5284-X/99, pp. 523-527, Jun. 6, 1999, 5 pgs.
"Optimus it L-05E," LG Webpage, 24 pgs.
Oxford English Dictionary, Second Edition, vol. I, p. 602, 1998, 4 pgs.
Oxford English Dictionary, Second Edition, vol. XIV, p. 901, 1998, 3 pgs.
Papavassiliou et al., "Improving the Capacity in Wireless Networks Through Integrated Channel Base Station and Power Assignment," IEEE Transactions on Vehicular Technology, vol. 47, No. 2, pp. 417-427, May 1998, 11 pgs.
Paulraj et al., "A Taxonomy of Space-Time Processing for Wireless Networks", IEEE vol. 145, No. 1, Feb. 1998, 21 pgs.
Paulraj et al., "Space-Time Processing for Wireless Comunication," IEEE Signal Processing magazine, pp. 49-53, Nov. 1997, 35 pgs.
Peixoto, "LTE: An Overview, High level considerations on practical implementation," Ericsson Internal, May 22, 2012, 3 pgs.
Piolini, Flavio et al., "Smart Channel-Assignment Algorithm for SDMA Systems," IEEE Transactions on Microwave Theory and Techniques, vol. 47, No. 6, pp. 693-699, Jun. 1999, 7 pgs.
Press Conference VoLTE, Ericsson Technical Paper, p. 8, Jul. 26, 2012, 1 pg.
Priscoli, "Basic Issues on Dynamic Allocation of PRMA Carriers," IEEE, 0-7803-2486-2/95, pp. 428-432, Jun. 1995, 5 pgs.
Qiu et al., "A Network-Assisted Dynamic Packet Assignment Algorithm for Wireless Data Networks," IEEE, VTC 2000, 0-7803-5718-3/00, pp. 735-739, May 2000, 5 pgs.
Qiu et al., "Third-Generation and Beyond (3.5G) Wireless Networks and Its Applications," 2002 International Symposium on Circuits and Systems, 2002 IEEE 0-7803-7448-7/02, pp. I-41-I-44, May 2002, 4 pgs.
Raleigh et al., "Spatio-Temporal Coding for Wireless Communication," IEEE Trnas. on Communications, vol. 46, No. 3, pp. 357-366, Mar. 1998, 10 pgs.
Random House Webster's College Dictionary, Second Edition, Random House New York, p. 15, Apr. 1999, 3 pgs.
Rashid-Farrokhi et al., "Transmit Beamforming and Power Control for Cellular Wireless Systems," IEEE Journal on Selected Areas in Communications, vol. 16, No. 8, pp. 1437-1450, Oct. 1998, 14 pgs.
Rhee et al., "Increase in Capacity of Multiuser OFDM System Using Dynamic Subchannel Allocation," IEEE VTC2000, 0-7803-5718-3/00, pp. 1085-1089, May 2000, 5 pgs.
Ritter, Gerhard, "Procedure and Radio Communication System to Allocate the Radio Resources of a Radio Interface," Translated by: Schreiber Translations Inc., Jun. 2007, 38 pgs.
Robertson et al., "The Effects of Doppler Spreads in OFDM(A) Mobile Radio Systems," IEEE 0-7803-5435-4, Institute for Communications Technology, German Aerospace Center (DLR), Sep. 1999, 5 pgs.
Rohling et al., "Adaptive Coding and Modulation in an OFDM-TDMA Communication System," IEEE VTC '98, 0-7803-4320-4/98, pp. 773-776, May 1998, 4 pgs.
Rohling et al., "Performance Comparison of Different Multiple Access Schemes for the Downlink of an OFDM Communication System," IEEE 0-7803-3659-3/97, pp. 1365-1369, May 1997, 5 pgs.
Roy et al., "ESPRIT—Estimation of Signal Parameters Via Rotational Invariance Techniques," IEEE Transactions on Acoustics, Speech, and Signal Processing, vol. 37, No. 7, pp. 984-995, Jul. 1989, 12 pgs.
Sari, Hikmet, "Trends and Challenges in Broadband Wireless Access," IEEE 0-7803-6684-0/00, pp. 210-214, Oct. 2000, 5 pgs.
Sartenaer et al., "Resource Allocation for Frequency-Selective Multiple Access Channels with Adaptive QAM Modulation," IEEE 0-7803-6684-0, Oct. 2000, 8 pgs.
Sathananthan et al., "Analysis of OFDM in the Presence of Frequency Offset and a Method to Reduce Performance Degradation," IEEE 0-7803-6451-1/00, pp. 72-76, Nov. 2000, 5 pgs.
Sato et al., "Evaluation for the Capacity of Band Division Multiplexing MC-CDMA System under Fading Environments," Technical

(56) References Cited

OTHER PUBLICATIONS

Report of IEICE A-P2000-97.SANE2000-74 RCS2000-120 (Oct. 2010), NII-Electronic Library Service, published Oct. 2000 [Translated], 7 pgs.
Sandell, Magnus, et al., "A Comparative Study of Pilot Based Channel Estimators for Wireless OFDM," published in Research Report TULEA 1996:19, Division of Signal Processing, Lulea University of Technology, Sep. 1996, 34 pgs.
Schmidt, Ralph O., "Multiple Emitter Location and Signal Parameter Estimation," IEEE Transactions on Antennas and Propagation, vol. AP-34, No. 3, pp. 276-280, Mar. 1986, 5 pgs.
Segal et al, "Initial OFDM/OFDMA PHY proposal for the 802.16.3 BWA," IEEE 802.16.3c-00/33, Oct. 2000, 19 pgs.
Shad et al., "Indoor SDMA Capacity Using a Smart Antenna Basestation," IEEE 0-7803-3777-8/97, pp. 868-872, Oct. 1997, 5 pgs.
Shao et al., "Antenna Selection for MIMO-OFDM Spatial Multiplexing System," ISIT 2003, Yokohama, Japan, IEEE 0-7803-7728-1/03, p. 90, Jun. 29-Jul. 4, 2003, 1 pg.
Sheikh et al., "Smart Antennas for Broadband Wireless Access Networks," IEEE Communication Magazine, vol. 37, No. 11, pp. 1-17, Nov. 1999, 17 pgs.
Shen et al., "Design Tradeoffs in OFDMA Uplink Traffic Channels," IEEE Int'l Con. on Acoustics, Speech, and Signal Processing, vol. 4, May 2004, 5 pgs.
"Shin Joho Tsushin Hayawakari Koza," Nikkei Business Publications, pp. 132-133, Jan. 1, 1999, 7 pgs (with English translation).
Shinmura, "Kojien," 6th Edition, Iwanami, Jan. 11, 2008, 3 pgs.
"SingleRAN LTE," Huawei webpage, 2pgs.
SMG#24, Tdoc SMG2 402/97, Philips Consumer Communications, ETSI, published Dec. 1997, "TD 402/97," 9 pgs.
Sollenberger et al., "Receiver Structures for Multiple Access OFDM," IEEE 0-7803-5565-2/99, pp. 468-472, May 1999, 5 pgs.
Spencer et al., "Channel Allocation in Multi-User MIMO Wireless Communications Systems," IEEE Conf. on Communications, vol. 5, pp. 3035-3039, Jun. 2004, 5 pgs.
Suard et al., "Uplink Channel Capacity of Space-Division-Multiple-Access Schemes," IEEE Trans. on Information Theory, vol. 44, No. 4, pp. 1468-1476, Jul. 1998, 9 pgs.
Sung et al., "User Speed Estimation and Dynamic Channel Allocation in Hierarchical Cellular System," IEEE 0-7803-1927-3/94, pp. 91-95, Jun. 1994, 5 pgs.
Sureau et al., "Sidelobe Control in Cylindrical Arrays," IEEE Trans. Ant. Prop., vol. AP-30, No. 5, pp. 1027-1031, Sep. 1982, 5 pgs.
Tangemann et al., "Comparison of Upgrade Techniques for Mobile Communication Systems," IEEE International Conference on Communications, 1994, pp. 201-205, May 1-5, 1994, 5 pgs.
Tangemann, "Influence of the User Mobility on the Spatial Multiplex Gain of an Adaptive SDMA System," 5th IEEE International Symposium on Personal, Indoor and Mobile Radio Communications, 1994, pp. 745-749, Sep. 18-23, 1994, 5 pgs.
Tangemann, "Near-Far Effects in Adaptive SDMA Systems," Sixth IEEE International Symposium on Personal, Indoor, and Mobile Radio Communications, 1995, Sep. 27-29, 1995, 5 pgs.
Telephony's Dictionary, Second Edition, Graham Langley, pp. 2-3, Apr. 1986, 4 pgs.
Toufik & Knopp, "Multiuser Channel Allocation Algorithms Achieving Hard Fairness," Dept. of Mobile Communications Eurecom Institute, QoS Seminaire, Nov. 26, 2004, 5 pgs.
Tralli et al., "Adaptive C-OFDM System at 30 GHz for the Last Mile Wireless Broadband Access to Interative Services," IEEE 0-7803-4788-9/98, pp. 1314-1319, Jun. 1998, 8 pgs.
Tse and Hanly, "Multiaccess Fading Channels—Part I: Polymatriod Structure, Optimal Resource Allocation and Throughput Capacities," IEEE Trans. Info. Theory, vol. 44, No. 7, pp. 2796-2815, Nov. 1998, 20 pgs.
Tsoulos et al., "Application of Adaptive Antenna Technology to Third Generation Mixed Cell Radio Architectures," Proc. IEEE 44th Vehicular Technology Conference, pp. 615-619, Jun. 1994, 5 pgs.
Tsoulos, G.V., "Smart Antennas for Mobile Communication Systems: Benefits and Challenges," Electronics & Communication Engineering Journal, pp. 84-94, Apr. 1999, 12 pgs.
Tufvesson et al., "Pilot Assisted Channel Estimation for OFDM in Mobile Cellular Systems," Department of Applied Electronics, Lund University, VTC'97, May 1997, 5 pgs.
Tureli et al., "Software Radio Implementation of Carrier Offset Estimation for OFDM Communications," Conf. Record of the 32nd Asilomar Conference on Signals, Systems Computers, vol. 1, pp. 60-64, Nov. 1, 1998, 5 pgs.
"Urbano," Kyocera Webpage, available at www.kyocera.co.jp/prdct/telecom/consumer/101/spec/index.html#specifications, Aug. 5, 2013, 12 pgs.
"ULTRA WiFi 4G SoftBank 102Z," ZTE Webpage, 4 pgs.
Universal Mobile Telecommunications System (UMTS); UMTS Terrestrial Radio Access (UTRA); Concept Evaluation (UMTS 30.06 version 3.0.0), ETSI, ETSI OFDMA Concept Evaluation, TR 101 146 V3.0.0, Dec. 1997, 689 pgs.
Valenzuela et al., "Estimating Local Mean Signal Strength of Indoor Multipath Propagation," IEEE Transactions on Vehicular Technology, vol. 46, No. 1, pp. 203-212, Feb. 1997, 11 pgs.
Van de Beek et al., "A Conceptual Study of OFDM-based Multiple Access Schemes: Part 2—Channel Estimation in the Uplink," Tdoc 116/96, ETSI STC SMG2, meeting No. 18, Helsinki, Finland, Sep. 1996, 7 pgs.
Van de Beek et al, "A Conceptual Study of OFDM-based Multiple Access Schemes: Part 4, Tracking of Time Frequency Offsets," Tdoc 250/96, ETSI STC SMG2, meeting No. 20, Nice, France, Dec. 1996, 12 pgs.
Van de Beek et al., "A Time and Frequency Synchronization Scheme for Multiuser OFDM," IEEE Journal on Selected Areas in Communication, vol. 17, No. 11, pp. 1900-1914, Nov. 1999, 15 pgs.
Van de Beek et al., "On Channel Estimation in OFDM Systems", Proceedings of Vehicular Technology Conference (VTC 95) vol. 2, pp. 815-819, Sep. 1995, 6 pgs.
Van de Beek et al., "Synchronization and Channel Estimation in OFDM Systems," Lulea University of Technology, Division of Signal Processing, Lulea, Sweden, Sep. 1998, 158 pgs.
Van de Beek et al., "Synchronization of a TDMA-OFDM Frequency Hopping System," In Proc. IEEE Vehic. Technol. Conf., vol. 2, pp. 1290-1294, Ottawa, Canada, May 1998, 6 pgs.
Van Nee et al., "OFDM for Wireless Multimedia Communications," Artech House, published Dec. 22, 1999, 272 pgs.
Van Nee et al., "OFDM for Wireless Multimedia Communications," Artech House Universal Personal Communications, copyright 2000, 14 pgs.
Vandenameele et al., "A Combined OFDM/SDMA Approach for WLAN," IEEE 49th Vehicular Tech. Conf., vol. 2, IEEE 0-7803-5565-2/99, pp. 1712-1716, May 1999, 5 pgs.
Viswanathan et al., "Adaptive Coded Modulation Over Slow Frequency-Selective Fading Channels," IEEE 0-7803-5565-2/99, pp. 2388-2392, May 1999, 5 pgs.
Vook, et al., "Adaptive Array method, Device, Base Station, and Subscriber Unit," Jan. 1998, 16 pgs.
Wahlqvist et al., "A Conceptual Study of OFDM-Based Multiple Access Schemes, Part 1: Air Interface Requirements," Telia Research AB, May 6, 1996, 6 pgs.
Wahlqvist et al., "Capacity Comparison of an OFDM Based Multiple Access System Using Different Dynamic Resource Allocation," IEEE 0-7803-3659-3/97, pp. 1664-1668, May 1997, 5 pgs.
Wahlqvist et al., "Description of Telias OFDM Based Proposal (Working document in the OFDM concept group)," Telia, ETSI STC SMG2#22, Tdoc 180/97, May 12-16, 1997, 22 pgs.
Wahlqvist, "Design and Evaluation of an OFDM-based Proposal for Third Generation Mobile Communication," Lulea 1998:25, Lulea University of Technology, published Jul. 1998, 118 pgs.
Wahlqvist et al., "Time Synchronization in the uplink of an OFDM system," In Proc. IEEE Vehic. Technol. Conf., vol. 3, Atlanta, pp. 1569-1573, May 1996, 5 pgs.
Wahlqvist et al., "WW3/BAI Registered Documents," dated Sep. 26, 1995, 932 pgs.

(56) References Cited

OTHER PUBLICATIONS

Wang et al., "Dynamic Channel Resource Allocation in Frequency Hopped Wireless Communication Systems," IEEE 0-7803-2015-8/94, p. 229, Jul. 1994, 1 pg.

Ward, James and Compton, R. Ted, Jr., "High Throughput Slotted ALOHA Packet Radio Networks with Adaptive Arrays," IEEE Transactions on Communications, vol. 41, No. 3, pp. 460-470, Mar. 1993, 11pgs.

Webster's Encyclopedic Unabridged Dictionary of the English Language, Gramercy Books, p. 1734, Apr. 1996, 3 pgs.

Webster's New Ninth Collegiate Dictionary, p. 1303, 1991, 3 pgs.

Webster's New World College Dictionary, Third Edition, p. 70, Jun. 1997, 2 pgs.

Weinstein et al., "Data Transmission by Frequency-Division Multiplexing using the Discrete Fourier Transform," IEEE Trans. On Comm. Tech., vol. com-19, No. 5, pp. 628-634, Oct. 1971, 7 pgs.

Willars et al., "Distribution of WW3 October-95 Deliverable," dated Sep. 29, 1995, 296 pgs.

Winters et al., "The Impact of Antenna Diversity on the Capacity of Wireless Communication Systems," IEEE Trans. On Communications, vol. 42, No. 2/3/4, pp. 1740-1751, Feb./Mar./Apr. 1994, 12 pgs.

Winters, "Signal Acquisition and Tracking with Adaptive Arrays in the Digital Mobile Radio System IS-54 with Flat Fading," IEEE Transactions on Vehicular Technology, vol. 43, No. 4, pp. 377-384, Nov. 1993, 8 pgs.

"Wireless City Planning," ZTE Webpage, available at www.zte.co.jp/press_center/news/ztejapan/201109/t20110928_9277.html, Feb. 21, 2013, 1 pg.

Wolniansky P.W. et al., "V-BLAST: An Architecture for Realizing Very High Data Rates Over the Rich-Scattering Wireless Channel," 1998 URSI Int'l Symposium on Signals, Systems, and Electronics, pp. 295-300, Sep. 1998, 6 pgs.

Wong et al., "A Real-Time Sub-Carrier Allocation Scheme for Multiple Access Downlink OFDM Transmission," IEEE 0-7803-5435-4/99, pp. 1124-1128, Sep. 1999, 5 pgs.

Wong, K-K, et al., "Adaptive Antennas at the Mobile and Base Stations in an OFDM/TDMA Systems," IEEE, 0-7803-4984-9/98, pp. 183-188, Nov. 1998, 6 pgs.

Wong et al., "Adaptive Antennas at the Mobile and Base Stations in an OFDM/TDMA Systems," Department of Electrical & Electronic Engineering, The Hong Kong University of Science & Technology, Clear Water Bay, Kowloon, Hong Kong, Pre-Published Version, 6 pgs.

Wong, Kai-Kit, et al., "Adaptive Antennas at the Mobile and Base Stations in an OFDM/TDMA Systems," IEEE Transactions on Communications, vol. 49, No. 1, pp. 195-206, Jan. 2001, 12 pgs.

Wong et al., "Investigating the Performance of Smart Antenna Systems at the Mobile and Base Stations in the Down and Uplinks," Proceedings of 1998 IEEE Vehicular Technology Conference, vol. 2, pp. 880-884, May 1998, 5 pgs.

Wong et al., "Multiuser Subcarrier Allocation for OFDM Transmission Using Adaptive Modulation," IEEE 0-7803-5565-2/99, pp. 479-483, May 1999, 5 pgs.

Wong, C. Y., et al., "Multiuser OFDM With Adaptive Subcarrier, Bit, and Power Allocation," IEEE Journal on Selected Areas in Communications, IEEE Inc., New York, USA, vol. 17, No. 10, XP000855475, ISSN: 0733-8716/99, pp. 1747-1758, Oct. 1999, 12 pgs.

Xu et al., "Experimental Studies of Space-Division-Multiple-Access Schemes for Spectral Efficient Wireless Communications," IEEE 0-7803-1825-0/94, pp. 800-804, May 1994, 5 pgs.

Xu et al., "Throughput Multiplication of Wireless LANs for Multimedia Services: SDMA Protocol Design," IEEE 0-7803-1820-X/94, pp. 1326-1332, Nov. 1994, 7 pgs.

Yan et al., "Rate Adaptive Space-time Modulation Techniques for Combating Cochannel Interference," 2001 IEEE Intl Conf. on Acoustics, Speech, and Signal processing, pp. 2469-2472, May 2001, 4 pgs.

Yener et al., "Combined temporal and spatial filter structures for CDMA systems," IEEE Vehicular Technology Conference, vol. 5, 0-7803-6507-0/00, pp. 2386-2393, Sep. 2000, 8 pgs.

Yin, "Cross Layer Design and Optimization of Wireless Networks," University of Washington, 2001, 142 pgs.

Yin & Liu, "Dynamic Scheduling in Antenna Array Packet Radio," Conference Record of the 33rd Asilomar Conference on Signals, Systems, and Computers, vol. 1, IEEE, 0-7803-5700-0/99, pp. 154-158, Oct. 1999, 5 pgs.

Yin & Liu, "An SDMA Protocol for Wireless Multimedia Networks," 2000 IEEE International Conference on Acoustics, Speech, and Signal Processing, vol. 5, IEEE, 0-7803-6293-4/00, pp. 2613-2616, Jun. 2000, 4 pgs.

Yin & Liu, "Performance of Space-Division Multiple-Access (SDMA) With Scheduling," IEEE Transactions on Wireless Communications, vol. 1, No. 4, pp. 611-618, Oct. 2002, 8 pgs.

Yu et al., "Transmit Selection Diversity Technique in the MIMO-OFDM System for HSDPA," Vehicular Technology Conference 2004, VTC 2004, Spring 2004, IEEE 59th, vol. 1, pp. 362-366, May 2004, 5 pgs.

Yukiji, Yamauchi, "Towards the Spread Spectrum Communication Next Generation High Performance Communication," Tokyo Denki University Publication Bureau, pp. 123-125, Dec. 20, 1997, 7 pgs (with English translation).

Zhang, Yunjun et al., "Orthogonal Frequency Division Multiple Access Peak-to-Average Power Ratio Reduction using Optimized Pilot Symbols," IEEE International Conference on Communication Technology Proceedings, vol. 1, pp. 574-577, Aug. 21, 2000, 4 pgs.

Zwick et al., "A Statistical Model for Indoor Environments Including Angle of Arrival, 48th IEEE Vehicular Technology Conference," IEEE 0-7803-4320-4/98, pp. 615-619, May 1998, 5 pgs.

Zysman et al., "Technology Evolution for Mobile and Personal Communications," Bell Labs Technical Journal, pp. 107-129, Jan.-Mar. 2000, 23 pgs.

"PicoNode," Nortel, available at http://www.nortelnetworks.com/products/01/gsmlpn.html, 1999, 4pgs.

"Wireless LAN," Nokia, available at http://www.nokia.com/corporate/wlan/woffice.htrnl, Dec. 2000, 2 pgs.

*Adaptix Inc. v. Huawei Japan*, Japanese Litigation Case No. 28418 regarding corresponding Japanese Patent Nos. 3980478 and 4213466, Description of Evidence 4 filed by Defendant (Huawei) dated Dec. 25, 2013, 2 pgs.

*Adaptix Inc. v. Huawei Japan*, Japanese Litigation Case No. 28418 regarding corresponding Japanese Patent Nos. 3980478 and 4213466, Description of Evidence 5 filed by Plaintiff (Adaptix) dated Dec. 25, 2013, 2 pgs.

*Adaptix Inc. v. Huawei Japan*, Japanese Litigation Case No. 28418 regarding corresponding Japanese Patent Nos. 3980478 and 4213466, Description of Evidence 6 filed by Plaintiff (Adaptix) dated Dec. 25, 2013, 2 pgs.

*Adaptix Inc. v. Huawei Japan*, Japanese Litigation Case No. 28418 regarding corresponding Japanese Patent Nos. 3980478 and 4213466, Preparatory Document 10 filed by Defendant (Huawei) dated Dec. 25, 2013, 31 pgs.

*Adaptix Inc. v. Huawei Japan*, Japanese Litigation Case No. 28418 regarding corresponding Japanese Patent Nos. 3980478 and 4213466, Preparatory Document 11 filed by Defendant (Huawei) dated Dec. 25, 2013, 25 pgs.

*Adaptix Inc. v. Huawei Japan*, Japanese Litigation Case No. 28418 regarding corresponding Japanese Patent Nos. 3980478 and 4213466, Preparatory Document 7 filed by Plaintiff (Adaptix) dated Dec. 25, 2013, 74 pgs.

*Adaptix Inc. v. Huawei Japan*, Japanese Litigation Case No. 28418 regarding corresponding Japanese Patent Nos. 3980478 and 4213466, Preparatory Document 8 filed by Plaintiff (Adaptix) dated Dec. 25, 2013, 7 pgs.

*Adaptix Inc. v. ZTE Japan*, Japanese Litigation Case No. 31440 regarding corresponding Japanese Patent Nos. 3980478 and 4213466, Complaint filed by Plaintiff (Adaptix) dated Nov. 6, 2012, 33 pgs.

(56) References Cited

OTHER PUBLICATIONS

*Adaptix Inc.* v. *ZTE Japan*, Japanese Litigation Case No. 31440 regarding corresponding Japanese Patent Nos. 3980478 and 4213466, Preparatory Document 2 filed by Plaintiff (Adaptix) dated Sep. 10, 2013, 42 pgs.
*Adaptix Inc.* v. *Ericsson Japan*, Japanese Litigation Case No. 1149 regarding corresponding Japanese Patent Nos. 3980478 and 4213466, Description of Evidence 3 filed by Plaintiff (Adaptix) dated Dec. 13, 2013, 3 pgs.
*Adaptix Inc.* v. *Ericsson Japan*, Japanese Litigation Case No. 1149 regarding corresponding Japanese Patent Nos. 3980478 and 4213466, Preparatory Document 3 filed by Plaintiff (Adaptix) dated Dec. 13, 2013, 65 pgs.
*Adaptix Inc.* v. *ZTE Japan*, Japanese Litigation Case No. 19919 regarding corresponding Japanese Patent No. 4201595, Description of Evidence 2 filed by Defendant (ZTE) dated Jan. 17, 2014, 4 pgs.
*Adaptix Inc.* v. *ZTE Japan*, Japanese Litigation Case No. 19919 regarding corresponding Japanese Patent No. 4201595, Description of Evidence 2 filed by Plaintiff (Adaptix) dated Jan. 17, 2014, 3 pgs.
*Adaptix Inc.* v. *ZTE Japan*, Japanese Litigation Case No. 19919 regarding corresponding Japanese Patent No. 4201595, Preparatory Document 1 filed by Defendant (ZTE) dated Jan. 17, 2014, 10 pgs.
*Adaptix Inc.* v. *ZTE Japan*, Japanese Litigation Case No. 19919 regarding corresponding Japanese Patent No. 4201595, Preparatory Document 2 filed by Defendant (ZTE) dated Jan. 17, 2014, 159 pgs.
*Adaptix Inc.* v. *ZTE Japan*, Japanese Litigation Case No. 19919 regarding corresponding Japanese Patent No. 4201595, Preparatory Document 1 filed by Plaintiff (Adaptix) dated Jan. 17, 2014, 73 pgs.
Written Statement for Oral Presentation (JPO) filed by Adaptix dated Jan. 21, 2014 relating to Japanese Invalidation Trial No. 2013-800083 regarding corresponding Japanese Patent No. 4213466, 49 pgs.
Written Statement for Oral Presentation (JPO) filed by ZTE dated Jan. 21, 2014 relating to Japanese Invalidation Trial No. 2013-800083 regarding corresponding Japanese Patent No. 4213466, 25 pgs.
3rd Generation Partnership Project, 3GPP TR 21.801 V10.1.2, pp. 7 and 36, Sep. 2011, 6 pgs.
3rd Generation Partnership Project, 3GPP TS 36.211 V10.5.0, pp. 52, 56-60, 73-74, and 86-87, Jun. 2012, 14 pgs.
3rd Generation Partnership Project, 3GPP TS 36.211 V8.9.0, pp. 46, 51-53, and 65-66, Dec. 2009, 9 pgs.
3rd Generation Partnership Project, 3GPP TS 36.211 V8.9.0, p. 66, Dec. 2009, 3 pgs.
3rd Generation Partnership Project, 3GPP TS 36.213 V10.5.0, pp. 26, 28-30, 46-62, and 65, Mar. 2012, 36 pgs.
3rd Generation Partnership Project, 3GPP TS 36.213 V8.8.0, pp. 21, 23, 37-47, and 49, Sep. 2009, 24 pgs.
3rd Generation Partnership Project, 3GPP TS 36.300 V10.5.0, p. 22, Sep. 2011, 3 pgs.
3rd Generation Partnership Project, 3GPP TS 36.300 V8.12.0, p. 19, Mar. 2010, 3 pgs.
3rd Generation Partnership Project, 3GPP TS 36.423 V8.9.0, pp. 10-16, Mar. 2010, 10 pgs.
3rd Generation Partnership Project, 3GPP TS 36.423 V10.5.0, pp. 11-19, Mar. 2012, 12 pgs.
Dehlman et al., "3G Evolution: HSPA and LTE for Mobile Broadband," 2nd edition, pp. 318-329, Dec. 25, 2009, 8 pgs.
"Dictionary of Terms of Radio-Telecommunication," pp. 374-375, Jun. 1, 1992, 3 pgs.
Huawei webpage, available at www.huawei.com/jp/about-huawei/newsroom/press-release/hw-104207-huawei.htm, Dec. 13, 2012, 4 pgs.
IEEE Xplore, "Search Results for Clustered OFDM with channel estimation for high rate wireless data," Dec. 10, 2013, 2 pgs.
IEEE Xplore, "Search Results for Performance comparison of different multiple access schemes for the downlink of an OFDM communication system," Dec. 10, 2013, 2 pgs.

"IEICE Dictionary of Electronics, Information and Communication Terms," Corona Publishing Co., Ltd, pp. 132-133 and 1280, Jul. 9, 1999, 3 pgs.
"IEICE Dictionary of Electronics, Information and Communication Terms," Corona Publishing Co., Ltd, pp. 318-319, 416-417, and 1280, Jul. 9, 1999, 4 pgs.
Keller, Thomas, et al., "Adaptive Multicarrier Modulation: A Convenient Framework for Time-Frequency Processing in Wireless Communications," IEEE Proceedings of the IEEE, vol. 88, No. 5, pp. 611-640, May 5, 2000, 30 pgs.
NTT Technical Journal, "Super 3G (LTE)," pp. 15-21, Nov. 2008, 7 pgs.
OFDM/OFDMA Textbook, pp. 56-57, 60-65, and 78-79, Sep. 21, 2008, 6 pgs.
OFDM/OFDMA Textbook, pp. 78-85, Sep. 21, 2008, 10 pgs.
Royer, "ACA-579 Japan Live Testing Report," Revision 1.0, Global Intellectual Strategies, Oct. 30, 2013, 24 pgs.
Sari et al., "An Analysis of Orthogonal Frequency-Division Multiple Access," IEEE 0-7803-4198-8/97, pp. 1635-1639, Nov. 1997, 5 pgs.
6:12-cv-17, -20, -120, Plaintiff's Opening Claim Construction Brief with Exhibits, Jan. 10, 2014, 145 pgs.
6:12-cv-17, -20, -120, Defendants' Responsive Claim Construction Brief with Exhibits, Feb. 3, 2014, 163 pgs.
6:12-cv-17, -20, -120, Plaintiff's Reply Claim Construction Brief with Exhibits, Feb. 18, 2014, 176 pgs.
6:12-cv-17, -20, -120, Memorandum Opinion and Order, U.S. District Court for the Eastern District of Texas, U.S. Magistrate Judge Caroline M. Craven, Mar. 12, 2014, 34 pgs.
6:12-cv-22, -122, -123, 6:13-cv-49, -50, 6:12-cv-369, Plaintiff's Reply Claim Construction Brief with Exhibits, Jan. 15, 2014, 259 pgs.
6:12-cv-22, -122, -123, 6:13-cv-49, -50, 6:12-cv-369, Memorandum Opinion and Order, U.S. District Court for the Eastern District of Texas, U.S. Magistrate Judge Caroline M. Craven, Feb. 26, 2014, 112 pgs.
5:13-cv-1774, -1776, -1777, -1778, -1884, -2023, Defendants' First Amended Invalidity Contentions Pursuant to Patent Local Rules 3-3 and 3-4 with Exhibits, Jan. 15, 2014, 1,034 pgs.
*Adaptix Inc.* v. *Huawei*, Japanese Litigation Case No. 28418 regarding corresponding Japanese Patent Nos. 3980478 and 4213466, Plaintiff's (Adaptix) Response to Defendant's (Huawei) Dec. 25, 2013 Invalidity Contention Brief, Feb. 28, 2014, 23 pgs.
*Adaptix Inc.* v. *Huawei*, Japanese Litigation Case No. 28418 regarding corresponding Japanese Patent Nos. 3980478 and 4213466, List of Supporting Documents (cited in Plaintiff's Response to Defendant's Dec. 25, 2013 Invalidity Contention of Feb. 28, 2014) filed by Plaintiff (Adaptix), Feb. 28, 2014, 2 pgs.
*Adaptix Inc.* v. *Huawei*, Japanese Litigation Case No. 28418 regarding corresponding Japanese Patent Nos. 3980478 and 4213466, Defendant's (Huawei) Response to Plaintiff's (Adaptix) Dec. 25, 2013 Infringement Contention Brief, Feb. 28, 2014, 18 pgs.
*Adaptix Inc.* v. *Huawei*, Japanese Litigation Case No. 28418 regarding corresponding Japanese Patent Nos. 3980478 and 4213466, Defendant's (Huawei) Response to Plaintiff's (Adaptix) Jul. 31, 2013 and Dec. 25, 2013 Infringement Contention Briefs, Feb. 28, 2014, 14 pgs.
*Adaptix Inc.* v. *Huawei*, Japanese Litigation Case No. 28418 regarding corresponding Japanese Patent Nos. 3980478 and 4213466, Defendant's (Huawei) Invalidity Contention Brief, Feb. 28, 2014, 82 pgs.
*Adaptix Inc.* v. *Huawei*, Japanese Litigation Case No. 28418 regarding corresponding Japanese Patent Nos. 3980478 and 4213466, List of Non-Prior Art Documents (cited in Defendant's Response to Plaintiff's Jul. 31, 2013 and Dec. 25, 2013 Infringement Contention Briefs of Feb. 28, 2014) filed by Defendant (Huawei), Feb. 28, 2014, 2 pgs.
*Adaptix Inc.* v. *Huawei*, Japanese Litigation Case No. 28418 regarding corresponding Japanese Patent Nos. 3980478 and 4213466, List of Prior Art Documents (cited Defendant's Invalidity Contention Brief of Feb. 28, 2014) filed by Defendant (Huawei), Feb. 28, 2014, 2 pgs.

(56) References Cited

OTHER PUBLICATIONS

*Adaptix Inc. v. ZTE Japan*, Japanese Litigation Case No. 31440 regarding corresponding Japanese Patent Nos. 3980478 and 4213466, Plaintiff's (Adaptix) Infringement Contention Brief, Feb. 28, 2014, 76 pgs.
*Adaptix Inc. v. ZTE Japan*, Japanese Litigation Case No. 31440 regarding corresponding Japanese Patent Nos. 3980478 and 4213466, Plaintiff's (Adaptix) Response to Defendant's (ZTE) Dec. 16, 2013 Invalidity Contention Brief, Feb. 28, 2014, 89 pgs.
*Adaptix Inc. v. ZTE Japan*, Japanese Litigation Case No. 31440 regarding corresponding Japanese Patent Nos. 3980478 and 4213466, List of Supporting Documents (cited in Plaintiff's Infringement Contention Brief of Feb. 28, 2014) filed by Plaintiff (Adaptix), Feb. 28, 2014, 4 pgs.
*Adaptix Inc. v. ZTE Japan*, Japanese Litigation Case No. 31440 regarding corresponding Japanese Patent Nos. 3980478 and 4213466, Plaintiff's (Adaptix) Clarification on Infringement Contention Brief of Feb. 28, 2014, Mar. 20, 2014, 20 pgs.
*Adaptix Inc. v. ZTE Japan*, Japanese Litigation Case No. 31440 regarding corresponding Japanese Patent Nos. 3980478 and 4213466, List of Supporting Document (cited in Plaintiff's Clarification on Infringement Contention Brief filed on Feb. 28, 2014) filed by Plaintiff (Adaptix), Mar. 20, 2014, 2 pgs.
*Adaptix Inc. v. Ericsson Japan*, Japanese Litigation No. 1149 regarding corresponding Japanese Patent No. 3980478 and 4213466, Defendant's (Ericsson) Non-Infringement Contention and Invalidity Contention Briefs, Feb. 28, 2014, 38 pgs.
*Adaptix Inc. v. Ericsson Japan*, Japanese Litigation No. 1149 regarding corresponding Japanese Patent No. 3980478 and 4213466, List of Non-Prior Art/Prior Art Documents (cited in Defendant's Non-Infringement Contention and Invalidity Contention Briefs of Feb. 28, 2014) filed by Defendant (Ericsson), Feb. 28, 2014, 2 pgs.
*Adaptix Inc. v. Huawei Japan*, Japanese Litigation Case No. 17915 regarding corresponding Japanese Patent No. 4201595, Claim Construction/Infringement Brief filed by Defendant (Huawei) dated Jan. 27, 2014, 23 pgs.
*Adaptix Inc. v. Huawei Japan*, Japanese Litigation Case No. 17915 regarding corresponding Japanese Patent No. 4201595, List of Non-Prior Art Documents (cited in Claim Construction/Infringement Brief of Jan. 27, 2014) filed by Defendant (Huawei) dated Jan. 27, 2014, 2 pgs.
*Adaptix Inc. v. Huawei Japan*, Japanese Litigation Case No. 17915 regarding corresponding Japanese Patent No. 4201595, Plaintiff's (Adaptix) Infringement Contention Brief, Mar. 10, 2014, 95 pgs.
*Adaptix Inc. v. Huawei Japan*, Japanese Litigation Case No. 17915 regarding corresponding Japanese Patent No. 4201595, List of Supporting Documents (cited in Plaintiff's Infringement Contention of Mar. 10, 2014) filed by Plaintiff (Adaptix), Mar. 10, 2014, 5 pgs.
*Adaptix Inc. v. ZTE Japan*, Japanese Litigation Case No. 19919 regarding corresponding Japanese Patent No. 4201595, Plaintiff's (Adaptix) Response to Defendant's (ZTE) Jan. 17, 2014 Invalidity Contention Brief, Mar. 28, 2014, 67 pgs.
*Adaptix Inc. v. ZTE Japan*, Japanese Litigation Case No. 19919 regarding corresponding Japanese Patent No. 4201595, Defendant's (ZTE) Non-Infringement Contention Brief, Mar. 28, 2014, 25 pgs.
*Adaptix Inc. v. ZTE Japan*, Japanese Litigation Case No. 19919 regarding corresponding Japanese Patent No. 4201595, Defendant's (ZTE) Invalidity Contention Brief, Mar. 28, 2014, 46 pgs.
*Adaptix Inc. v. ZTE Japan*, Japanese Litigation Case No. 19919 regarding corresponding Japanese Patent No. 4201595, List of Non-Prior Art/Prior Art Documents (cited in Defendant's Invalidity Contention Brief of Mar. 28, 2014) filed by Defendant (ZTE), Mar. 28, 2014, 3 pgs.
*Adaptix Inc. v. Kyocera*, Japanese Litigation Case No. 22141 regarding corresponding Japanese Patent No. 4201595, Claim Construction/Infringement Brief filed by Plaintiff (Adaptix) dated Jan. 31, 2014, 86 pgs.
*Adaptix Inc. v. Kyocera*, Japanese Litigation Case No. 22141 regarding corresponding Japanese Patent No. 5119070, Supplemental Claim Construction/Infringement Brief filed by Plaintiff (Adaptix) dated Jan. 31, 2014, 32 pgs.
*Adaptix Inc. v. Kyocera*, Japanese Litigation Case No. 22141 regarding corresponding Japanese Patent No. 5119070, List of Non-Prior Art/Prior Art Documents (cited in Supplemental Claim Construction/Infringement Brief of Jan. 31, 2014) filed by Plaintiff (Adaptix) dated Jan. 31, 2014, 4 pgs.
*Adaptix Inc. v. Kyocera*, Japanese Litigation Case No. 22141 regarding corresponding Japanese Patent No. 4201595, Claim Construction/Infringement Brief filed by Defendant (Kyocera) dated Feb. 10, 2014, 6 pgs.
*Adaptix Inc. v. Kyocera*, Japanese Litigation Case No. 22141 regarding corresponding Japanese Patent No. 4201595, Plaintiff's (Adaptix) Clarification on Infringement Contention Brief of Jan. 31, 2014, Mar. 13, 2014, 11 pgs.
*Adaptix Inc. v. Kyocera*, Japanese Litigation Case No. 22141 regarding corresponding Japanese Patent No. 4201595, List of Supporting Document (cited in Plaintiff's Clarification on Infringement Contention Brief of Mar. 13, 2014) filed by Plaintiff (Adaptix), Mar. 13, 2014, 2 pgs.
*Adaptix Inc. v. LG Electronics*, Japanese Litigation Case No. 23278 regarding corresponding Japanese Patent No. 4201595, Invalidity Contention/Claim Construction Brief filed by Defendant (LG Electronics) dated Feb. 10, 2014, 27 pgs.
*Adaptix Inc. v. LG Electronics*, Japanese Litigation Case No. 23278 regarding corresponding Japanese Patent No. 4201595, List of Non-Prior Art/Prior Art Documents (cited in Invalidity Contention/Claim Construction Brief of Feb. 10, 2014) filed by Defendant (LG Electronics) dated Feb. 10, 2014, 3 pgs.
*Adaptix Inc. v. LG Electronics*, Japanese Litigation Case No. 23278 regarding corresponding Japanese Patent No. 4201595, Claim Construction/Infringement Brief filed by Plaintiff (Adaptix) dated Feb. 10, 2014, 92 pgs.
*Adaptix Inc. v. LG Electronics*, Japanese Litigation Case No. 23278 regarding corresponding Japanese Patent No. 5119070, Supplemental Claim Construction/Infringement Brief filed by Plaintiff (Adaptix) dated Feb. 10, 2014, 32 pgs.
*Adaptix Inc. v. LG Electronics*, Japanese Litigation Case No. 23278 regarding corresponding Japanese Patent No. 5119070, List of Non-Prior Art/Prior Art Documents (cited in Supplemental Claim Construction/Infringement Brief of Feb. 10, 2014 filed by Plaintiff (Adaptix) dated Feb. 10, 2014, 4 pgs.
*ZTE Japan v. Adaptix Inc.*, Japanese Invalidation Trial No. 2013-800083 regarding corresponding Japanese Patent No. 4213466, Notice of Finalization of Trial Examination issued by Trial Examiner-in-Chief, Mar. 6, 2014, 1 pg.
*ZTE Japan v. Adaptix Inc.*, Japanese Invalidation Trial No. 2014-800008 regarding corresponding Japanese Patent No. 4201595, Demand filed by ZTE, Jan. 16, 2014, 140 pgs.
3rd Generation Partnership Project, 3GPP TR 21.801 V8.1.0, pp. 7 and 36, Mar. 2008, 6 pgs.
3rd Generation Partnership Project, 3GPP TS 36.211 V8.9.0, pp. 45-46 and 65-66; Dec. 2009; 11 pgs.
3rd Generation Partnership Project, 3GPP TS 36.213 V8.8.0, pp. 23, 34-35, and 37-49, Sep. 2009, 29 pgs.
3rd Generation Partnership Project, 3GPP TS 36.331 V10.12.0, p. 168, Dec. 2013, 3 pgs.
3rd Generation Partnership Project, 3GPP TS 36.401 V10.4.0, p. 10, Jun. 2012, 3 pgs.
3rd Generation Partnership Project, 3GPP TS 36.420 V10.2.0, pp. 6 and 8, Sep. 2011, 4 pgs.
3rd Generation Partnership Project, 3GPP TS 36.423 V10.5.0, p. 90, Mar. 2012, 2 pgs.
Bang et al., "A Coarse Frequency Offset Estimation in an OFDM Systm Using the Concept of the Coherence Phase Bandwidth," IEEE 0-7803-6283-7, pp. 1135-1139, Jun. 2000, 5 pgs.
"Dictionary of Science and Engineering," 3rd Edition, IPC Inter Press Corporation, pp. 716 and 718, Dec. 20, 1994, 5 pgs.
"Dictionary of Telecommunication Network Terms," edited by Ikeda et al., published by Shuwa System, pp. 157-158, Jun. 2001, 3 pgs.

(56) References Cited

OTHER PUBLICATIONS

Fitton et al., "A Comparison of RMS Delay Spread and Coherence Bandwidth for Characterization of Wideband Channels," The Institution of Electrical Engineers (IEE), Savoy Place, London, pp. 9/1-9/6, Oct. 1996, 6 pgs.
Fitton et al., "The Impact of System Bandwidth on a Frequency Hopped Channel," Antennas and Propagation, Conference Publication No. 407, pp. 140-143, Apr. 4-7, 1995, 4 pgs.
Haeiwa et al., "OFDM Technologies and Their Applications," Corona Publishing Co., Ltd., pp. 92-93, Sep. 17, 2010, 2 pgs.
Harada et al., "Super 3G (LTE) System Summary and Experiment Results," pp. 15-21, Nov. 2008, 7 pgs.
Hattori et al., "All about 3G Evolution: LTE Mobile Broadband System Technology," Maruzen Corporation, pp. 358-363, Dec. 25, 2009, 5 pgs.
Hattori et al., "All about 3G Evolution: HSPA Mobile Broadband Technology & LTE Basic Technology," Maruzen Corporation, pp. 78-81, May 10, 2011, 4 pgs.
Hattori et al., "Wireless Broadband Textbook," published by IDG Japan, pp. 301-302, Jun. 2002, 3 pgs.
Hattori, "OFDM/OFDMA Textbook," Impress R&D, pp. 162-163, Sep. 21, 2008, 2 pgs.
Hattori, "OFDM/OFDMA Textbook," Impress R&D, pp. 280-283, Sep. 21, 2008, 3 pgs.
Hattori, "OFDM/OFDMA Textbook," Impress R&D, pp. 284-297, 296-297, and 306-307, Sep. 21, 2008, 6 pgs.
Hattori, "OFDM/OFDMA Textbook," Impress R&D, pp. 304-307, Sep. 2008, 3 pgs.
International Telecommunication Union (ITU), "Definitions of World Telecommunications/ICT Indicators," Mar. 2010, 4 pgs.
International Telecommunications Union (ITU), "Vocabulary of Terms for Wireless Access (Questions ITU-R 215/8 and ITU-R 140/9)," Recommendation ITU-R F.1399-1, May 2001, 5 pgs.
Kyocera webpage, available at www.kyocera.co.jp/prdct/telecom/consumer/kyl22/spec/index.html, Jan. 17, 2014, 4 pgs.
LG Webpage, available at www.lg.com/jp/mobile-phone/le-G2-L-01F, Feb. 3, 2014, 12 pgs.
Ministry of Internal Affairs and Communications Webpage, The Radio Use Web Site, available at http://www.tele.soumu.go.jp/j/adm/system/trunk/wimax/fwa, Feb. 14, 2014, 1 pg.
Naguib et al., "Capacity Improvement with Base-Station Antenna Arrays in Cellular CDMA," IEEE Transactions on Vehicular Technology, vol. 43, No. 3, pp. 691-698, Aug. 1994, 8 pgs.
NTT Docomo Webpage, available at www.nttdocomo.co.jp/corporate/technology/rd/tech/lte/lte01/03/02.html, Jan. 22, 2014, 3 pgs.
Hattori, "OFDM/OFDMA Textbook," Impress R&D, pp. 78-85, 284-287, and 304-307, Sep. 2008, 9 pgs.
Shinmura, "Kojien," 5th Edition, Iwanami Publishing Co., Ltd., p. 1525, Nov. 11, 1998, 2 pgs.
Shinmura, "Kojien," 6th Edition, Iwanami Publishing Co., Ltd., p. 1567, Jan. 11, 2008, 2 pgs.
Telecommunications Industry Association (TIA), "Mobile Station-Base Station Compatibility Standard for Dual-Mode Wideband Spread Spectrum Cellular System," TIA/EIA/IS-95-A, May 1995, 118 pgs.
Yang et al., "A Message-Passing Approach to Distributed Resource Allocation in Uplink DFT-Spread-OFDMA Systems," IEEE Transactions on Communications, vol. 59, No. 4, pp. 1099-1113, Apr. 2011, 15 pgs.

\* cited by examiner

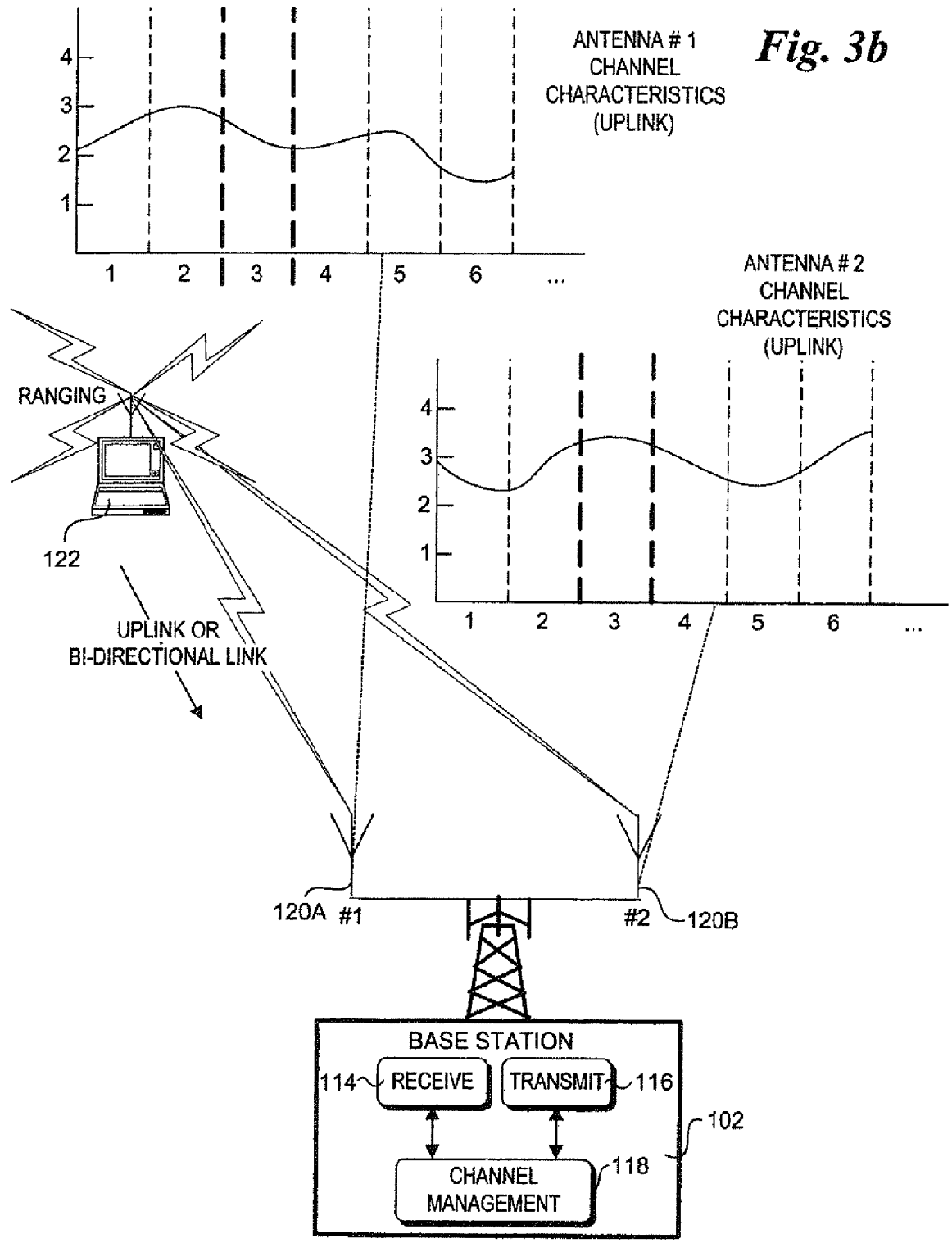

METHOD AND SYSTEM FOR SWITCHING ANTENNA AND CHANNEL ASSIGNMENTS IN BROADBAND WIRELESS NETWORKS

CROSS-REFERENCE TO RELATED APPLICATIONS

This application is a continuation of and claims priority to U.S. patent application Ser. No. 12/498,924, filed on Jul. 7, 2009, which is a continuation of and claims priority to U.S. patent application Ser. No. 11/007,064, now U.S. Pat. No. 7,573,851, entitled METHOD AND SYSTEM FOR SWITCHING ANTENNA AND CHANNEL ASSIGNMENTS IN BROADBAND WIRELESS NETWORKS, filed on Dec. 7, 2004, the disclosures of which are all expressly incorporated by reference herein.

FIELD OF THE INVENTION

The present invention relates to the field of communications systems; more particularly, the present invention relates to techniques for switching channel and antenna assignments in wireless networks.

BACKGROUND OF THE INVENTION

Spatial processing with antenna arrays is one of the most used techniques in wireless communications. Among many schemes developed to date, multiple-input multiple-output (MIMO) and beamforming are often studied and have been proved to be effective in increasing the capacity and performance of a wireless network (see, e.g., Ayman F. Naguib, Vahid Tarokh, Nambirajan Seshadri, A. Robert Calderbank, "A Space-Time Coding Modem for High-Data-Rate Wireless Communications", IEEE Journal on Selected Areas in Communications, vol. 16, no. 8, October 1998 pp. 1459-1478). On the other hand, realization of MIMO or beamforming often means higher complexity and cost on the system side. In particular, MIMO operations entail complicated signal processing and decoding, while beamforming involves hardware calibrations and multi-dimensional data processing.

Over the years, orthogonal division multiple-access (OFDMA) has become the access scheme of choice for almost all broadband wireless networks (e.g., WiMAX, WiFi, and 4G cellular systems). In OFDMA, multiple subscribers are allocated to different subcarriers, in a fashion similar to frequency division multiple access (FDMA). For more information, see Sari and Karam, "Orthogonal Frequency-Division Multiple Access and its Application to CATV Networks," European Transactions on Telecommunications, Vol. 9 (6), pp. 507-516, November/December 1998 and Nogueroles, Bossert, Donder, and Zyablov, "Improved Performance of a Random OFDMA Mobile Communication System," Proceedings of IEEE VTC '98, pp. 2502-2506.

The fundamental phenomenon that makes reliable wireless transmission difficult to achieve is time-varying multipath fading. Increasing the quality or reducing the effective error rate in a multipath fading channel may be extremely difficult. For instance, consider the following comparison between a typical noise source in a non-multipath environment and multipath fading. In environments having additive white Gaussian noise (AWGN), it may require only 1- or 2-db higher signal-to-noise ratio (SNR) using typical modulation and coding schemes to reduce the effective bit error rate (BER) from $10^{-2}$ to $10^{-3}$. Achieving the same reduction in a multipath fading environment, however, may require up to 10 db improvement in SNR. The necessary improvement in SRN may not be achieved by simply providing higher transmit power or additional bandwidth, as this is contrary to the requirements of next generation broadband wireless systems.

Multipath phenomena causes frequency-selective fading. In a multiuser fading environment, the channel gains are different for different subcarriers. Furthermore, the channels are typically uncorrelated for different subscribers. This leads to a so-called "multiuser diversity" gain that can be exploited through intelligent subcarrier allocation. In other words, it is advantageous in an OFDMA system to adaptively allocate the subcarriers to subscribers so that each subscriber enjoys a high channel gain. For more information, see Wong et al., "Multiuser OFDM with Adaptive Subcarrier, Bit and Power Allocation," IEEE J. Select. Areas Commun., Vol. 17(10), pp. 1747-1758, October 1999.

Within one cell, the subscribers can be coordinated to have different subcarriers in OFDMA. The signals for different subscribers can be made orthogonal and there is little intracell interference. However, with an aggressive frequency reuse plan, e.g., the same spectrum is used for multiple neighboring cells, the problem of intercell interference arises. It is clear that the intercell interference in an OFDMA system is also frequency selective and it is advantageous to adaptively allocate the subcarriers so as to mitigate the effect of intercell interference.

One approach to subcarrier allocation for OFDMA is a joint optimization operation, not only requiring the activity and channel knowledge of all the subscribers in all the cells, but also requiring frequent rescheduling every time an existing subscribers is dropped off the network or a new subscribers is added onto the network. This is often impractical in real wireless system, mainly due to the bandwidth cost for updating the subscriber information and the computation cost for the joint optimization.

Existing approaches for wireless traffic channel assignment are subscriber-initiated and single-subscriber (point-to-point) in nature. Since the total throughput of a multiple-access network depends on the channel fading profiles, noise-plus-interference levels, and in the case of spatially separately transceivers, the spatial channel characteristics, of all active subscribers, distributed or subscriber-based channel loading approaches are fundamentally sub-optimum. Furthermore, subscriber-initiated loading algorithms are problematic when multiple transceivers are employed as the base-station, since the signal-to-noise-plus-interference ratio (SINR) measured based on an omni-directional sounding signal does not reveal the actual quality of a particular traffic channel with spatial processing gain. In other words, a "bad" traffic channel measured at the subscriber based on the omni-directional sounding signal may very well be a "good" channel with proper spatial beamforming from the base-station. For these two reasons, innovative information exchange mechanisms and channel assignment and loading protocols that account for the (spatial) channel conditions of all accessing subscribers, as well as their QoS requirements, are highly desirable. Such "spatial-channel and QoS-aware" allocation schemes can considerably increase the spectral efficiency and hence data throughput in a given bandwidth. Thus, distributed approaches, i.e., subscriber-initiated assignment are fundamentally sub-optimum.

SUMMARY OF THE INVENTION

A method and apparatus is disclosed herein for antenna switching and channel assignments in wireless communication systems. Channel characteristics indicative of signal reception quality are obtained for each of multiple channels hosted by each antenna resource at a base station. Channels are assigned to subscribers based on the channel characteristics.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 3b shows a ranging signal sent out by the new subscriber and containing test data sent over various channels via which uplink or bi-directional channel characteristics can be measured at each of the switched antennas of FIG. 1.

FIG. 4a is a flowchart illustrating operations performed to obtain downlink or bi-directional link channel characteristics using the beacon signal scheme of FIG. 3a.

DETAILED DESCRIPTION OF THE PRESENT INVENTION

Figure 1:
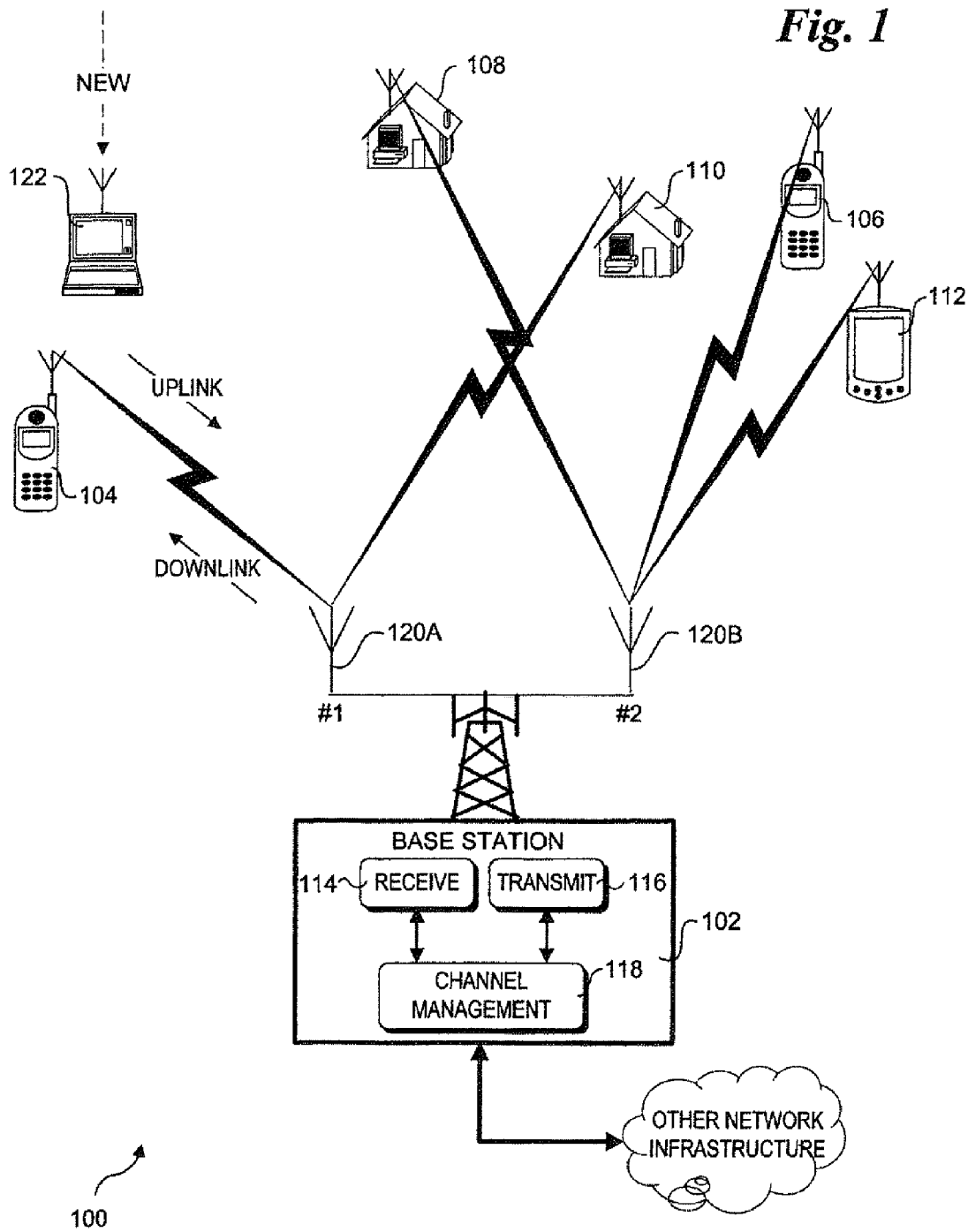
FIG. 1 shows a base station employing a pair of switched antennas that are used to communicate with various subscribers, wherein each subscriber is assigned to a channel corresponding to a respective subchannel/antenna combination.

The marriage of OFDMA and spatial processing provides powerful platform for multiuser broadband communications. The present invention describes a method, apparatus, and system for easy integration of OFDMA with antenna arrays of various configurations. The method and apparatus allows multiuser diversity to be exploited with simple antenna operations, therefore increasing the capacity and performance of wireless communications systems. In one embodiment, Channel characteristics indicative of signal reception quality for downlink or bi-directional traffic for each channel (e.g., OFDMA subchannel/antenna resource combination) are measured or estimated at a subscriber. Corresponding channel characteristic information is returned to the base station. Channel characteristics information may also be measured or estimated for uplink or bi-directional signals received at each of multiple receive antenna resources. The base station employs channel allocation logic to assign uplink, downlink and/or bi-directional channels for multiple subscribers based on channel characteristics measured and/or estimated for the uplink, downlink and/or bi-directional channels.

The benefits of the present invention include simpler hardware (much less expensive than beamforming antenna arrays) and easier processing (much less complicated than MIMO), without sacrificing the overall system performance. In addition to OFDMA implementation, the general principles may be utilized in FDMA (frequency division multiple access), TDMA (time division multiple access), CDMA (code division multiple access), OFDMA, and SDMA (space division multiple access) schemes, as well as combinations of these multiple-access schemes.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus.

Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview:

Efficient exploitation of spatial diversity in a high-speed wireless network is a challenging task due to the broadband nature of spatial channel characteristics. In OFDMA networks, the wide spectrum is partitioned into parallel narrowband traffic channels (commonly referred to as "sub-channels"). The methodology described herein provides a means for allocating traffic channels through intelligent traffic channel assignment.

In the communication system described herein, channel allocation logic performs "channel-aware" traffic channel allocation. In one embodiment, the channel allocation logic provides bandwidth on demand and efficient use of spectral resources (e.g., OFDMA traffic channels) and spatial resources (e.g., the physical location of subscribers as it pertains to spatial beamforming) and performs traffic channel assignment based on broadband spatial channel characteristics of a requesting subscriber and on-going subscribers. Furthermore, channels are allocated to subscribers based on the best antenna resources for those subscribers. Thus, the channel allocation provides enhanced performance over a larger number of subscribers than might be typically obtained using conventional channel assignment approaches.

In responding to a link request from a new subscriber, or when the base-station has data to transmit to a standby subscriber, the logic first estimates the channel characteristics of transmissions received over all, or a selected portion of OFDMA traffic channels for each antenna resource. As used herein, an antenna resource may comprise a single antenna, or a sub-array of antennas (from an array of antennas for a given base station) that are collectively used to transmit and/or receive signals from subscribers. For example, multiple antennas may be configured to function (effectively) as a single antenna resource with improved transmission characteristics (when compared with a single antenna) by using one or more signal diversity schemes (spatial, frequency, and/or time). In one embodiment, the channel characteristics, along with channel assignment for on-going subscribers are used to determine which antenna resource is optimum for each subscriber. The channel characteristic data may be stored in a register or other type of storage location (e.g., a database, file, or similar data structure). In one embodiment, traffic channels corresponding to antenna resources that have the best communication characteristics are assigned to the accessing subscriber to satisfy the service request of the accessing subscriber.

An exemplary portion of a broadband wireless network 100 including a base station 102 that implements the channel selection techniques described herein is shown in FIG. 1.

Base station 102 includes facilities to support communication with various subscribers, as depicted by mobile (phone) subscribers 104 and 106, fixed (location) subscribers 108 and 110, and a mobile (PDA) subscriber 112. These facilities include a receive module 114, a transmit module 116, and channel management component 118, as well as antennas 120A (also referred to herein as antenna #1) and 120B (also referred to herein as antenna #2).

Generally, a base station communicates with a subscriber in the following manner. Data bursts, such as cellular packets, IP packets or Ethernet frames, are encapsulated into an appropriate data frame format (e.g., IEEE 802.16 for WiMAX networks) and forwarded from a network component, such as a radio access node (RAN), to an appropriate base station within a given cell. The base station then transmits to a selected subscriber (identified by the data frame) using a unidirectional wireless link, which is referred to as a "downlink." Transmission of data from a subscriber to network 100 proceeds in the reverse direction. In this case, the encapsulated data is transmitted from a subscriber to an appropriate base station using a unidirectional wireless link referred to as an "uplink." The data packets are then forwarded to an appropriate RAN, converted to IP Packets or Ethernet frames, and transmitted henceforth to a destination node in network 100. Under some types of broadband wireless networks, data bursts can be transmitted using either Frequency-Division-Duplexing (FDD) or Time-Division-Duplexing (TDD) schemes. In the TDD scheme, both the uplink and downlink share the same RF (radio frequency) channel, but do not transmit simultaneously, and in the FDD scheme, the uplink and downlink operate on different RF channels, but the channels may be transmitted simultaneously. In general, the unidirection wireless downlinks may comprise a point-to-point (PP) link, a point-to-multiple (PMP), or a MIMO link. Uplinks typically comprise PP or PMP links, although MIMO links may also be used.

Multiple base stations are configured to form a cellular-like wireless network, wherein one or more base stations may be accessible to a given subscriber at any given location using a shared medium (space (air) through which the radio waves propagate). A network that utilizes a shared medium requires a mechanism to efficiently share it. Sharing of the air medium as enabled via an appropriate channel-based scheme, wherein respective channels are assigned to each subscriber within the access range of a given base station. Typical channel-based transmission schemes include FDMA, TDMA, CDMA, OFDMA, and SDMA, as well as combination of these multiple access schemes. Each of these transmission schemes is well-known in the wireless networking arts.

To facilitate downlink and uplink communications with the various subscribers, base station 102 provides multiple antennas. For illustrative purposes, these are depicted as antenna 120A and antenna 120B (antennas #1 and #2) in FIG. 1. Signals from two or more of the multiple antennas may be combined to support beam forming or spatial multiplexing, or may be used individually for different groups of subscribers using well-known techniques. The multiple antennas may also be configured in one or more clusters. In general, antennas 120A and 120B are representative of various antenna types employed in wireless broadband network, including sectorized antennas and omni-directional antennas.

Under one embodiment, each subscriber is assigned to a respective channel or subchannel provided by one of the antennas at a given base station (or antenna resources, when multiple antennas may be combined to transmit or receive signals). For example, in the illustrated configuration of FIG. 1, mobile subscriber 104 and fixed subscriber 110 are assigned to respective channels facilitated by antenna 120A, while fixed subscriber 108 and mobile subscribers 106 and 112 are assigned to respective channels facilitated by antenna 120B. As described in further detail below, the channel/antenna or subchannel/antenna selection for each subscriber is based on the best available channel characteristics at the point at which a new subscriber enters the network via a given base station (e.g., base station 102). In addition, channels may be re-assigned to on-going subscribers based on changes in measured channel characteristics.

By way of illustration, the following discussion concerns allocation of channels for an OFDMA network. However, this is not meant to be limiting, as similar principles may be applied to wireless networks employing other channel-based transmission schemes, including FDMA, TDMA, CDMA, SDMA, and OFDMA/SDMA, as well as other combinations of these schemes.

In accordance with aspects of the present invention, a channel allocation scheme is now disclosed that allocates downlink and/or uplink or shared (bi-directional) channels for respective subscribers to selected antenna resources based on current channel characteristics. The overall approach is to assign channel/antenna or subchannel/antenna combinations having the best channel characteristics to new and on-going subscribers.

Figure 2:
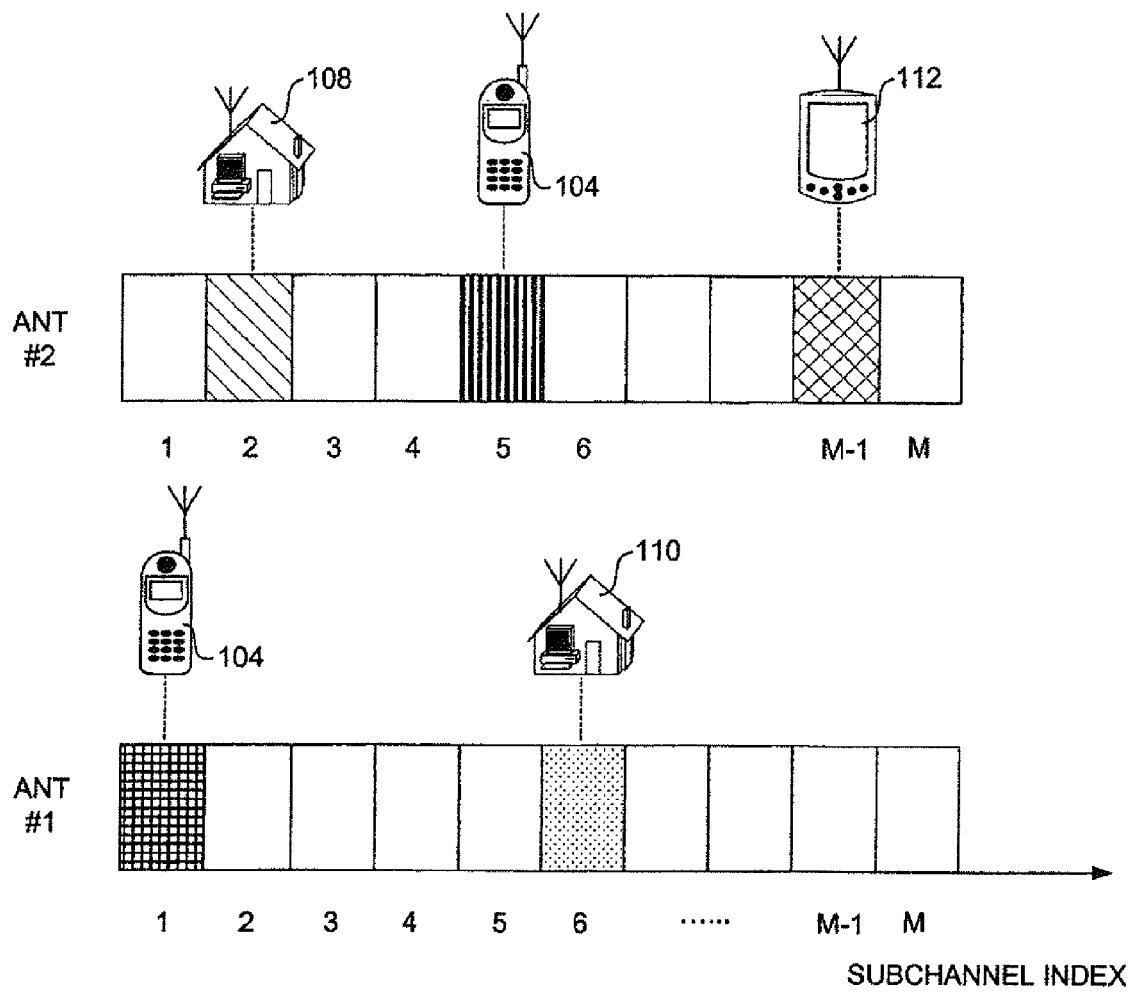
FIG. 2 shows an OFDMA subchannel allocation for the subscribers shown in FIG. 1 prior to the entry of a new subscriber.

FIG. 2 shows an exemplary set of initial OFDMA channel assignments for the various subscribers shown in FIG. 1. In the illustrated embodiment, each of antennas #1 and #2 (120A and 120B) supports N subchannels. Typically, a respective subchannel for a given antenna or antenna resource is assigned to each subscriber. In some cases, multiple subchannels may be assigned for the same subscriber. For illustrative purposes, only a single set of subchannel assignments in FIG. 2 are shown, wherein the single set is illustrative of uplink, downlink, or shared (same channel for uplink and downlink) channel assignments. It will be understood that another set of channel assignments will also exist for transmission schemes that employ separate channels for downlink and uplink traffic.

Figure 3A:
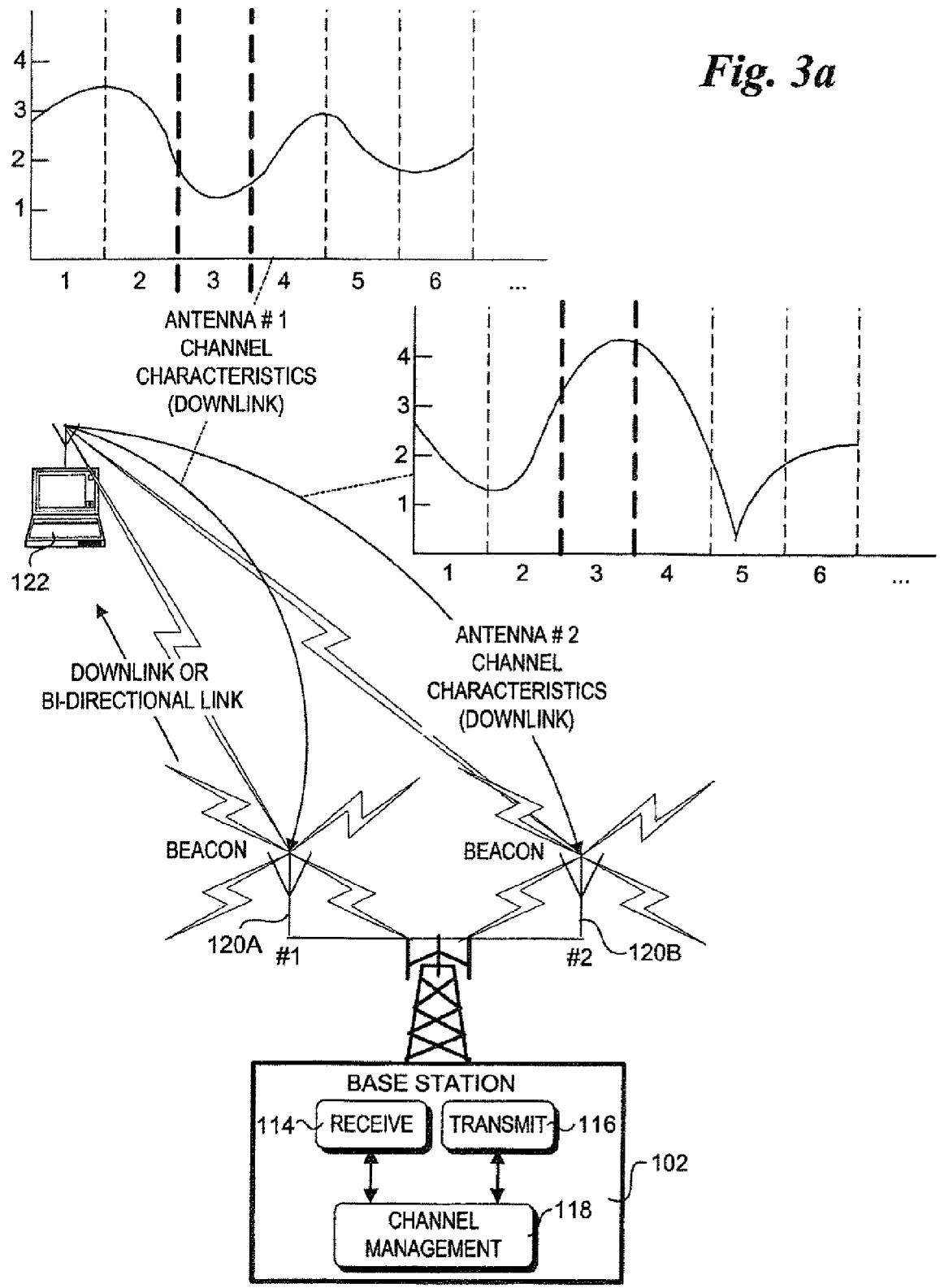
FIG. 3a shows a beacon signal sent out by each of the antennas in FIG. 1 that is received by a new subscriber and contains various channels via which the new subscriber can measure downlink or bi-directional link channel characteristics that are returned to the base station.

Referring to FIGS. 1 and 3a, now suppose that a new mobile subscriber 122 attempts to initiate service with base station 102, either by originating a new service request or in connection with a hand-over from another (currently) serving base station (not shown) to base station 102. As discussed above, it is desired to assign a best available channel to the new user. Accordingly, a mechanism for determining the best available channel is provided.

Figure 4A:
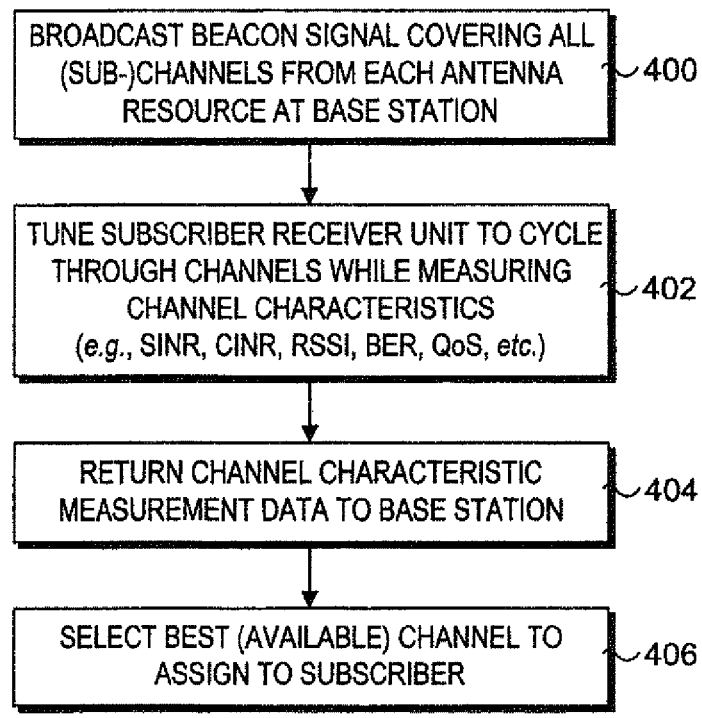

With further reference to the flowchart of FIG. 4a, one embodiment of a process for determining the channel characteristics begins at a block 400, wherein a base station broadcasts a beacon signal covering all sub-channels over the frequency bandwidth allocated to that station from each of its antenna resources. For example, under an FDMA scheme, the broadcast signal may comprise a signal that varies in frequency over the allocated bandwidth using a pre-determined cycle. Under a CDMA scheme, a test signal transmitted over various CDMA channels that are changed in a cyclic manner may be used. Under a channel scheme that supports multiple channels operating on the same frequencies (such as OFDMA), the broadcast signal will include applicable subchannel/frequency combination per antenna resource. (Further details of one embodiment of an OFDMA beacon signal scheme are described below.) As a result, the broadcast beacon signal will provide information from which spatial and frequency channel characteristics may be determined. In one embodiment, the beacon signal is broadcast over a management channel on an ongoing basis. In the case of some channel schemes based on time slots (e.g., OFDMA, CDMA, TDMA), it may be necessary to first perform timing synchronization between a base station and subscriber to enable the subscriber to adequately tune into (e.g., synchronize with) the broadcast beacon signal.

Figure 5:
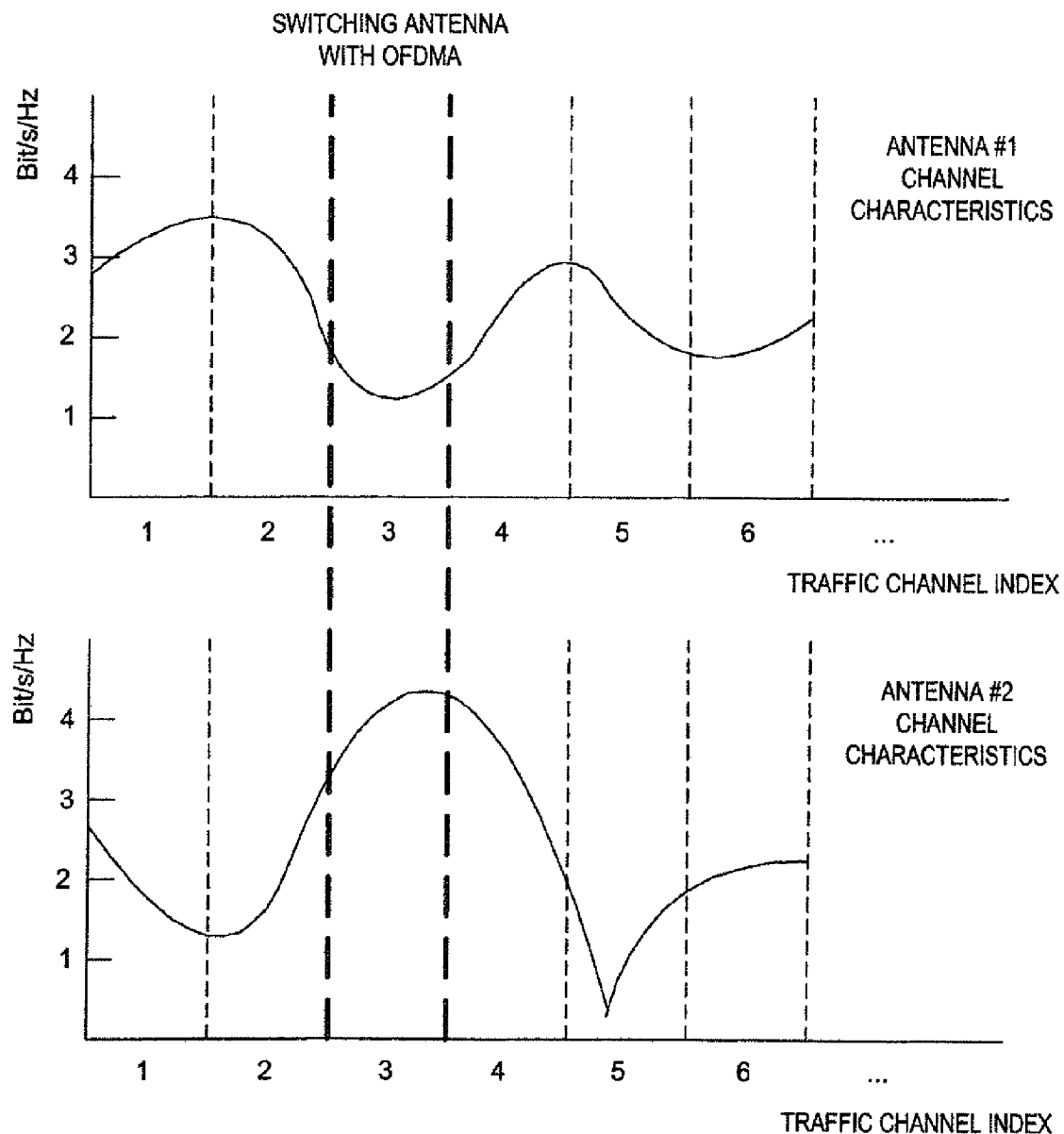
FIG. 5 depicts exemplary subscriber's channel responses corresponding to channel characteristics for the switched antennas of FIG. 1.

In response to the beacon signal, the subscriber (device) tunes its receiving unit to cycle through the various channels (in synchrony with the channel changes in the beacon signal) while measuring channel characteristics. For example, in one embodiment, signal-to-interference plus noise ratio (SINR, also commonly referred to as carrier-to-interference plus noise ratio (CINR) for some types of wireless networks) and/or relative-signal strength indicator (RSSI) measurements are performed at the subscriber to obtain the channel characteristic measurements or estimates. In one embodiment, the channel characteristic measurement pertains to data rates that can reliably be obtained for different channels, as exemplified by the sets of channel characteristic measurement data corresponding to antennas #1 and #2 shown in FIG. 5 (with reduced versions shown in FIG. 3a). For example, it is common to measure such data rates in Bits per second per Hertz (Bit/s/Hz), as shown in FIG. 5. In another embodiment, BER measurements are made for each channel/antenna resource combination. In yet another embodiment, Quality of Service (QoS) parameters, such as delay and jitter are measured to obtain the channel characteristic data. In still other embodiments, various indicia of signal quality/performance may be measured and/or estimated to obtain the channel characteristic data.

Continuing at a block 404 in FIG. 4a, after, or as channel characteristic measurements are taken, corresponding data is returned to the base station. In one embodiment, this information is returned via a management channel employed for such purposes. In response, a best available channel is selected to be assigned to the subscriber in view of current channel availability information and the channel characteristic data. Details of the selection process are described below with reference to FIG. 6.

Exemplary OFDMA Downlink/Bi-Directional Link Channel Characterization:

Under one embodiment employed for OFDMA networks, each base station periodically broadcasts pilot OFDM symbols to every subscriber within its cell (or sector). The pilot symbols, often referred to as a sounding sequence or signal, are known to both the base station and the subscribers. In one embodiment, each pilot symbol covers the entire OFDM frequency bandwidth. The pilot symbols may be different for different cells (or sectors). The pilot symbols can serve multiple purposes: time and frequency synchronization, channel estimation and SINR measurement for subchannel allocation.

In one embodiment, each of multiple antenna resources transmits pilot symbols simultaneously, and each pilot symbol occupies the entire OFDM frequency bandwidth. In one embodiment, each of the pilot symbols have a length or duration of 128 microseconds with a guard time, the combination of which is approximately 152 microseconds. After each pilot period, there are a predetermined number of data periods followed by another set of pilot symbols. In one embodiment, there are four data periods used to transmit data after each pilot, and each of the data periods is 152 microseconds in length.

As the pilot OFDM symbols are broadcast, each subscriber continuously monitors the reception of the pilot symbols and measures (e.g., estimates) the SINR and/or other parameters, including inter-cell interference and intra-cell traffic, for each subchannel. In one embodiment, the subscriber first estimates the channel response, including the amplitude and phase, as if there is no interference or noise. Once the channel is estimated, the subscriber calculates the interference/noise from the received signal.

During data traffic periods, the subscribers can determine the level of interference again. The data traffic periods are used to estimate the intra-cell traffic as well as the subchannel interference level. Specifically, the power difference during the pilot and traffic periods may be used to sense the (intra-cell) traffic loading and inter-subchannel interference to select the desirable subchannel.

In one embodiment, each subscriber measures the SINR of each subchannel (or a set of subchannels corresponding to available subchannels) and reports these SINR measurements to their base station through an access channel. The feedback of information from each subscriber to the base station contains an SINR value (e.g., peak or average) for each subchannel. A channel indexing scheme may be employed to identify the feedback data for each subchannel; no indexing is needed if the order of information in the feedback is known to the base station in advance.

Upon receiving the feedback from a subscriber, the base station selects a subchannel to assign to the subscriber in a manner similar to that described below. After subchannel selection, the base station notifies the subscriber about the subchannel assignment through a downlink common control channel or through a dedicated downlink traffic channel if the connection to the subscriber has already been established. In one embodiment, the base station also informs the subscriber about the appropriate modulation/coding rates. Once the basic communication link is established, each subscriber can continue to send the feedback to the base station using a dedicated traffic channel (e.g., one or more predefined uplink access channels).

The foregoing scheme determines channel characteristics for downlink and shared bi-directional link channels. However, it may be inadequate for predicting uplink channel characteristics. The reason for this is that multipath fading is generally unidirectional. As a result, a channel that produces good downlink channel characteristics (as measured at a receiving subscriber) may not provide good uplink channel characteristics (as measured at a receiving base station).

Figure 4B:
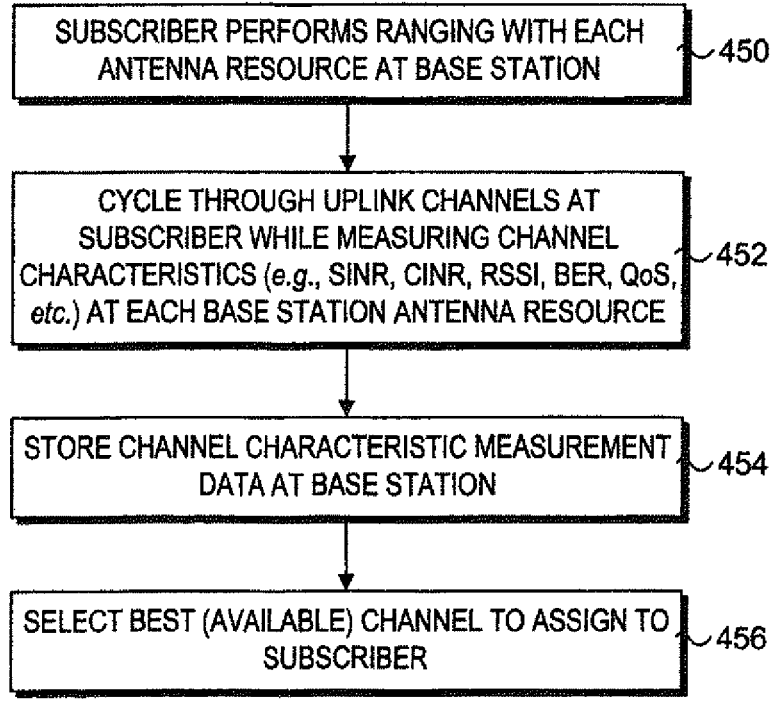
FIG. 4b is a flowchart illustrating operations performed to obtain uplink or bi-directional link channel characteristics using the ranging signal scheme of FIG. 3b.

With reference to FIGS. 3b and 4b, one embodiment of a process for determining channel characteristics for uplink channels (or optionally, bi-directional shared channels) begins at a block 450 (FIG. 4b), wherein a subscriber performs ranging with each antenna resource at the base station. The term "ranging" is used by the WiMAX (IEEE 802.16) standard to define a set of operations used by a subscriber station to obtain service availability and signal quality information from one or more base stations. During this process, a subscriber station synchronizes with a base station and a series of messages are exchanged between the subscriber station and the base station. Also, signal quality measurements may be obtained by performing CINR and/or RSSI measurements at the base station and/or the subscriber station.

As used herein, "ranging" generally concerns transmission activities initiated by a subscriber to enable uplink channel characteristics to be measured by a base station; thus, ranging includes the aforementioned ranging operations defined by the WiMAX specification for WiMAX networks, as well as other techniques used to obtain uplink channel characteristics. For example, similar operations to those employed during WiMAX ranging may be employed for other types of broadband wireless networks. In one embodiment, a subscriber and base station exchange information relating to a channel sequence over which channel characteristic measurements will be made. For example, in some implementations a base station may only identify unused uplink channels to measure, thus reducing the number of measurements that will be performed. Optionally, the channel sequence may be known in advance.

Continuing at a block 452, in view of the channel sequence information, the subscriber cycles through the applicable uplink channels while transmitting test data to each base station antenna resource. In general, this may be performed concurrently for all individual antennas or combined antenna resources, or may be performed separately for each antenna resource. In connection with the transmission of the test data via each uplink channel, channel characteristic measurements are made by the base station in block 452 and stored in block 454. In general, the channel characteristic measurements performed in block 452 are analogous to those performed in block 402 (FIG. 4a), except now the measurements are made at the base station rather than at the subscriber. The best available uplink channel to assign the subscriber is then selected in a block 456 in the manner now described with reference to the operations of FIG. 6.

Figure 6:
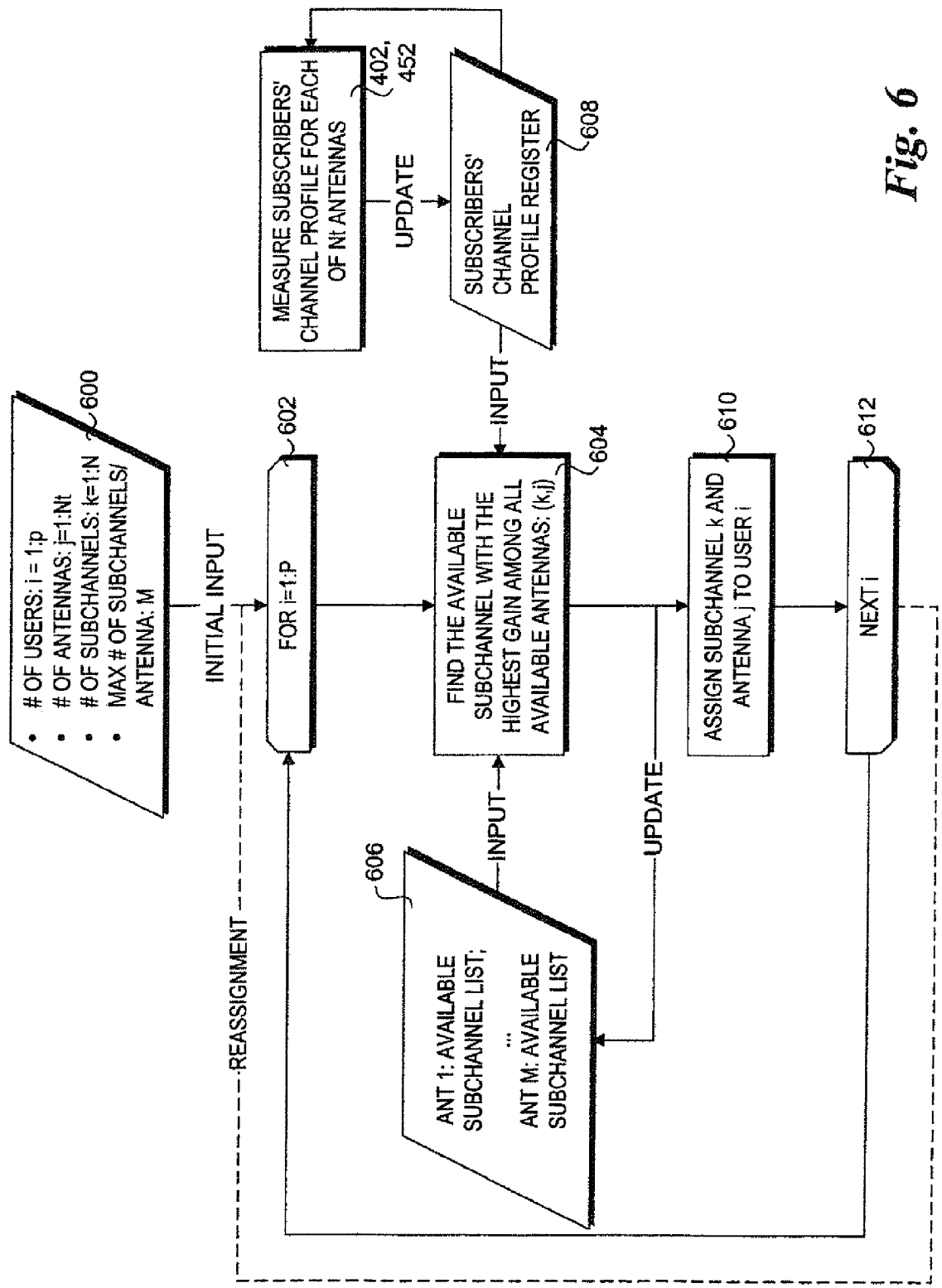
FIG. 6 shows a flowchart illustrating operations performed to assign channels to various users for a base station having multiple antenna resources, wherein a channel comprising the best available subchannel/antenna combination is assigned to a new user based on measured or estimated subchannel characterstics for each antenna.

In further detail, FIG. 6 depicts a process for channel assignment under a generic configuration for a base station having a variable number of users (subscribers), antennas (individual antennas or combined antenna resources), and subchannels for each antenna or combined antenna resource. Accordingly, a set of data 600 comprising an initial input defining the number of users, antennas, number of subchannels, and maximum number of subchannels per antenna is provided to the processing operations depicted below data 600 in FIG. 6.

As depicted by start and end loop blocks 602 and 612, the operations depicted in the blocks 604, 606, and 610 are performed for each of users 1 to P. First, in block 604, the available subchannel with the highest gain is selected among all available antennas (or combined antenna resources, if applicable). As depicted by input data block 606, the set of available subchannels for each of antennas is maintained and updated on an ongoing basis to provide current subchannel allocation information to block 604. In addition, channel characteristic profile data measured in blocks 402 and/or 452 (as applicable) is stored in a subscribers' channel profile register 608 and updated on an ongoing basis. During channel selection for a particular subscriber, corresponding channel characteristic profile data is retrieved from subscribers' channel profile register 608 as an input to block 604.

In view of input data from data blocks 606 and 608, a subchannel k and antenna j are assigned to the user i in block 610. The process then moves to the next user (e.g., user i+1) to assign a channel comprising a subchannel/antenna combination for that user via the operations of block 604 in view of updated input data from data blocks 606 and 608. In general, these operations are repeated on an ongoing basis.

These concepts may be more clearly understood from exemplary channel assignment parameters in accordance with network participants shown in the figures herein. For example, FIG. 2 illustrates an initial condition wherein mobile subscriber 106 and fixed subscriber 110 are respectively assigned channels comprising subchannels 1 and 6 for antenna #1, while fixed subscriber 108 is assigned a channel comprising subchannel 2 for antenna #2 and mobile subscribers 104 and 112 are respectively assigned channels comprising subchannels 5 and M-1 for antenna #2. For point of illustration, these channel assignments are representative of uplink, downlink, or bi-directional link channel assignments. For the following example it is presumed that corresponding channel assignment information is present in data block 606.

Now suppose that mobile subscriber 122 (FIGS. 1, 3a, and 3b) attempts to enter the network. First, channel characteristic measurement data will be collected in accordance with the operations of the flowcharts shown in FIGS. 4a and/or 4b, as applicable. This will update subscribers' channel profile register 608. During the processing of block 604, antenna channel characteristic data for each of antennas #1 and #2 will be retrieved from subscribers' channel profile register 608. As discussed above, exemplary channel characteristic data are depicted in FIG. 5. In view of this channel characteristic data in combination with available subchannel information shown in FIG. 2 and retrieved from data block 606, a new channel for mobile subscriber 122 is selected in block 610.

In the view of the exemplary channel characteristic data and subchannel assignment data in respective FIGS. 5 and 2, subchannel 3 for antenna #2 should be assigned to mobile subscriber 122, which represents the available channel with the highest gain (e.g., available channel with the best channel characteristics). In one embodiment, this may be determined in the following manner. First, the channel with the highest gain is selected for each antenna resource. In the present example, this corresponds to channel 1 for antenna #1 and subchannel 3 for antenna #2. Next, a determination is made as to whether that subchannel is available. In the case of subchannel 1 for antenna #1, this subchannel is already assigned, so it is not available. The channel corresponding to the next best gain is then selected for antenna #1, which corresponds to subchannel 5. Likewise, a similar determination is made for channel 2. In the present example, subchannel 3, which represents the subchannel for antenna #2 with the highest gain, is available. The gains for subchannel 5 for antenna #1 and subchannel 3 for antenna #2 are then compared. The subchannel/antenna combination with the highest gain is then selected for assignment to the new subscriber. This results in the selection of subchannel 3 for antenna #2 as the new channel to be assigned to mobile subscriber 122.

From time to time, processing logic may perform channel reassignment by repeating the process described above with reference to FIG. 6. This channel reassignment compensates for subscriber movement and any changes in interference. In one embodiment, each subscriber reports its channel characteristics data. The base station then performs selective reassignment of subchannel and antenna resources. That is, in one embodiment some of the subscribers may be reassigned to new channels, while other channel assignments will remain as before. In one embodiment, retraining is initiated by the base station, and in which case, the base station requests a specific subscriber or subscribers to report its updated channel characteristics data. A channel reassignment request may also be submitted by a subscriber when it observes channel deterioration.

Figure 7:
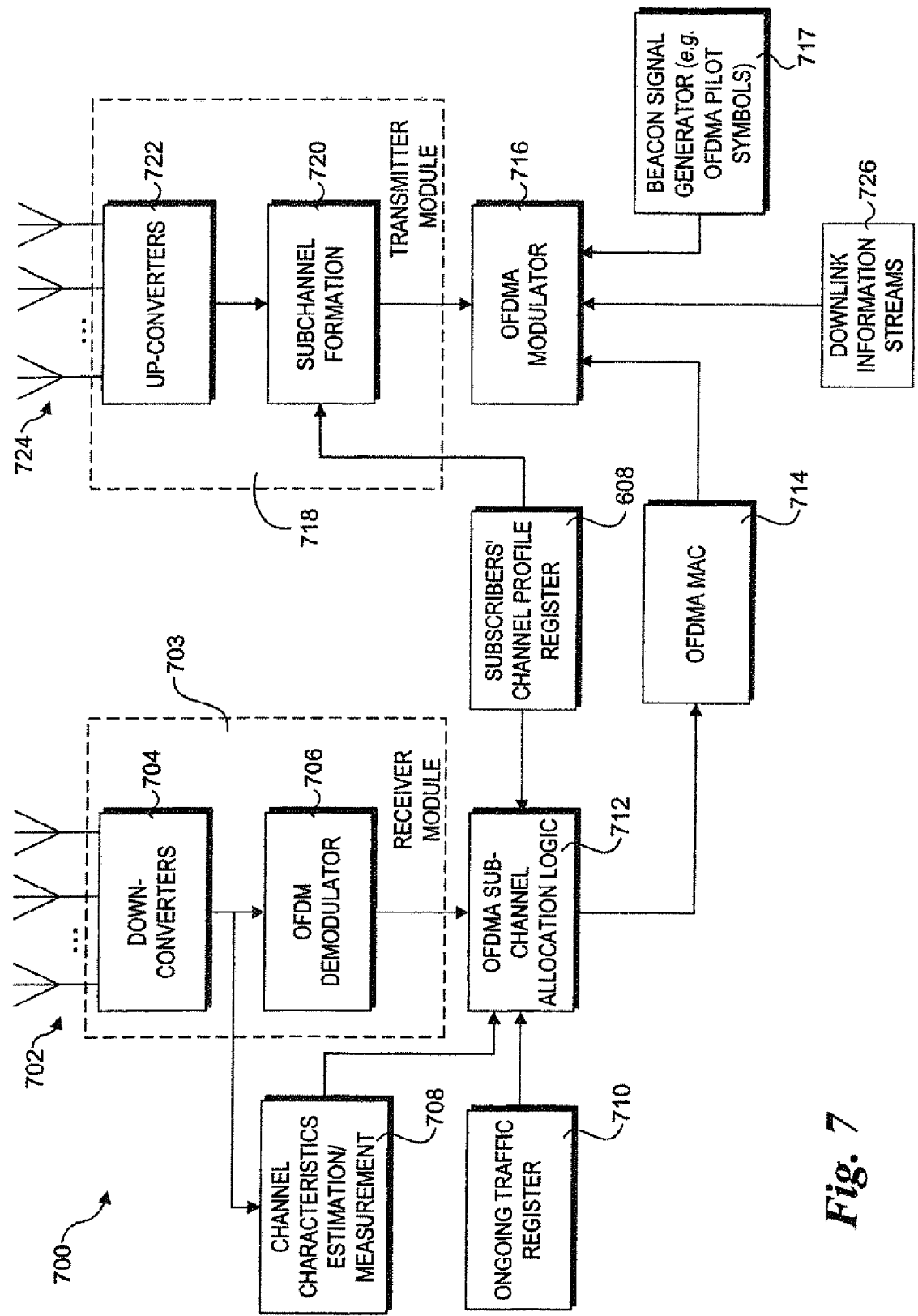
FIG. 7 is a block diagram of one embodiment of an OFDMA/SDMA base-station.

FIG. 7 is a block diagram of base station 700 that communicates with multiple subscribers through OFDMA and spatial multiplexing. The base-station 700 comprises receiving antenna array 702, a receiver module 703 including a set of down-converters 704 coupled to receiving antenna array 700 and an OFDM demodulator 706, a channel characteristics module 708, an on-going traffic register 710, OFDMA subchannel channel allocation logic 712, a subscribers' channel profile register 608, an OFDMA medium access controller (MAC) 714, an OFDM modem 716, a beacon signal generator, an OFDMA transmitter module 718 including a subchannel formation block 720, and a set of up-converters 722 that provide inputs to respective antenna resources in a transmission antenna array 724.

Uplink signals, including the accessing signal from a requesting subscriber, are received by receiving antenna array 702 and down-converted to the base-band by down-converters 704. The base-band signal is demodulated by OFDM demodulator 706 and also processed by channel characteristics block 708 for estimation of the accessing subscriber's uplink channel characteristics using one of the techniques described above or other well-known signal quality estimation algorithms. The estimated or measured channel characteristics data, along with channel characteristics corresponding to channels assigned to ongoing traffic that is stored in subscribers channel profile register 608 and on-going traffic information stored in the on-going traffic register 710, are fed to OFDMA subchannel allocation logic 712 to determine a channel assignment for the accessing subscriber, and possibly partial or all of the on-going subscribers. The results are sent to OFDMA MAC 714, which controls the overall traffic.

Control signals from OFDMA MAC 714 and downlink data streams 726 are mixed and modulated by OFDM modulator 716 for downlink transmission. Subchannel formation (such as the antenna beamforming/switching operations described below with reference to FIG. 8) is performed by subchannel formation block 720 using subchannel definition information stored in the subscribers' channel profile register 608. The output of subchannel formation block 720 is up-converted by the set of up-converters 722, and transmitted through transmission antenna array 724.

Beacon signal generator 717 is used to generate a beacon signal appropriate to the underlying transmission scheme. For example, for an OFDMA transmission scheme, beacon signal generator 717 generates a signal including OFDMA pilot symbols interspersed among test data frames.

Figure 8:
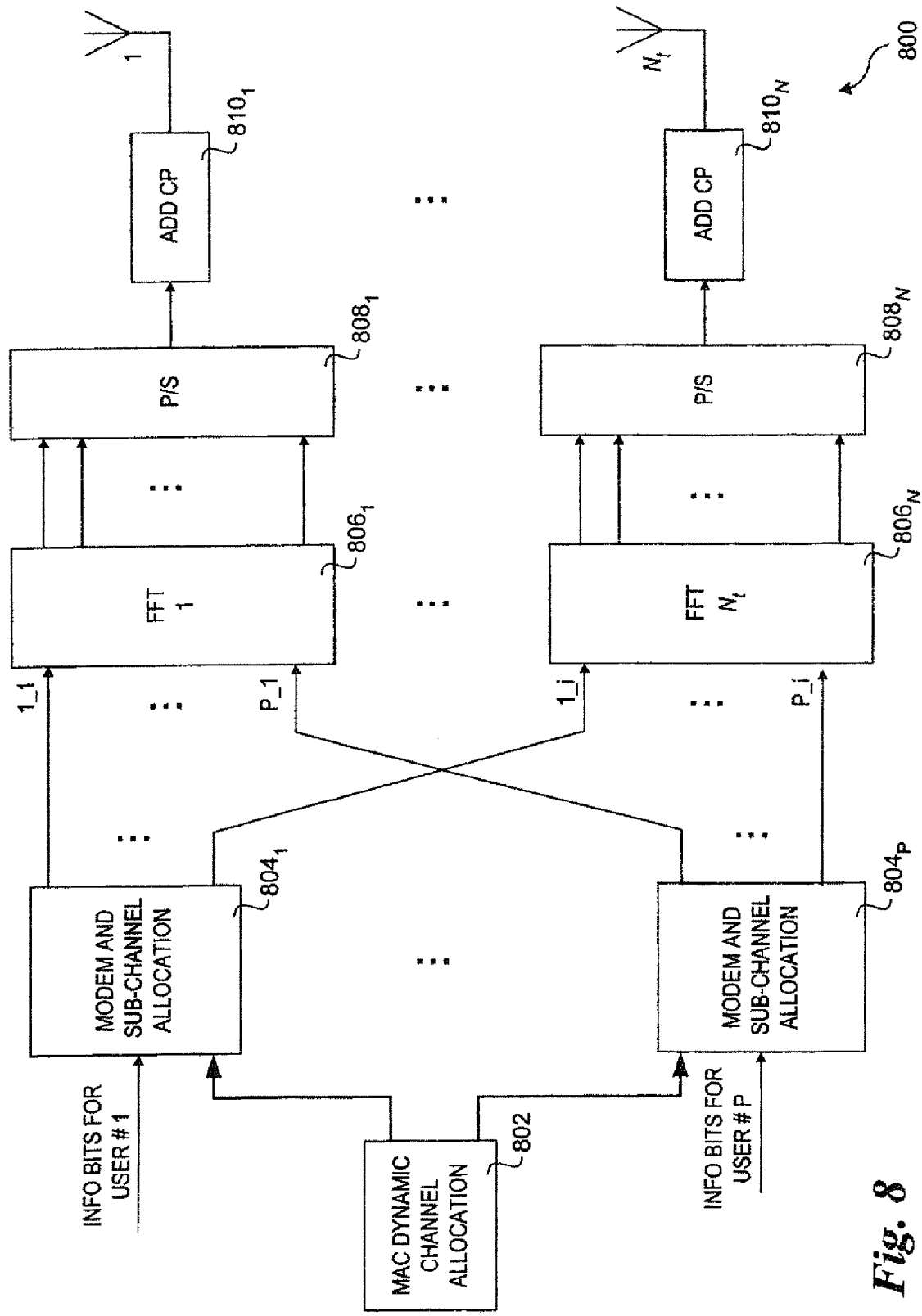
FIG. 8 shows an architecture for a OFDMA transmitter module employing multiple switched antennas.

Details of functional blocks corresponding to one embodiment of an OFDMA transmitter module 800 for a base station having N antennas are shown in FIG. 8. A MAC dynamic channel allocation block 802 is used to select an appropriate antenna resource and subchannel for each of P users, as depicted by selection inputs to modem and subchannel allocation blocks $804_{1-P}$. Based on the modem and subchannel allocation for each user, a corresponding OFDMA baseband signal is generated, up-converted, and transmitted over an appropriate antenna using signal-processing techniques that are well-known in the OFDMA transmission arts. The process is depicted by Fast Fourier Transform (FFT) blocks $804_{1-N}$, parallel to serial (PIS) conversion blocks $806_{1-N}$, and add cyclic prefix (CP) blocks $804_{1-N}$.

OFDMA transmitter module 800 performs antenna switching operations by adjusting the FFT inputs. For example, for a given subscriber channel, certain FFT inputs are set to 1 (meaning use), while other FFT inputs are set to 0 (meaning ignore). OFDMA transmitter module 800 also supports channels that are facilitated by concurrently sending signals over multiple antennas.

In general, the operations performed by the process and functional blocks illustrated in the figures herein and described above are performed by processing logic that may comprise hardware (circuitry, dedicated logic, etc.), software (such as is run on a general purpose computer system or a dedicated machine), or a combination of both.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method for wireless communication, said method comprising:
   receiving, at a base station from a subscriber station, data corresponding to a measured one or more channel characteristics of a plurality of orthogonal frequency division multiple access (OFDMA) subcarriers hosted by a first antenna resource and a second antenna resource located at the base station, the measured one or more channel characteristics being indicative of reception quality for a corresponding OFDMA subcarrier of the plurality of OFDMA subcarriers, and the first antenna resource and the second antenna resource including a plurality of antennas;
   assigning one or more OFDMA subcarriers of the plurality of OFDMA subcarriers, said assigning being based at least on the measured one or more channel characteristics of the first antenna resource and the second antenna resource, and at least one OFDMA subcarrier of the plurality of OFDMA subcarriers of said assigning being different from the first antenna resource and the second antenna resource;
   sending, to the subscriber station, a notification of said assigning;
   receiving, periodically, from the subscriber station to the base station, updated data corresponding to periodically measured one or more channel characteristics;
   reassigning one or more reassigned OFDMA subcarriers of the plurality of OFDMA subcarriers, said reassigning being based at least on the updated data corresponding to the periodically measured one or more channel characteristics of the first antenna resource and the second antenna resource; and
   sending, from the base station to the subscriber station, a notification of said reassigning.

2. The method of claim 1, further comprising:
   sending, from the base station to the subscriber station, one or more beacon signals.

3. The method of claim 2, wherein the measured one or more channel characteristics further comprise:
   estimated channel response and interference sent from the subscriber station using information from pilot symbol periods and data periods of the sent one or more beacon signals.

4. The method of claim 3, wherein each of the one or more beacon signals includes all subchannels over a total frequency bandwidth allocated to the base station.

5. The method of claim 1, wherein the plurality of OFDMA subcarriers comprise at least one of uplink channels, downlink channels, and bi-directional channels.

6. The method of claim 1, further comprising:
   synchronizing the subscriber station with the base station.

7. The method of claim 6, further comprising:
   receiving, from the subscriber station, test data sent to the first antenna resource of the base station; and
   measuring, at the base station, uplink channel characteristics of at least one uplink OFDMA subcarrier of the plurality of OFDMA subcarriers hosted by the first antenna resource.

8. A base station for wireless communication, said base station configured to:
   receive, from a subscriber station, data corresponding to a measured one or more channel characteristics of a plurality of orthogonal frequency division multiple access (OFDMA) subcarriers hosted by a first antenna resource and a second antenna resource located at said base station, the measured one or more channel characteristics being indicative of reception quality for a corresponding OFDMA subcarrier of the plurality of OFDMA subcarriers, and said first antenna resource and said second antenna resource including a plurality of antennas;
   assign one or more OFDMA subcarriers of the plurality of OFDMA subcarriers, the assignment being based at least on the measured one or more channel characteristics of said first antenna resource and said second antenna resource, and at least one OFDMA subcarrier of said plurality of OFDMA subcarriers of the assignment being different from said first antenna resource and said second antenna resource;
   send, to the subscriber station, a notification of the assignment;
   receive, periodically, from the subscriber station, updated data corresponding to periodically measured one or more channel characteristics;
   reassign one or more reassigned OFDMA subcarriers of the plurality of OFDMA subcarriers, the reassignment being based at least on the updated data corresponding to the periodically measured one or more channel characteristics of said first antenna resource and said second antenna resource; and
   send, to the subscriber station, a notification of the reassignment.

9. The base station of claim 8, further configured to:
   send, to the subscriber station, one or more beacon signals.

10. The base station of claim 9, wherein the measured one or more channel characteristics further comprise:
    estimated channel response and interference sent from the subscriber station using information from pilot symbol periods and data periods of the sent one or more beacon signals.

11. The base station of claim 10, wherein each of the one or more beacon signals includes all subchannels over a total frequency bandwidth allocated to said base station.

12. The base station of claim 8, wherein the plurality of OFDMA subcarriers comprise at least one of uplink channels, downlink channels, and bi-directional channels.

13. The base station of claim 8, further configured to:
    synchronize with the subscriber station.

14. The base station of claim 13, further configured to:
    receive, from the subscriber station, test data sent to said first antenna resource of said base station; and
    measure uplink channel characteristics of at least one uplink OFDMA subcarrier of the plurality of OFDMA subcarriers hosted by said first antenna resource.

15. A base station for wireless communication, said base station comprising:
    a first antenna resource and a second antenna resource located at said base station, said first antenna resource and said second antenna resource including a plurality of antennas, and a plurality of orthogonal frequency division multiple access (OFDMA) subcarriers hosted by said first antenna resource and said second antenna resource; and
    a transceiver configured to:
       receive, from a subscriber station, data corresponding to a measured one or more channel characteristics;
       assign one or more OFDMA subcarriers of the plurality of OFDMA subcarriers, the assignment being based at least on the measured one or more channel characteristics of said first antenna resource and said second antenna resource; and at least one OFDMA subcarrier of the plurality of OFDMA subcarriers of the assignment being different from said first antenna resource and said second antenna resource;

send, to the subscriber station, a notification of the assignment;

receive, periodically, from the subscriber station, updated data corresponding to periodically measured one or more channel characteristics; and send a notification of reassignments of one or more reassigned OFDMA subcarriers of the plurality of OFDMA subcarriers, the reassignments being based at least on the updated data corresponding to the periodically measured one or more channel characteristics.

16. The base station of claim 15, said transceiver further configured to:

transmit one or more beacon signals.

17. The base station of claim 15, wherein the measured one or more channel characteristics comprise at least one of signal-to-interference plus noise ratio (SINR), carrier-to-interference plus noise ratio (CINR), and relative-signal strength indicator (RSSI) measurements.

18. The base station of claim 15, wherein the plurality of OFDMA subcarriers comprise at least one of uplink channels, downlink channels, and bi-directional channels.

19. The base station of claim 15, wherein said base station is configured to synchronize with the subscriber station.

20. The base station of claim 19, wherein said first and second antenna resources are further configured to receive test data, and said base station being configured to measure corresponding uplink channel characteristics of at least one uplink OFDMA subcarrier of the plurality of OFDMA subcarriers hosted by said first and second antenna resources.

* * * * *

UNITED STATES PATENT AND TRADEMARK OFFICE
CERTIFICATE OF CORRECTION

| | | |
|---|---|---|
| PATENT NO. | : 8,760,992 B2 | Page 1 of 1 |
| APPLICATION NO. | : 13/756957 | |
| DATED | : June 24, 2014 | |
| INVENTOR(S) | : Guanbin Xing et al. | |

It is certified that error appears in the above-identified patent and that said Letters Patent is hereby corrected as shown below:

<u>Title Page 4, Item (56) References Cited, U.S. Patent Documents</u>:
Left Column, line 47, change "2005/0088999" to --2005/0088990--; and
Left Column, line 65, between 2011/0222420 and 2011/0255577, insert --2011/0222495 9/2011 Li et al.--.

Signed and Sealed this
Seventeenth Day of February, 2015

Michelle K. Lee
*Deputy Director of the United States Patent and Trademark Office*